United States Patent
Kinugasa

(10) Patent No.: US 7,623,245 B2
(45) Date of Patent: Nov. 24, 2009

(54) DIFFERENTIAL PRESSURE MEASURING SYSTEM AND DIFFERENTIAL PRESSURE MEASURING METHOD

(75) Inventor: Seiichiro Kinugasa, Tokyo (JP)

(73) Assignee: Yamatake Corporation, Tokyo (JP)

( * ) Notice: Subject to any disclaimer, the term of this patent is extended or adjusted under 35 U.S.C. 154(b) by 586 days.

(21) Appl. No.: 11/540,532

(22) Filed: Oct. 2, 2006

(65) Prior Publication Data
US 2007/0089522 A1 Apr. 26, 2007

(30) Foreign Application Priority Data
Oct. 3, 2005 (JP) .......................... P2005-290508

(51) Int. Cl.
*G01B 9/02* (2006.01)
*G02B 6/00* (2006.01)
(52) U.S. Cl. .......................... 356/478; 356/480; 385/12
(58) Field of Classification Search .................. 356/477, 356/478, 480, 519; 385/12
See application file for complete search history.

(56) References Cited

U.S. PATENT DOCUMENTS

| 4,730,622 | A | * | 3/1988 | Cohen ........................ 600/480 |
| 4,899,046 | A | * | 2/1990 | Wright et al. .......... 250/227.14 |
| 4,933,545 | A | * | 6/1990 | Saaski et al. ............ 250/227.14 |
| 5,798,834 | A | | 8/1998 | Brooker |
| 6,829,397 | B2 | | 12/2004 | Wang et al. |
| 2003/0234921 | A1 | * | 12/2003 | Yamate et al. .............. 356/73.1 |
| 2005/0232531 | A1 | * | 10/2005 | Hadley et al. .................. 385/12 |

FOREIGN PATENT DOCUMENTS

JP 2003-166890 A 6/2003

* cited by examiner

*Primary Examiner*—Patrick J Connolly
(74) *Attorney, Agent, or Firm*—The Nath Law Group; Jerald L. Meyer; Jiaxiao Zhang

(57) ABSTRACT

A differential pressure measuring system includes a light source for emitting a light, a first transducer for attenuating the intensity of the emitted light in a first range, depending on a first pressure, and providing a first light, a second transducer for attenuating the intensity of the first light in a second range, depending on a second pressure, and providing a second light, a feedback circuit for adjusting the intensity of the emitted light to maintain the intensity of the second light in the second range constant, and a measuring module for measuring a differential pressure between the first and second pressures, based on the intensities of the second light in the first and second ranges.

16 Claims, 37 Drawing Sheets

— · · — SPECTRUM OF EMITTED LIGHT
——— REFLECTION SPECTRUM OF FIRST FILTER
- - - - - REFLECTION SPECTRUM OF SECOND REFLECTIVE FILM
- - - - - REFLECTION SPECTRUM OF FIRST REFLECTIVE FILM
— · — REFLECTION SPECTRUM OF SECOND FILTER

DIFFERENTIAL PRESSURE MEASURING SYSTEM AND DIFFERENTIAL PRESSURE MEASURING METHOD

CROSS REFERENCE TO RELATED APPLICATIONS AND INCORPORATION BY REFERENCE

This application is based upon and claims the benefit of priority from prior Japanese Patent Application P2005-290508 filed on Oct. 3, 2005; the entire contents of which are incorporated by reference herein.

BACKGROUND OF THE INVENTION

1. Field of the Invention

The present invention relates to a differential pressure measurement and, in particular, to a differential pressure measuring system and a differential pressure measuring method.

2. Description of the Related Art

When an oil plant is controlled, it is required to measure a differential pressure of a fluid between the different measuring positions in the oil plant. In an earlier method for measuring the differential pressure disclosed in published Japanese Patent Application 2003-166890, Fabry-Perot interferometers are displaced on the measuring positions. An optical path difference between the Fabry-Perot interferometers changes, depending on the differential pressure. Therefore, the differential pressure is measured by detecting the change of optical path difference by light. However, the earlier method requires complex signal processing to identify the center of an interference fringe to detect the change of the optical path difference. Also, when the center of the interference fringe is identified, a reduction of an emission power of a light source and a reduction of a transmittance of an optical waveguide may occur. In this case, interference fringe amplitude is reduced. When the amplitude is reduced, it is difficult to distinguish adjacent bright portions of the interference fringe. Therefore, a measurement error may occur when the differential pressure is measured. Further, the light intensity may be changed by the drift of an optical axis of a light source or the fluctuation of the emission power of the light source. Such change of the light intensity does not relate to the differential pressure and causes the measurement error.

SUMMARY OF THE INVENTION

An aspect of present invention inheres in a differential pressure measuring system according to a first embodiment of the present invention. The differential pressure measuring system includes a light source configured to emit a light, a first transducer configured to be exposed to a first external pressure to attenuate the intensity of the emitted light in a first wavelength range, depending on the first external pressure, and to provide a first measurement light, and a second transducer configured to be exposed to a second external pressure to attenuate the intensity of the first measurement light in a second wavelength range, depending on the second external pressure, and to provide a second measurement light. The second wavelength range is different from the first wavelength range. The system further includes a feedback circuit configured to adjust the intensity of the emitted light to maintain the intensity of the second measurement light in the first wavelength range or the intensity of the second measurement light in the second wavelength range constant, and an intensity-based measuring module configured to measure a differential pressure between the first external pressure and the second external pressure, based on the intensities of the second measurement light in the first and second wavelength ranges.

Another aspect of the present invention inheres in the differential pressure measuring system according to a second embodiment of the present invention. The differential pressure measuring system includes a light source configured to emit a light, a first transducer configured to be exposed to a first external pressure to attenuate the intensity of the emitted light in a first wavelength range, depending on the first external pressure, and to provide a first measurement light, a second transducer configured to be exposed to a second external pressure to attenuate the intensity of the first measurement light in a second wavelength range, depending on the second external pressure, and to provide a second measurement light. The second wavelength range is different from the first wavelength range. The differential pressure measuring system further includes a ratio-based measuring module configured to measure a differential pressure between the first external pressure and the second external pressure, based on a ratio of one of the intensities of the second measurement light in the first and second wavelength ranges to another one of the intensities of the second measurement light in the first and second wavelength ranges.

Yet another aspect of the present invention inheres in a differential pressure measuring method according to a third embodiment of the present invention. The differential pressure measuring method includes emitting a light, attenuating the intensity of the emitted light in a first wavelength range, depending on a first external pressure, to provide a first measurement light, attenuating the intensity of the first measurement light in a second wavelength range, depending on a second external pressure, to provide a second measurement light. The second wavelength range is different from the first wavelength range. The differential pressure measuring method further includes adjusting the intensity of the emitted light to maintain the intensity of the second measurement light in the first wavelength range or the intensity of the second measurement light in the second wavelength range constant, and measuring a differential pressure between the first external pressure and the second external pressure, based on the intensities of the second measurement light in the first and second wavelength ranges.

Yet another aspect of the present invention inheres in the differential pressure measuring method according to a fourth embodiment of the present invention. The differential pressure measuring method includes emitting a light, attenuating the intensity of the emitted light in a first wavelength range, depending on a first external pressure, to provide a first measurement light, attenuating the intensity of the first measurement light in a second wavelength range, depending on a second external pressure, to provide a second measurement light. The second wavelength range is different from the first wavelength range. The differential pressure measuring method further includes measuring a differential pressure between the first external pressure and the second external pressure, based on a ratio of one of the intensities of the second measurement light in the first and second wavelength ranges to another one of the intensities of the second measurement light in the first and second wavelength ranges.

DETAILED DESCRIPTION OF THE INVENTION

Figure 1:
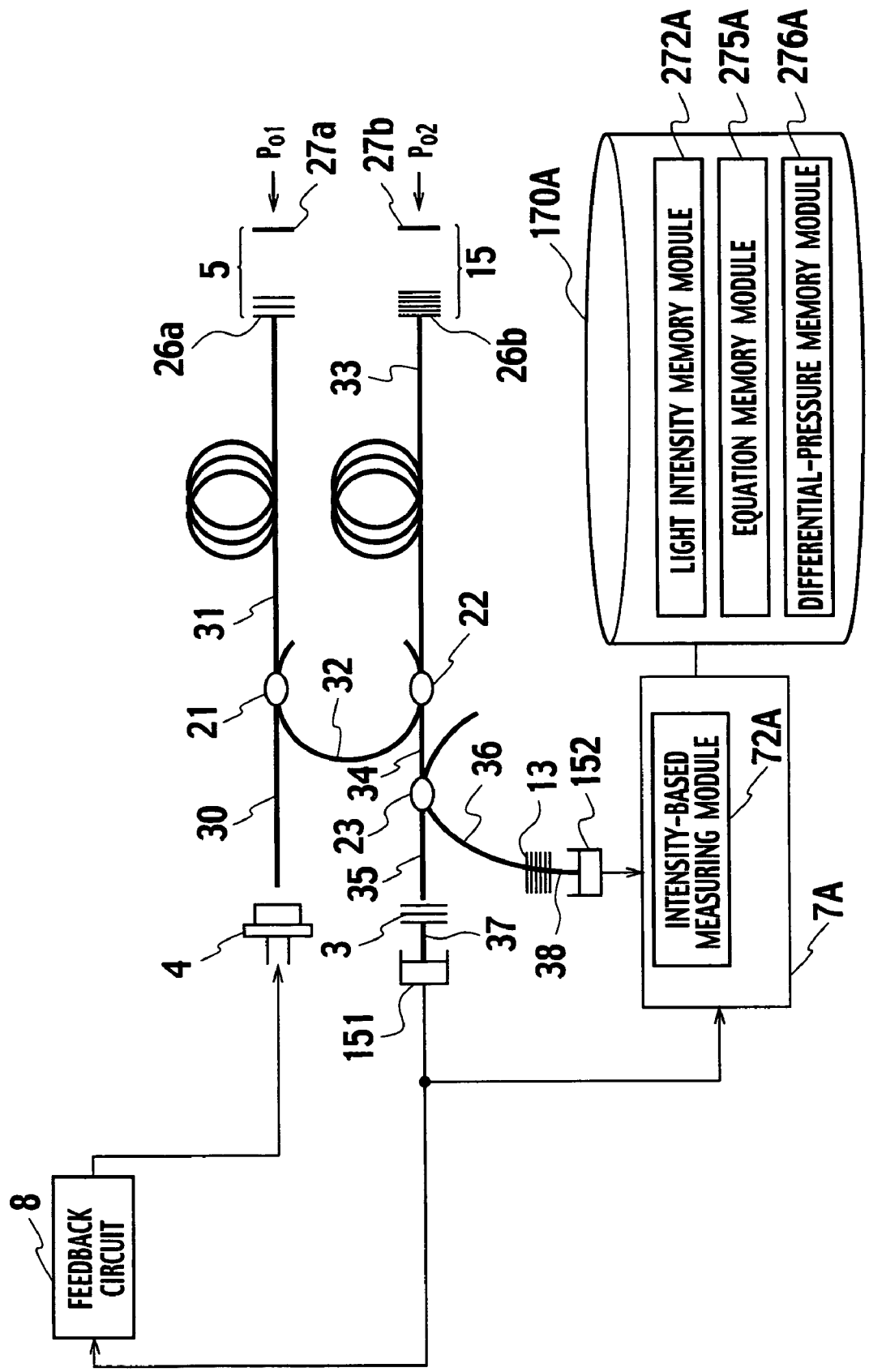
FIG. 1 is a diagram of a differential pressure measuring system in accordance with a first embodiment of the present invention.

Embodiments of the present invention will be described with reference to the accompanying drawings. It is to be noted that the same or similar reference numerals are applied to the same or similar parts and elements throughout the drawings, and the description of the same or similar parts and elements will be omitted or simplified.

First Embodiment

With reference to FIG. 1, a differential pressure measuring system according to the first embodiment of the present invention includes a light source 4 configured to emit a light, a first transducer 5 configured to attenuate the intensity of the emitted light in a first wavelength range, depending on a first external pressure "$P_{O1}$" to be applied, and to provide a first measurement light, and a second transducer 15 configured to attenuate the intensity of the first measurement light in a second wavelength range, depending on a second external pressure "$P_{O2}$" to be applied, and to provide a second measurement light. The second wavelength range is different from the first wavelength range. The differential pressure measuring system further includes a feedback circuit 8 configured to adjust the intensity of the emitted light to maintain the intensity of the second measurement light in the second wavelength range constant, and an intensity-based measuring module 72A configured to measure a differential pressure ($|P_{O1}-P_{O2}|$) between the first external pressure "$P_{O1}$" and the second external pressure "$P_{O2}$", based on the intensity of the second measurement light in the first wavelength range and the intensity of the second measurement light in the second wavelength range.

A xenon lamp which produce a continuous light spectrum from the ultraviolet through infrared (185 nm-2,000 nm), a light-emitting diode, a super luminescent diode, a semiconductor laser diode, a multimode laser diode, and a single mode laser diode can be used for the light source 4, for example. An optical waveguide 30 is connected to the light source 4. The optical waveguide 30 transmits the emitted light. A single mode fiber optic cable and a multi mode fiber optic cable can be used for each of the optical waveguide 30 and a plurality of optical waveguides 30, 31, 32, 33, 34, 35, 36, 37, 38, to be described, for example. The optical waveguide 31 is connected to the optical waveguide 30, through a first splitter 21. An optical coupler can be used for the first splitter 21, for example.

Figure 2:
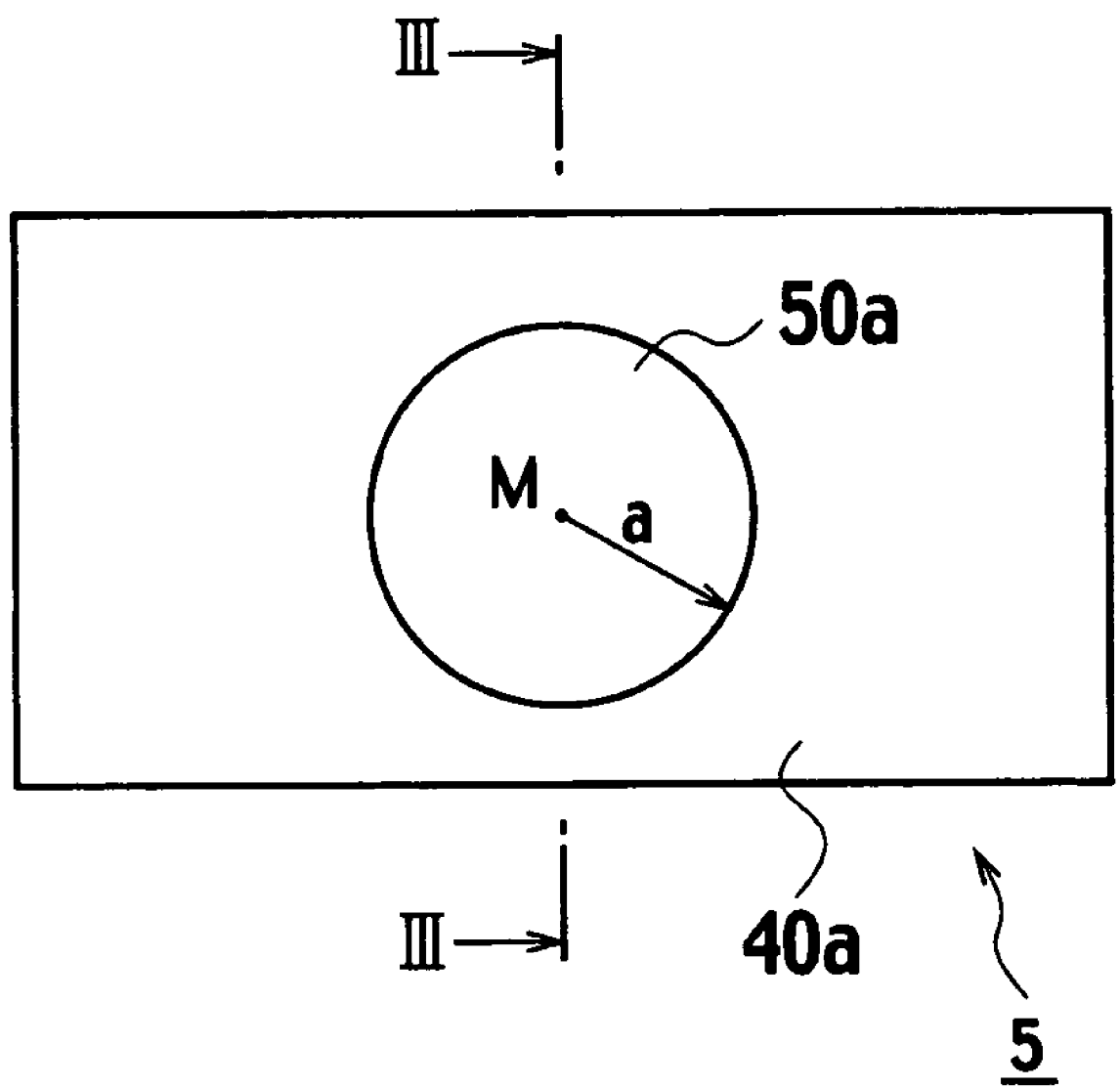
FIG. 2 is a plan view of a first transducer in accordance with the first embodiment of the present invention.
Figure 3:
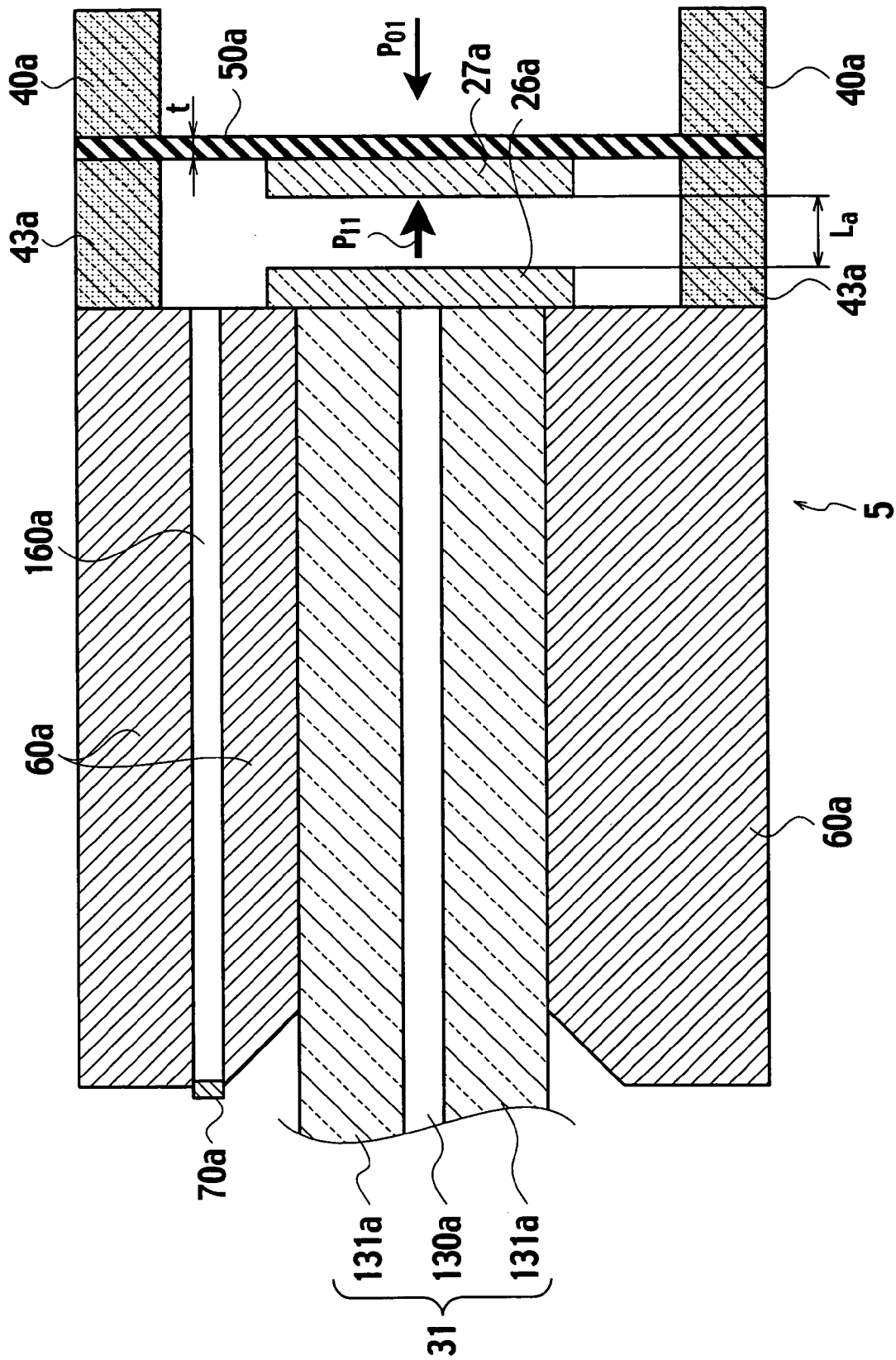
FIG. 3 is a first cross sectional view of the first transducer in accordance with the first embodiment of the present invention.

The first transducer 5 is connected to the optical waveguide 31. With reference to FIG. 2 and FIG. 3, which is a sectional view taken on line III-III in FIG. 2, the first transducer 5 includes a holder 60a. The optical waveguide 31 including a core 130a and a clad 131a is inserted into the holder 60a. Further, the first transducer 5 includes a first filter 26a disposed on an end face of the inserted optical waveguide 31, a first diaphragm 50a disposed parallel to the first filter 26a and exposed to the first external pressure "$P_{O1}$", and a first reflective film 27a disposed on an inner surface of the first diaphragm 50a opposing the first filter 26a to receive the light passing through the first filter 26a. Also, the first transducer 5 includes a first frame 43a. The first frame 43a defines a first distance "$L_a$" between the first filter 26a and the first reflective film 27a. The first filter 26a only reflects second wavelength components of the emitted light in the second wavelength range. A bandpass filter including a multilayer stack of Tantalum pentoxide ($Ta_2O_5$) and silicon dioxide ($SiO_2$) can be used for the first filter 26a, for example. A total reflection mirror can be used for the first reflective film 27a, for example. An inlet 160a is delineated in the holder 60a. The first transducer 5 includes a valve 70a configured to control the opening and closing of the inlet 160a to adjust the first internal pressure "$P_{I1}$" of a space surrounded by the first diaphragm 50a, the first frame 43a, and the holder 60a. Further, a first base portion 40a is disposed on an outer surface of the first diaphragm 50a. The first base portion 40a defines a radius "a" of the exposed first diaphragm 50a, as shown in FIG. 2. Here, a refractive index of the space surrounded by the first diaphragm 50a, the first frame 43a, and the holder 60a is "$n_a$".

Figure 4:
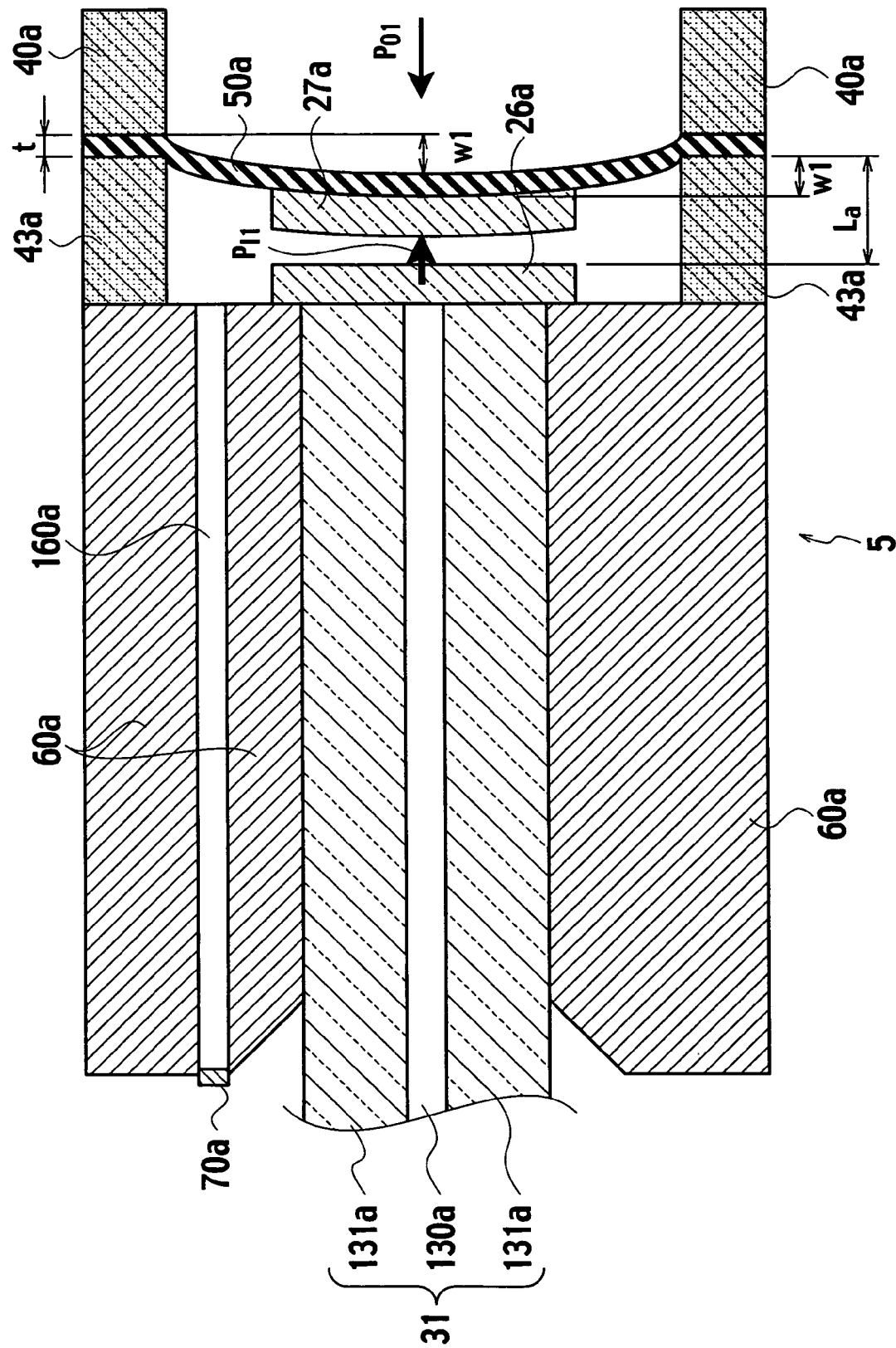
FIG. 4 is a second cross sectional view of the first transducer in accordance with the first embodiment of the present invention.
Figure 5:
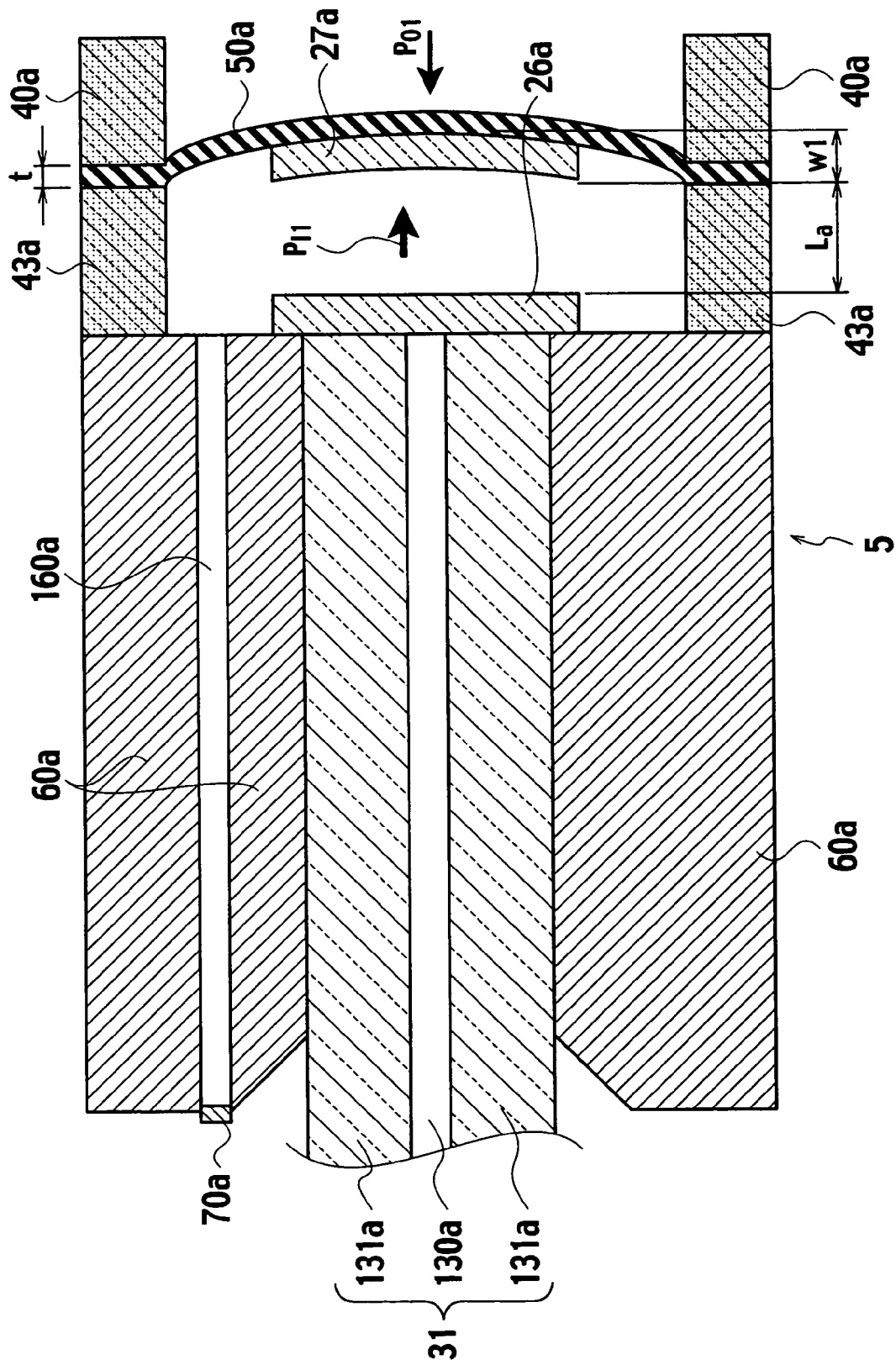
FIG. 5 is a third cross sectional view of the first transducer in accordance with the first embodiment of the present invention.

The first diaphragm 50a of the first transducer 5 is not deflected when the first internal pressure "$P_{I1}$" is equal to the first external pressure "$P_{O1}$". However, when the first external pressure "$P_{O1}$" is stronger than the first internal pressure "$P_{I1}$", the first diaphragm 50a is deflected to the interior of the first transducer 5, as shown in FIG. 4. When the first external pressure "$P_{O1}$" is weaker than the first internal pressure "$P_{I1}$", the first diaphragm 50a is deflected to the exterior of the first transducer 5, as shown in FIG. 5. When the first diaphragm 50a is exposed to the first external pressure "$P_{O1}$", as shown in FIG. 4, and the radius of the exposed first diaphragm 50a is "a", as shown in FIG. 2, the deflection "$w_1$" of the first diaphragm 50a is given by equation (1).

$$w_1=(P_{O1}-P_{I1})\times(a^2-r^2)^2/(64\times B) \tag{1}$$

Here, "r" ($r: 0 \leq r \leq a$) is a distance between the center position "M" of the first diaphragm 50a and a measuring point. "B" in the equation (1) is given by equation (2).

$$B=E\times t^3/\{12\times(1-v^2)\} \tag{2}$$

Figure 6:
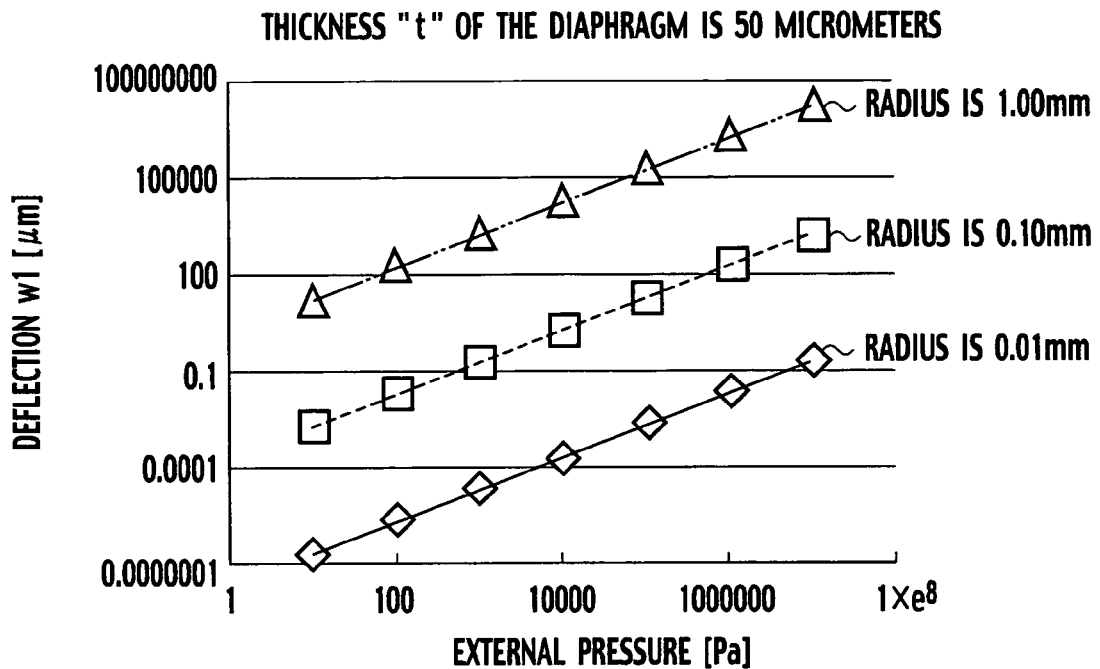
FIG. 6 is a first graph about a diaphragm in accordance with the first embodiment of the present invention.
Figure 7:
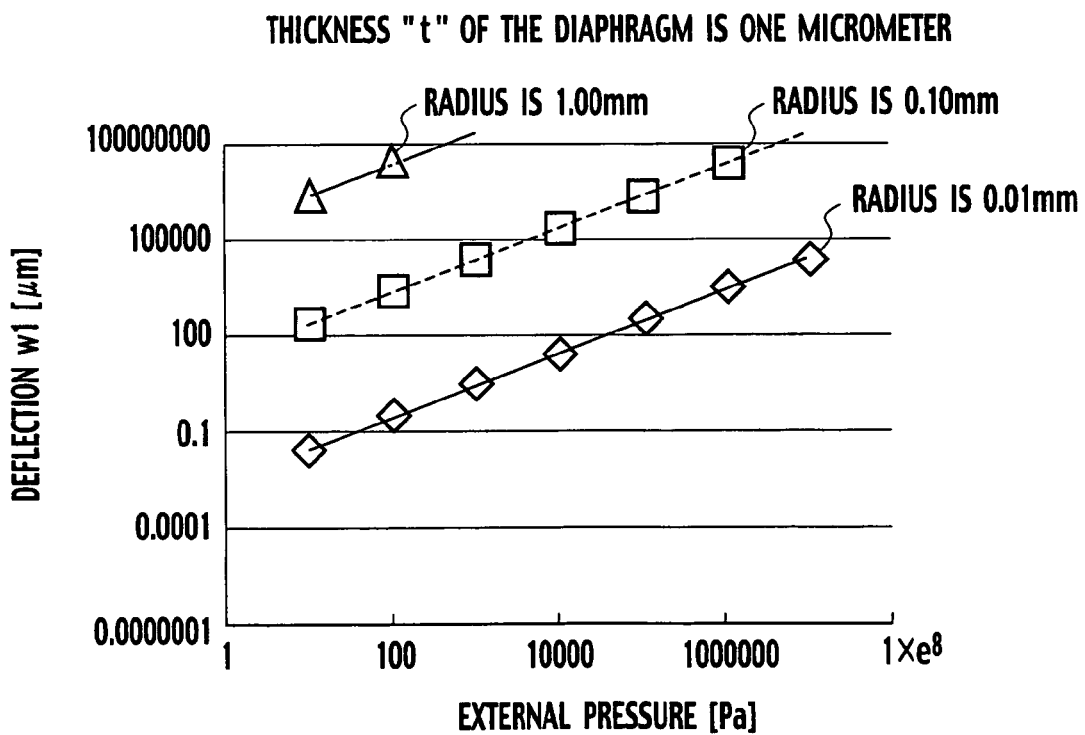
FIG. 7 is a second graph about a diaphragm in accordance with the first embodiment of the present invention.

In the equation (2), "E" is the Young's modulus of the first diaphragm 50a. "t" is a thickness of the first diaphragm 50a. "v" is the Poisson's ratio of the first diaphragm 50a. FIG. 6 is a graph showing a relationship between the first external pressure "$P_{O1}$" and the deflection "$w_1$" when the thickness "t" of the first diaphragm 50a, shown in FIGS. 3 to 5, is 50 micrometers. FIG. 6 shows results when the radius "a" of the first diaphragm 50a, shown in FIG. 2, is 0.01 mm, 0.10 mm, and 1.00 mm. FIG. 7 is a graph showing the relationship between the first external pressure "$P_{O1}$" and the deflection "$w_1$" when the thickness "t" of the first diaphragm 50a, shown in FIGS. 3 to 5, is one micrometer. FIG. 7 shows results when the radius "a" of the first diaphragm 50a, shown in FIG. 2, is 0.01 mm, 0.10 mm, and 1.00 mm. As shown in FIGS. 6 and 7, the sensitivity of the first diaphragm 50a changes, depending on the radius "a" and the thickness "t". Therefore, it is possible to provide a measurement sensitivity of the first transducer 5 suitable for a measurement range of the first external pressure "$P_{O1}$" by adjusting the radius "a" and the thickness "t" of the first diaphragm 50a.

Figure 8:
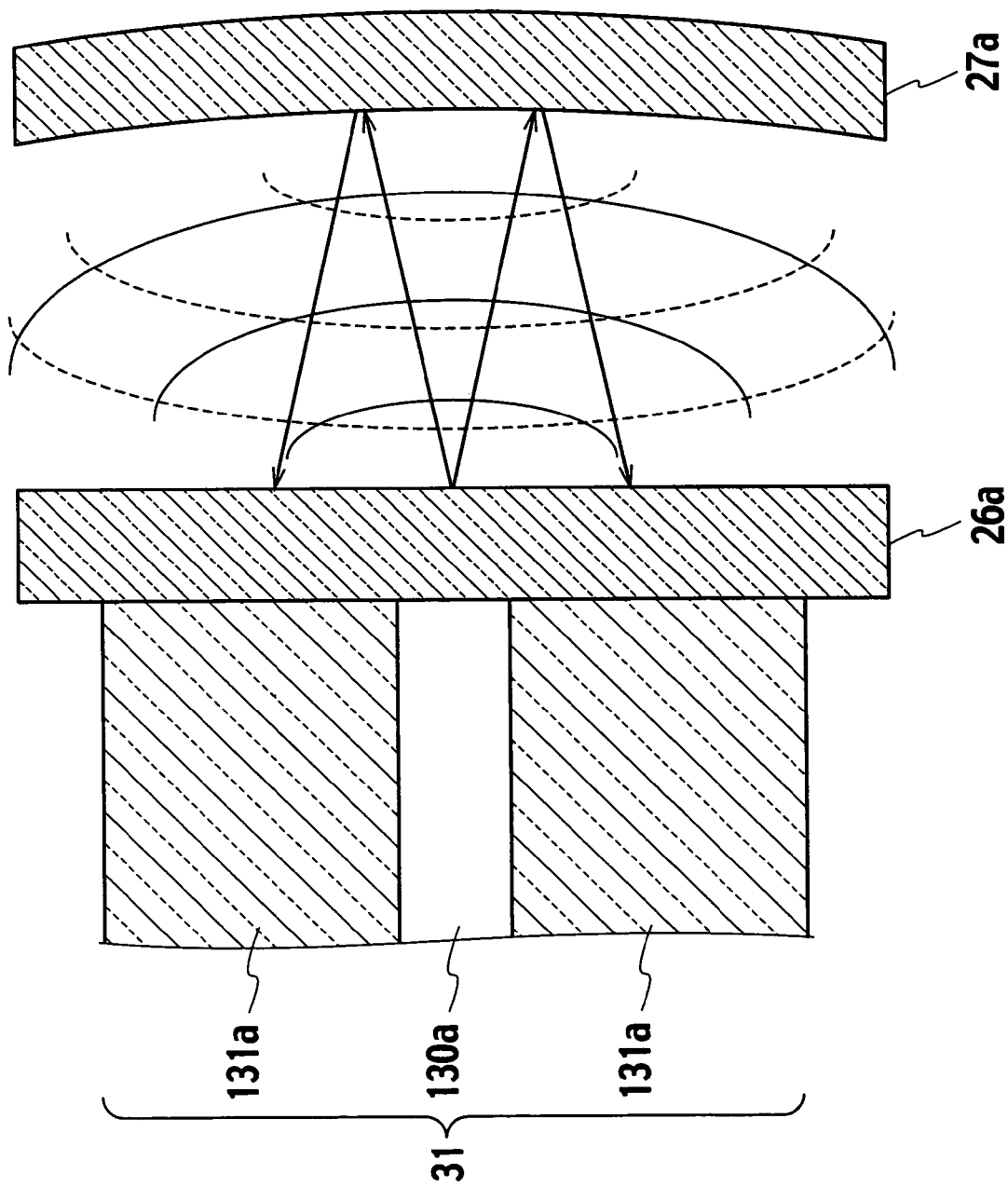
FIG. 8 is an enlarged cross sectional view of the first transducer in accordance with the first embodiment of the present invention.

With reference again to FIG. 1, the second wavelength components of the emitted light transmitted by the optical waveguide 31 are reflected by the first filter 26a. Other wavelength components of the emitted light pass through the first filter 26a. In FIG. 8, the wavelength components other than the second wavelength components radiate toward the first reflective film 27a in the first transducer 5, as shown by solid lines, because of a diffraction effect at the end of the core 130a in the optical waveguide 31. Further, the wavelength components other than the second wavelength components are reflected by the first reflective film 27a and radiate toward the first filter 26a, as shown in broken lines. Therefore, the light intensity of the wavelength components, other than the second wavelength components, per unit area is attenuated while the wavelength components travel back and forth between the first filter 26a and the first reflective film 27a. The light intensity loss of the wavelength components, other than the second wavelength components, changes as a first optical path difference "$F_1$", given by equation (3), changes.

$$F_1 = 2n_a(L_a + w_1) \quad (3)$$

Figure 9:
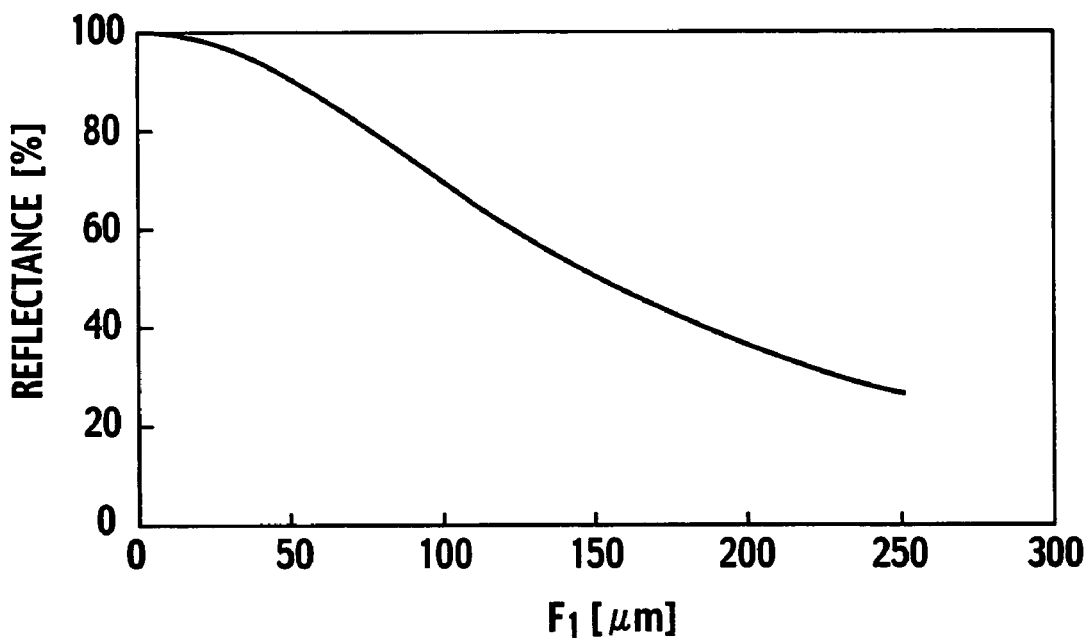
FIG. 9 is a first graph showing a reflectance of the first transducer in accordance with the first embodiment of the present invention.
Figure 10:
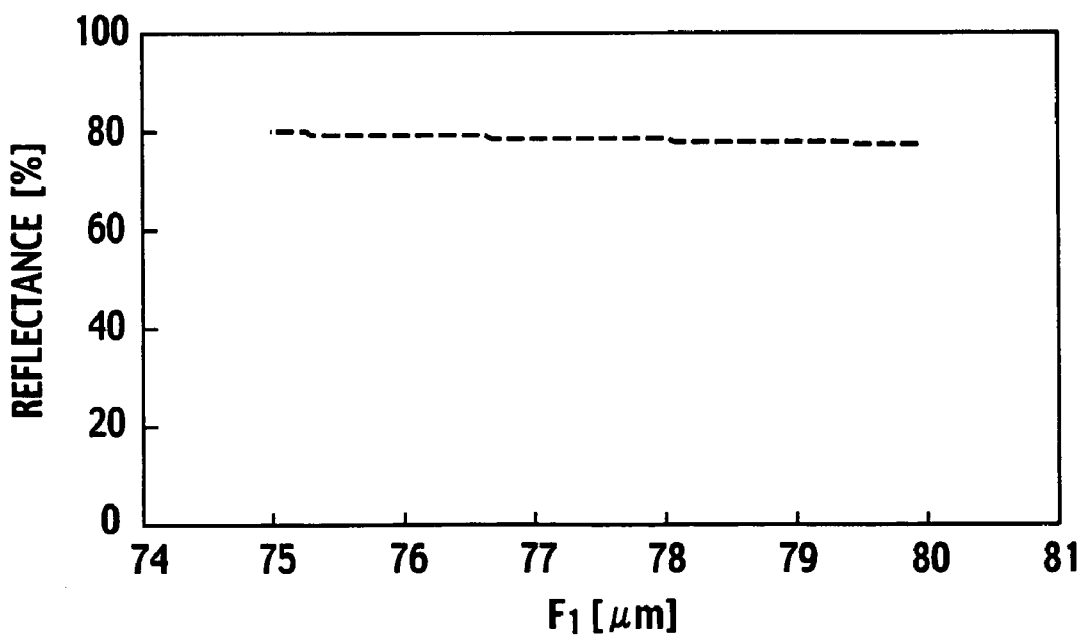
FIG. 10 is a second graph showing the reflectance of the first transducer in accordance with the first embodiment of the present invention.

FIG. 9 shows a relationship between the first optical path difference "$F_1$" and a reflectance of the first transducer 5. In FIG. 9, the reflectance of the first transducer 5 when the first optical path difference "$F_1$" is zero is assumed to be 100%. As the first optical path difference "$F_1$" is enlarged, the light intensity of the wavelength components, other than the second wavelength components, is attenuated in the first transducer 5. Consequently, the reflectance of the first transducer 5 is reduced. It should be noted that a change of the reflectance of the first transducer 5 is small if the change of the first optical path difference "$F_1$" is within +/−5 micrometers, as shown in FIG. 10. As described above, the light intensity in the wavelength range, other than the second wavelength range of the first measurement light projected into the optical waveguide 31 from the first transducer 5, will change, depending on the first external pressure "$P_{O1}$".

Figure 11:
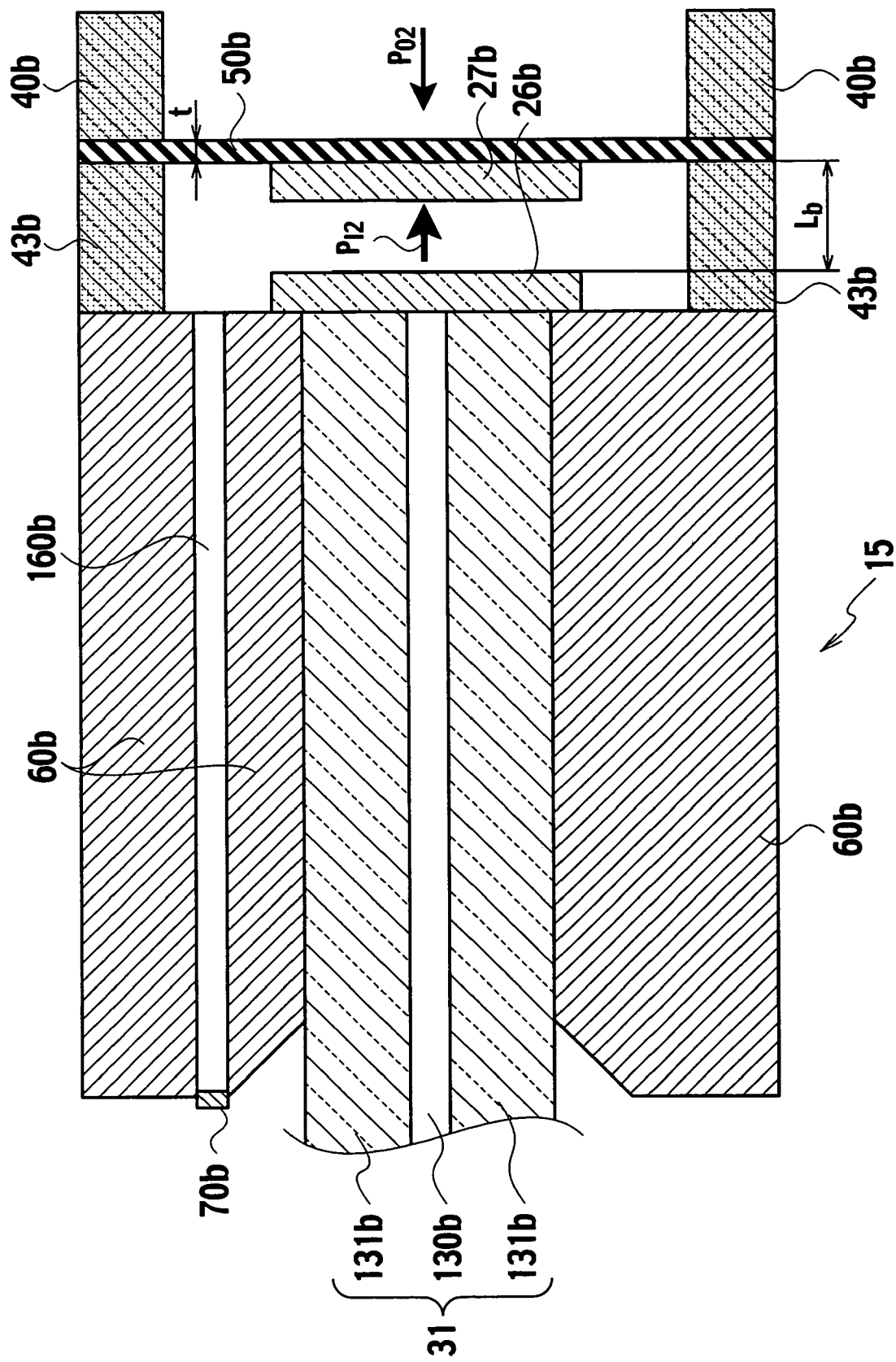
FIG. 11 is a cross sectional view of a second transducer in accordance with the first embodiment of the present invention.

With reference again to FIG. 1, the first measurement light provided from the first transducer 5 is transmitted by the optical waveguide 32 connected to the first splitter 21 and is transmitted to a second splitter 22 also connected to the optical waveguide 32. The first measurement light is transmitted by the optical waveguide 33 connected to the second splitter 22 to the second transducer 15. With reference to FIG. 11, the second transducer 15 includes a holder 60b. The optical waveguide 33 including a core 130b and a clad 131b is inserted into the holder 60b. Further, the second transducer 15 includes a second filter 26b disposed on an end face of the inserted optical waveguide 33, a second diaphragm 50b disposed parallel to the second filter 26b and exposed to the second external pressure "$P_{O2}$", and a second reflective film 27b disposed on a surface of the second diaphragm 50b opposing the second filter 26b to receive the light passing through the second filter 26b. A band-pass filter can be used for the second filter 26b, for example. A total reflection mirror can be used for the second reflective film 27b, for example. Also, the second transducer 15 includes a second frame 43b. The second frame 43b defines a second distance "$L_b$" between the second filter 26b and the second reflective film 27b. The second filter 26b only reflects first wavelength components of the first measurement light in the first wavelength range. The first wavelength range differs from the second wavelength range. Therefore, the second wavelength components in the second wavelength range reflected by the first filter 26a of the first transducer 5 pass through the second filter 26b. The first wavelength components of which the light intensity is attenuated by the first transducer 5 are reflected by the second filter 26b. Here, a refractive index of a space surrounded by the second diaphragm 50b, the second frame 43b, and the holder 60b is "$n_b$".

An inlet 160b is delineated in the holder 60b. The second transducer 15 includes a valve 70b configured to control the opening and closing of the inlet 160b to adjust the second internal pressure "$P_{I2}$" of the space surrounded by the second diaphragm 50b, the second frame 43b, and the holder 60b. Further, a second base portion 40b is disposed on the outer side of the second diaphragm 50b. The second base portion 40b defines the radius "a" of the exposed portion of the second diaphragm 50b, similar to the first base portion 40a, shown in FIG. 2. The first diaphragm 50a and the second diaphragm 50b are composed of the same materials. The first internal pressure "$P_{I1}$" in the first transducer 5 and the second internal pressure "$P_{I2}$" in the second transducer 15 are controlled to be the same. Therefore, the first transducer 5 and the second transducer 15 have the same pressure sensitivity. In the second transducer 15, the light intensity of the second wavelength components per unit area is attenuated while the second wavelength components travel back and forth between the second filter 26b and the second reflective film 27b. The light intensity loss of the second wavelength components changes as a second optical path difference "$F_2$", given by equation (4), changes. Therefore, the intensity of the second measurement light projected into the optical waveguide 33 from the second transducer 15 will change in the second wavelength range, depending on the change of the second external pressure "$P_{O2}$".

$$F_2 = 2n_b(L_b + w_2) \quad (4)$$

With reference again to FIG. 1, the second measurement light provided from the second transducer 15 is transmitted to a third splitter 23, through the optical waveguide 34 connected to the second splitter 22. The optical waveguides 35, 36 are connected to the third splitter 23. The second measurement light transmitted to the third splitter 23 is split into two directions by the third splitter 23. The split components of the second measurement light are transmitted by the optical waveguides 35, 36, respectively.

A reference filter 3 is connected to the optical waveguide 35. The reference filter 3 only transmits the second wavelength components of the second measurement light in the second wavelength range. A bandpass filter can be used for the reference filter 3, for example. The optical waveguide 37 is connected to the reference filter 3. The intensity "$Q_{D2}$" of the second wavelength components of the second measurement light transmitted by the optical waveguide 37 is detected by a reference photodetector 151. The reference photodetector 151 converts the intensity "$Q_{D2}$" of the second wavelength components of the second measurement light to electrical energy. Also, the reference photodetector 151 transmits the converted intensity "$Q_{D2}$" to the feedback circuit 8. Accordingly, in the differential pressure measuring system, the total path of the second wavelength components of the emitted light in the second wavelength range is as follows.

Figure 12:
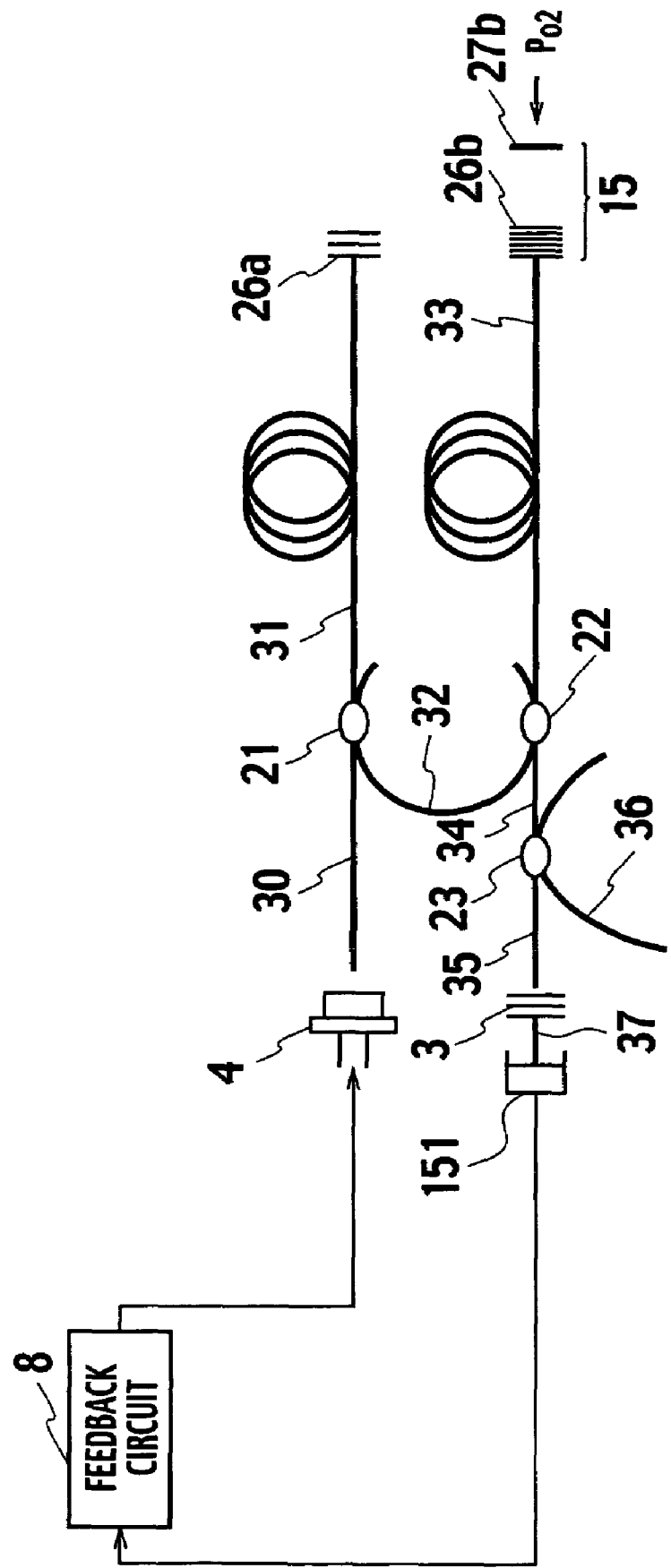
FIG. 12 is a diagram of an optical path of a second wavelength component in accordance with the first embodiment of the present invention.

With reference to FIG. 12, the emitted light including the second wavelength components is emitted from the light source 4. The second wavelength components are transmitted to the first filter 26a of the first transducer 5, through the optical waveguide 30, the first splitter 21, and the optical waveguide 31. The second wavelength components are reflected by the first filter 26a. The reflected second wavelength components are transmitted to the second filter 26b of the second transducer 15, through the optical waveguide 31, the first splitter 21, the optical waveguide 32, the second splitter 22, and the optical waveguide 33. The second wavelength components pass through the second filter 26b and are reflected by the second reflective film 27b. The reflected second wavelength components reach the second filter 26b again. As explained with reference to FIG. 8, the light intensity of the second wavelength components is attenuated, depending on the second external pressure "$P_{O2}$", while the second wavelength components travel back and forth between the second filter 26b and the second reflective film 27b. The second wavelength components pass through the second filter 26b, shown in FIG. 12, again and are transmitted to the reference filter 3, through the optical waveguide 33, the second splitter 22, the optical waveguide 34, the third splitter 23, and the optical waveguide 35. The second wavelength components pass through the reference filter 3. The second wavelength components passing through the reference filter 3 are transmitted to the reference photodetector 151, through the optical waveguide 37.

With reference again to FIG. 1, a signal filter 13 is connected to the optical waveguide 36. The signal filter 13 only transmits the first wavelength components of the second measurement light in the first wavelength range. A bandpass filter can be used for the signal filter 13, for example. The optical waveguide 38 is connected to the signal filter 13. The light intensity "$Q_{D1}$" of the first wavelength components transmitted by the optical waveguide 38 is detected by a signal photodetector 152. The signal photodetector 152 converts the light intensity "$Q_{D1}$" of the first wavelength components to electrical energy. The signal photodetector 152 transmits the converted light intensity "$Q_{D1}$" to signal processing equipment 7A. Accordingly, in the differential pressure measuring system, the total path of the first wavelength components of the emitted light in the first wavelength range is as follows.

Figure 13:
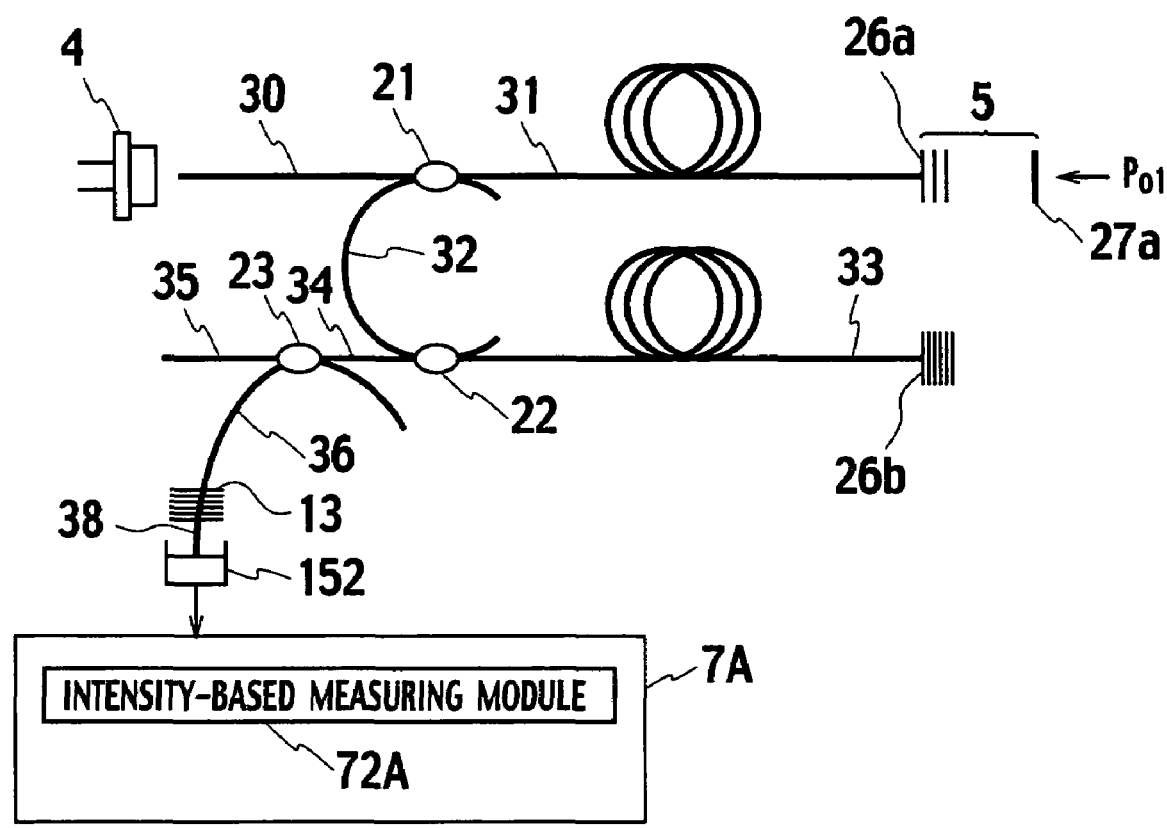
FIG. 13 is a diagram of an optical path of a first wavelength component in accordance with the first embodiment of the present invention.

With reference to FIG. 13, the emitted light including the first wavelength components is emitted from the light source 4. The first wavelength components are transmitted to the first filter 26a of the first transducer 5, through optical waveguide 30, the first splitter 21, and the optical waveguide 31. The first wavelength components pass through the first filter 26a and are reflected by the first reflective film 27a. The reflected first wavelength components penetrate the first filter 26a again. As explained with reference to FIG. 8, the light intensity of the first wavelength components is attenuated, depending on the first external pressure "$P_{O1}$", while the first wavelength components travel back and forth between the first filter 26a and the first reflective film 27a. The first wavelength components pass through the first filter 26a, shown in FIG. 13, again. The first wavelength components are transmitted to the second filter 26b of the second transducer 15, through the optical waveguide 31, the first splitter 21, the optical waveguide 32, the second splitter 22, and the optical waveguide 33. The first wavelength components are reflected by the second filter 26b. The reflected first wavelength components are transmitted to the signal filter 13, through the optical waveguide 33, the second splitter 22, the optical waveguide 34, the third splitter 23, and the optical waveguide 36. The first wavelength components pass through the signal filter 13. The first wavelength components passing through the signal filter 13 are transmitted to the signal photodetector 152, through the optical waveguide 38.

With reference again to FIG. 1, the feedback circuit 8 receives the intensity "$Q_{D2}$" of the second wavelength components of the second measurement light that is converted to electrical energy by the reference photodetector 151. Further, the feedback circuit 8 adjusts the intensity "$Q_S$" of the light emitted from the light source 4 in order to maintain the light intensity "$Q_{D2}$" of the second wavelength components detected by the reference photodetector 151 constant. Signal processing equipment 7A, including the intensity-based measuring module 72A, is connected to the reference photodetector 151 and the signal photodetector 152. The intensity-based measuring module 72A calculates the differential pressure ($|P_{O1}-P_{O2}|$) between the first external pressure "$P_{O1}$" and the second external pressure "$P_{O2}$", based on the intensity "$Q_{D1}$" of the first wavelength components of the second measurement light and the intensity "$Q_{D2}$" of the second wavelength components of the second measurement light.

For example, the intensity-based measuring module 72A prepares a relational equation showing a relationship between the differential pressure ($|P_{O1}-P_{O2}|$) and the ratio of the light intensity "$Q_{D1}$" of the first wavelength components detected by the signal photodetector 152 to the constant light intensity "$Q_{D2}$" of the second wavelength components maintained by the feedback circuit 8. It is possible to calculate the differential pressure ($|P_{O1}-P_{O2}|$) between the first external pressure "$P_{O1}$" and the second external pressure "$P_{O2}$" by assigning a value of the light intensity "$Q_{D1}$", of the first wavelength components, detected by the signal photodetector 152 to a variable of the light intensity "$Q_{D1}$" in the relational equation. A method for measuring the differential pressure ($|P_{O1}-P_{O2}|$) between the first external pressure "$P_{O1}$" and the second external pressure "$P_{O2}$" by the intensity-based measuring module 72A is explained below.

Figure 14:
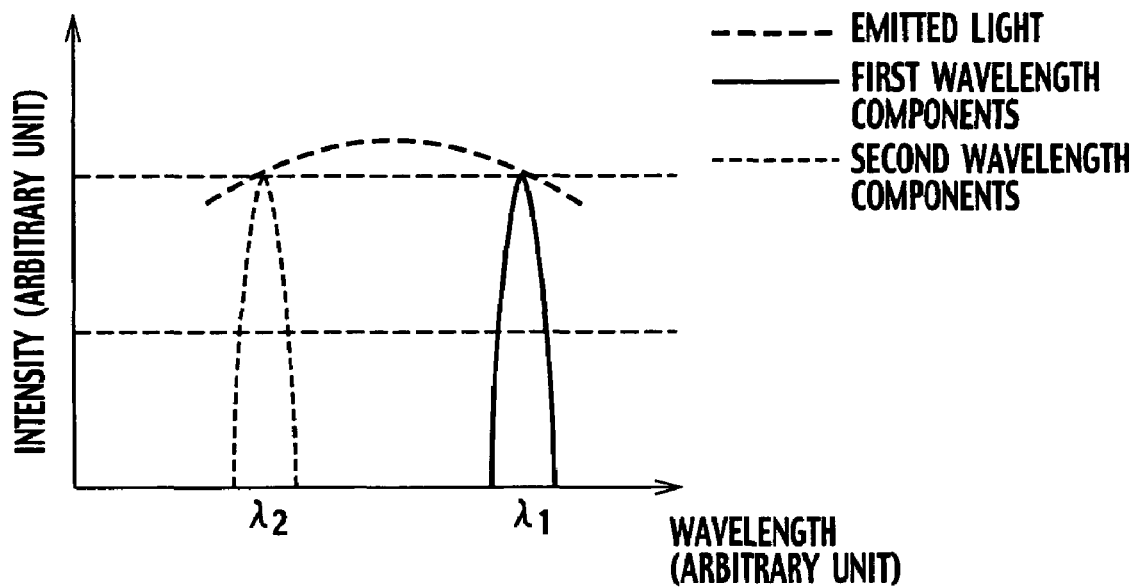
FIG. 14 is a first graph showing light intensities of wavelength components in accordance with the first embodiment of the present invention.
Figure 15:
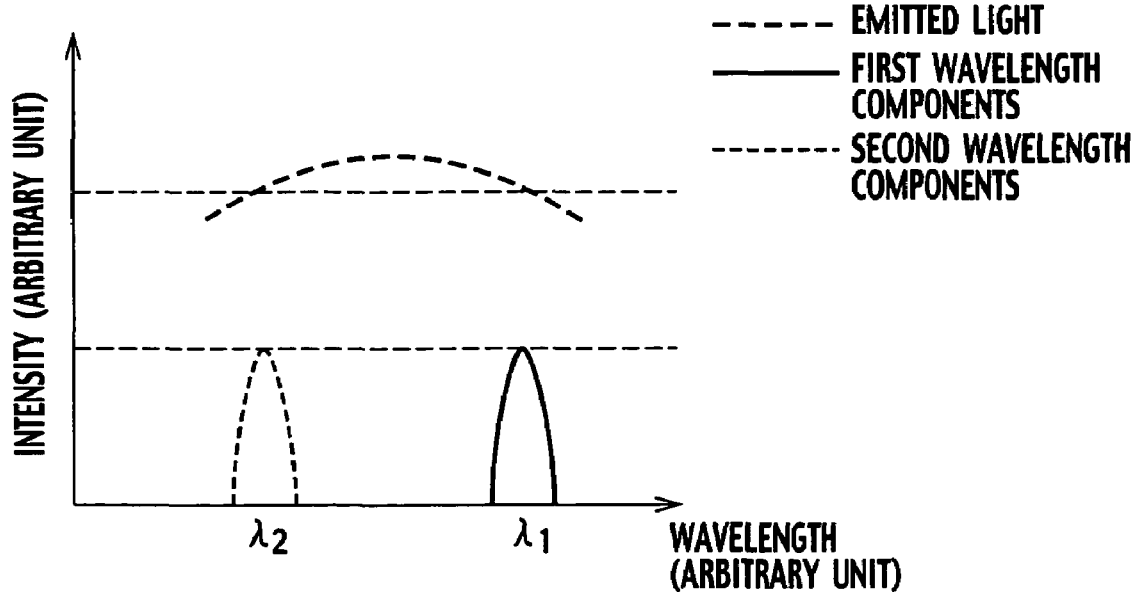
FIG. 15 is a second graph showing the light intensities of the wavelength components in accordance with the first embodiment of the present invention.
Figure 16:
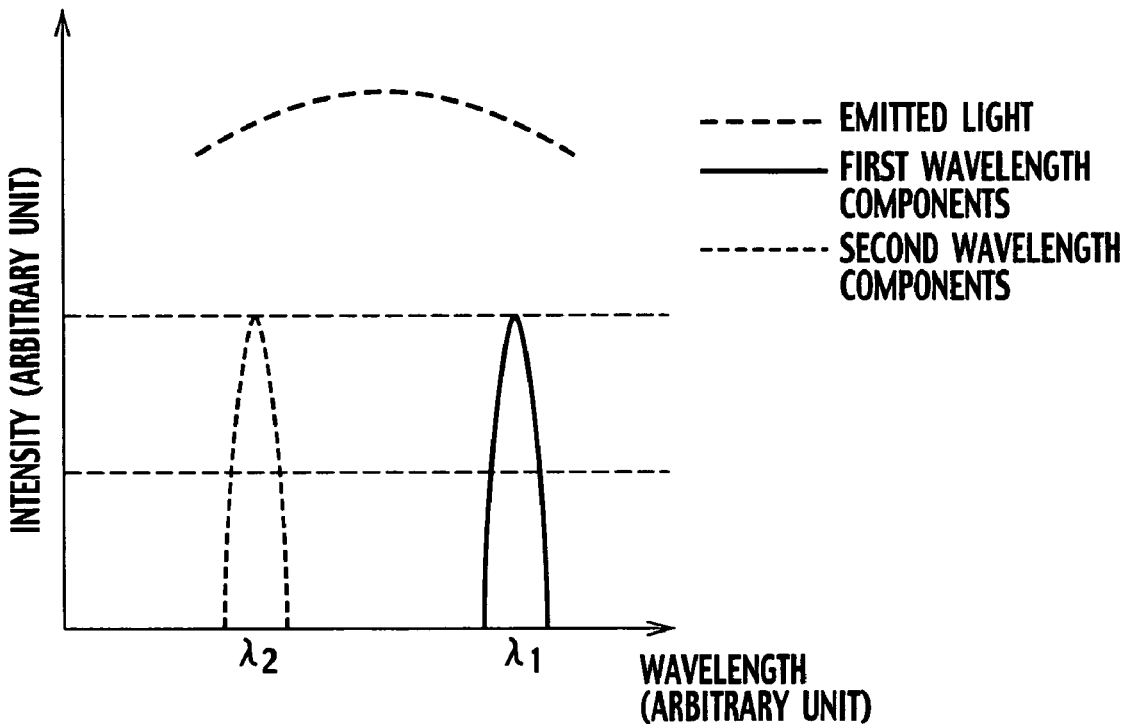
FIG. 16 is a third graph showing the light intensities of the wavelength components in accordance with the first embodiment of the present invention.

A case is assumed in which the differential pressure ($|P_{O1}-P_{O2}|$) between the first external pressure "$P_{O1}$" and the second external pressure "$P_{O2}$" is zero, and the light intensity "$Q_{D1}$" of the first wavelength components detected by the signal photodetector 152 and the light intensity "$Q_{D2}$" of the second wavelength components detected by the reference photodetector 151 are equal in an initial state, as shown in FIG. 14. When the light intensity "$Q_{D1}$" of the first wavelength components and the light intensity "$Q_{D2}$" of the second wavelength components are equal, the intensity-based measuring module 72A, shown in FIG. 1, recognizes that the differential pressure ($|P_{O1}-P_{O2}|$) between the first external pressure "$P_{O1}$" and the second external pressure "$P_{O2}$" is zero. When the transmission efficiencies of the optical waveguides 30-38 are reduced by ambient environmental factors, for example, the light intensity "$Q_{D1}$" of the first wavelength components detected by the signal photodetector 152 and the light intensity "$Q_{D2}$" of the second wavelength components detected by the reference photodetector 151 are reduced equivalently, as shown in FIG. 15. In this case, the feedback circuit 8, shown in FIG. 1, increases the intensity "$Q_S$" of the emitted light, as shown in FIG. 16, in order to make the light intensity "$Q_{D2}$" of the second wavelength components detected by the reference photodetector 151 the same as the light intensity "$Q_{D2}$" in the initial state shown in FIG. 14. The light intensity "$Q_{D1}$" of the first wavelength components detected by the signal photodetector 152 is increased as the intensity "$Q_S$" of the emitted light is increased. Therefore, the light intensity "$Q_{D1}$" of the first wavelength components and the light intensity "$Q_{D2}$" of the second wavelength components are equal after operation of the feedback circuit 8. Accordingly, the intensity-based measuring module 72A, shown in FIG. 1, recognizes that the differential pressure ($|P_{O1}-P_{O2}|$) between the first external pressure "$P_{O1}$" and the second external pressure "$P_{O2}$" is zero, after operation of the feedback circuit 8.

Figure 17:
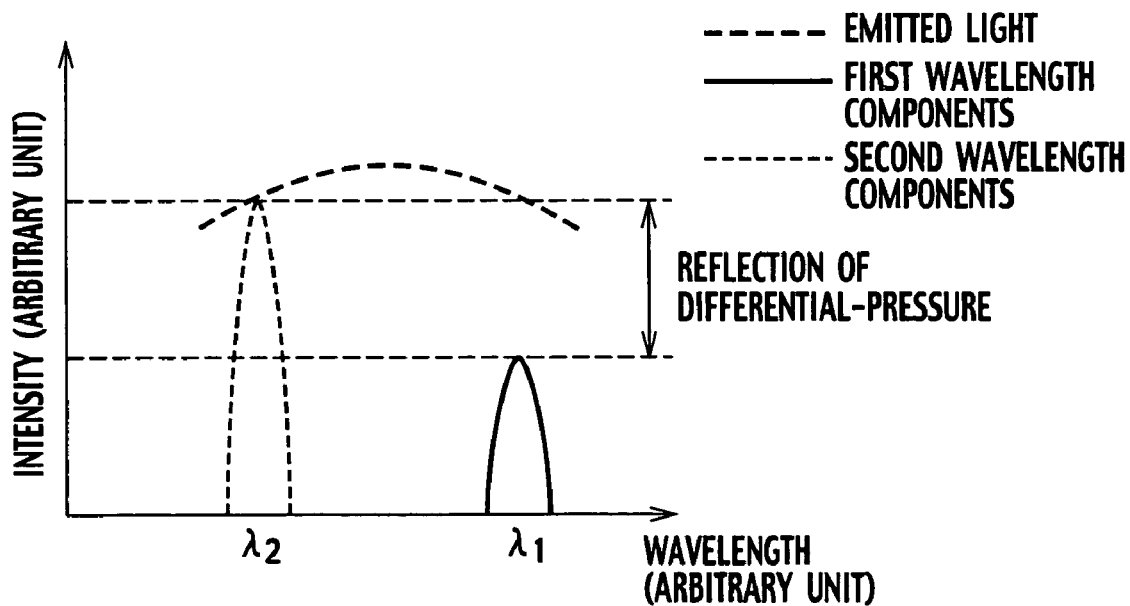
FIG. 17 is a fourth graph showing the light intensities of the wavelength components in accordance with the first embodiment of the present invention.

When the second external pressure "$P_{O2}$", the intensity "$Q_S$" of the emitted light, and the transmission efficiencies of the optical waveguides 30-38 are constant and the first external pressure "$P_{O1}$" is reduced from the initial state shown in FIG. 14, the light intensity of the first wavelength components is attenuated in the first transducer 5. Therefore, the light intensity "$Q_{D1}$" of the first wavelength components detected by the signal photodetector 152 is reduced, as shown in FIG. 17. In this case, the light intensity "$Q_{D2}$" of the second wavelength components detected by the reference photodetector 151 is stable from the initial state. Therefore, the feedback circuit 8, shown in FIG. 1, does not operate. Accordingly, the intensity-based measuring module 72A calculates the differential pressure ($|P_{O1}-P_{O2}|$) between the first external pressure "$P_{O1}$" and the second external pressure "$P_{O2}$", based on the ratio of the light intensity "$Q_{D1}$" of the first wavelength components to the light intensity "$Q_{D2}$" of the second wavelength components, as shown in FIG. 17.

Figure 18:
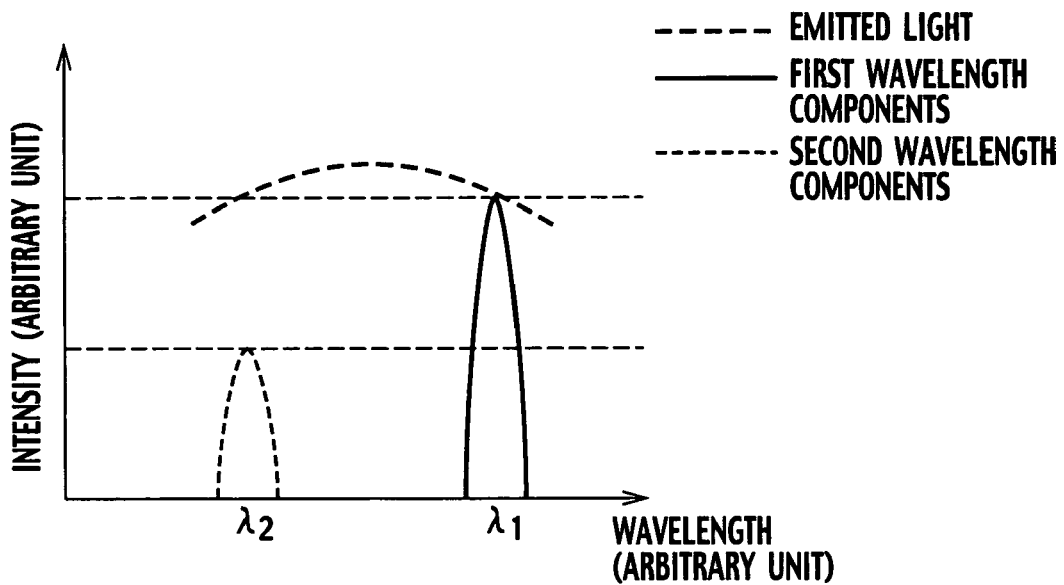
FIG. 18 is a fifth graph showing the light intensities of the wavelength components in accordance with the first embodiment of the present invention.
Figure 19:
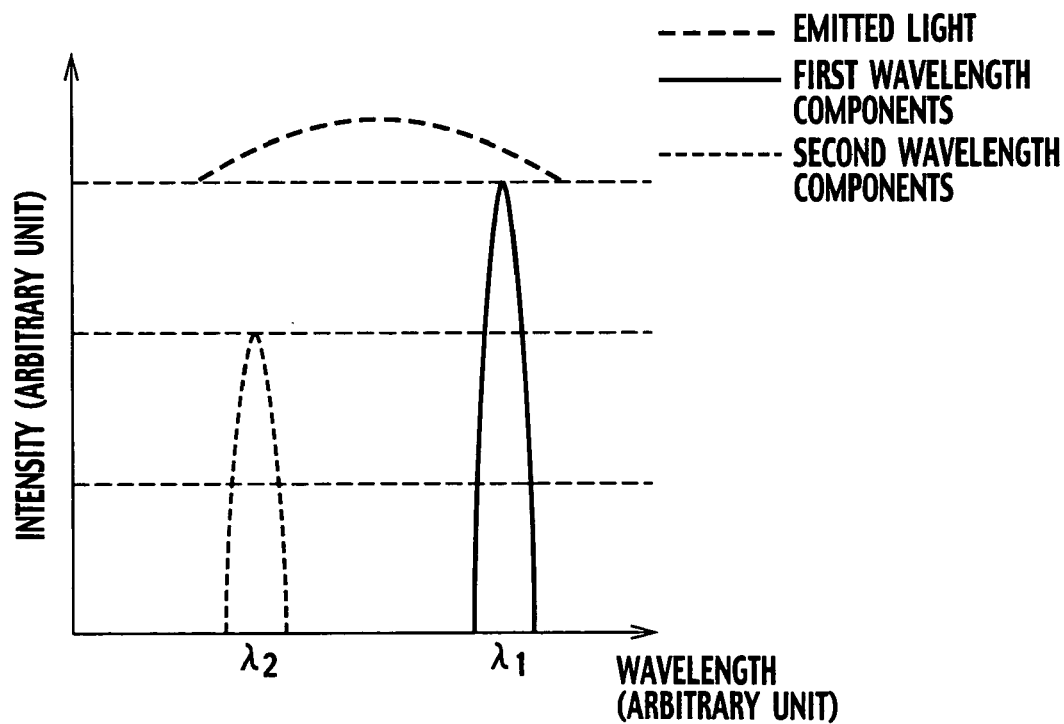
FIG. 19 is a sixth graph showing the light intensities of the wavelength components in accordance with the first embodiment of the present invention.

When the first external pressure "$P_{O1}$", the intensity "$Q_S$" of the emitted light, and the transmission efficiencies of the optical waveguides 30-38 are constant and the second external pressure "$P_{O2}$" is reduced from the initial state shown in FIG. 14, the light intensity of the second wavelength components is attenuated in the second transducer 15. Therefore, the light intensity "$Q_{D2}$" of the second wavelength components detected by the reference photodetector 151 is reduced, as shown in FIG. 18. In this case, the feedback circuit 8, shown in FIG. 1, increases the intensity "$Q_S$" of the emitted light, as shown in FIG. 19, in order to make the light intensity "$Q_{D2}$" of the second wavelength components detected by the reference photodetector 151 the same as the light intensity "$Q_{D2}$" in the initial state, shown in FIG. 14. The light intensity "$Q_{D1}$" of the first wavelength components detected by the signal photodetector 152 is increased as the intensity "$Q_S$" of the emitted light is increased. The intensity-based measuring module 72A calculates the differential pressure ($|P_{O1}-P_{O2}|$) between the first external pressure "$P_{O1}$" and the second external pressure "$P_{O2}$", based on the ratio of the light intensity "$Q_{D1}$" of the first wavelength components to the light intensity "$Q_{D2}$" of the second wavelength components, as shown in FIG. 19.

Figure 20:
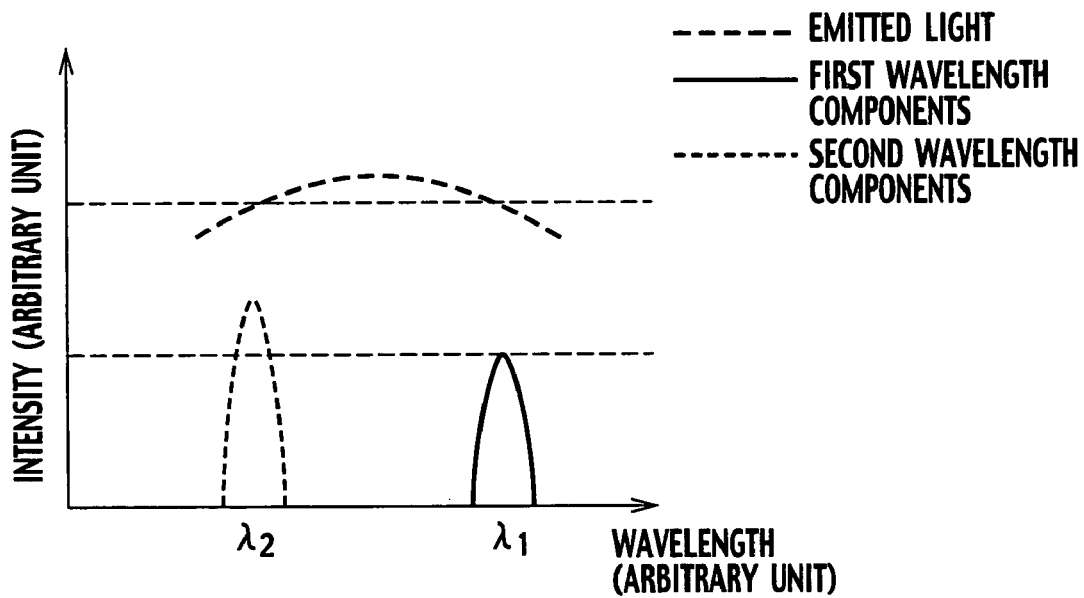
FIG. 20 is a seventh graph showing the light intensities of the wavelength components in accordance with the first embodiment of the present invention.
Figure 21:
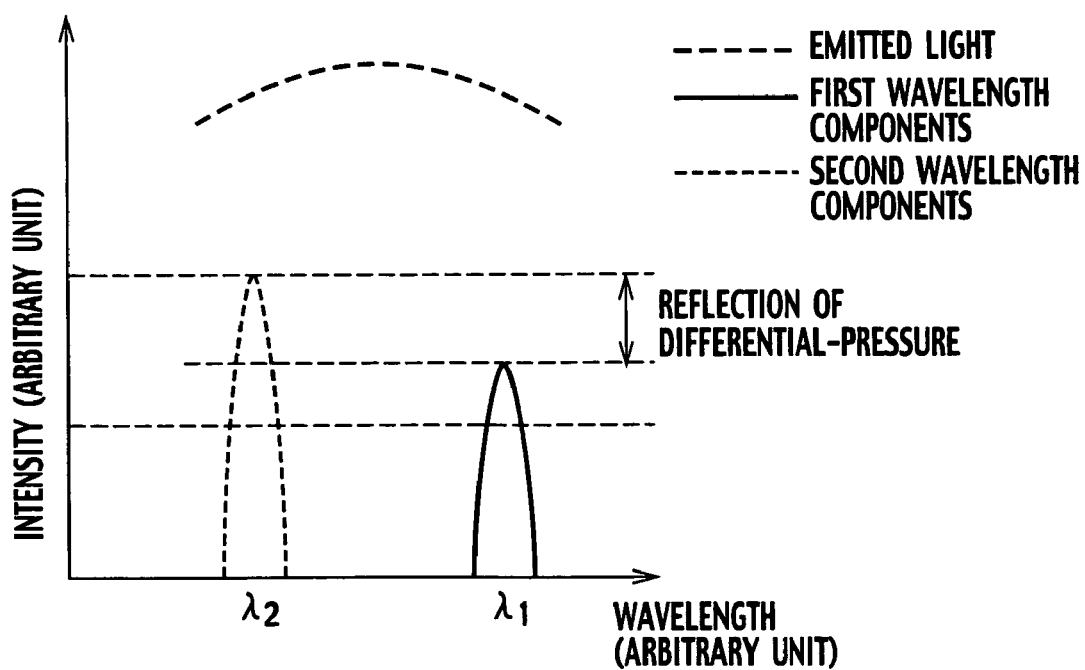
FIG. 21 is an eighth graph showing the light intensities of the wavelength components in accordance with the first embodiment of the present invention.

When the intensity "$Q_S$" of the emitted light is constant, and the first external pressure "$P_{O1}$", the second external pressure "$P_{O2}$", and the transmission efficiencies of the optical waveguides 30-38 are reduced from the initial state shown in FIG. 14, the light intensity of the first wavelength components is attenuated in the first transducer 5 and the light intensity of the second wavelength components is attenuated in the second transducer 15. Therefore, the light intensity "$Q_{D1}$" of the first wavelength components detected by the signal photodetector 152 and the light intensity "$Q_{D2}$" of the second wavelength components detected by the reference photodetector 151 are reduced, as shown in FIG. 20. In this case, the feedback circuit 8, shown in FIG. 1, increases the intensity "$Q_S$" of the emitted light, as shown in FIG. 21, in order to make the light intensity "$Q_{D2}$" of the second wavelength components detected by the reference photodetector 151 the same as the light intensity "$Q_{D2}$" in the initial state shown in FIG. 14. The light intensity "$Q_{D1}$" of the first wavelength components detected by the signal photodetector 152 is increased as the intensity "$Q_S$" of the emitted light is increased. The intensity-based measuring module 72A calculates the differential pressure ($|P_{O1}-P_{O2}|$) between the first external pressure "$P_{O1}$" and the second external pressure "$P_{O2}$", based on the ratio of the light intensity "$Q_{D1}$" of the first wavelength components to the light intensity "$Q_{D2}$" of the second wavelength components, as shown in FIG. 21.

Figure 22:
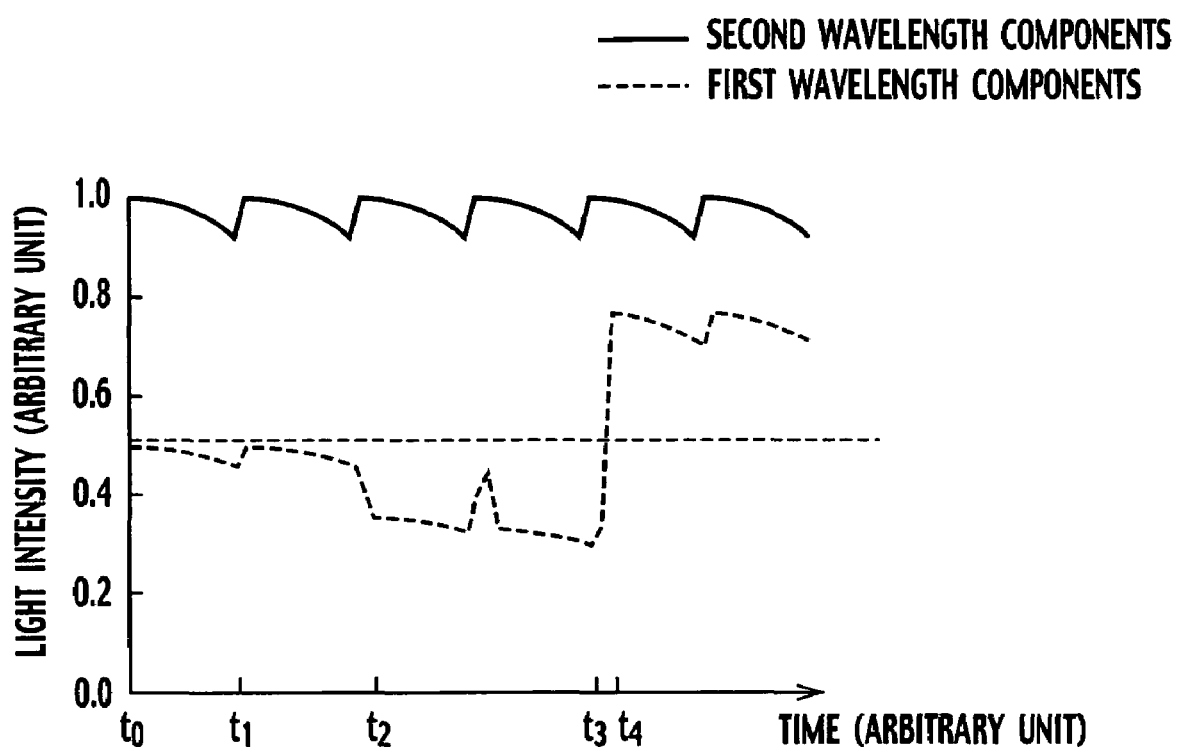
FIG. 22 is a graph of the light intensities of the wavelength components versus time in accordance with the first embodiment of the present invention.

In FIG. 22, the differential pressure ($|P_{O1}-P_{O2}|$) between the first external pressure "$P_{O1}$" and the second external pressure "$P_{O2}$" is stable at time "$t_0$". Then, the intensity "$Q_S$" of the emitted light is attenuated by the drift of the optical axis of the light source 4 or the fluctuation of the emission power of the light source 4. Accordingly, the light intensity "$Q_{D1}$" of the first wavelength components detected by the signal photodetector 152 and the light intensity "$Q_{D2}$" of the second wavelength components detected by the reference photodetector 151 are reduced from time "$t_0$" to time "$t_1$". In time "$t_1$", the feedback circuit 8 adjusts the intensity "$Q_S$" of the emitted light to change the light intensity "$Q_{D2}$" of the second wavelength components detected by the reference photodetector 151 back to 1.0. By adjusting the intensity "$Q_S$" of the emitted light, the light intensity "$Q_{D1}$" of the first wavelength components detected by the signal photodetector 152 is also changed back to 0.5, the same as at time "$t_0$". The first external pressure "$P_{O1}$" is reduced from time "$t_2$" to time "$t_3$". Therefore, the light intensity "$Q_{D1}$" of the first wavelength components detected by the signal photodetector 152 is reduced. At time "$t_4$", the first external pressure "$P_{O1}$" is increased. Consequently, the first optical path difference "$F_1$" is shortened. Therefore, the light intensity "$Q_{D1}$" of the first wavelength components detected by the signal photodetector 152 is increased. If the differential pressure measuring system shown in FIG. 1 does not include the feedback circuit 8, the light intensity "$Q_{D1}$" of the first wavelength components detected by the signal photodetector 152 may become too weak to be detected from time "$t_2$" to time "$t_3$". However, the differential pressure measuring system includes the feedback circuit 8. Therefore, if the intensity "$Q_S$" of the emitted light is attenuated by the drift of the optical axis of the light source 4 or the fluctuation of the emission power of the light source 4, the light intensity "$Q_{D1}$" of the first wavelength components does not become too weak to be detected. Therefore, it is possible to continue the calculation of the differential pressure ($|P_{O1}-P_{O2}|$) between the first external pressure "$P_{O1}$" and the second external pressure "$P_{O2}$", even though the intensity "$Q_S$" of the emitted light is attenuated.

A data memory 170A is connected to the signal processing equipment 7A. The data memory 170A includes a light intensity memory module 272A, an equation memory module 275A, and a differential pressure memory module 276A. The light intensity memory module 272A stores the light intensity "$Q_{D1}$" of the first wavelength components of the second measurement light detected by the signal photodetector 152. Also, the light intensity memory module 272A stores the light intensity "$Q_{D2}$" of the second wavelength components of the second measurement light detected by the reference photodetector 151. The equation memory module 275A stores the preinstalled relational equation showing the relationship between the differential pressure ($|P_{O1}-P_{O2}|$) and the ratio of the light intensity "$Q_{D1}$" of the first wavelength components to the constant light intensity "$Q_{D2}$" of the second wavelength components maintained by the feedback circuit 8. The differential pressure memory module 276A stores the differential pressure ($|P_{O1}-P_{O2}|$) between the first external pressure "$P_{O1}$" and the second external pressure "$P_{O2}$" calculated by the intensity-based measuring module 72A.

Figure 23:
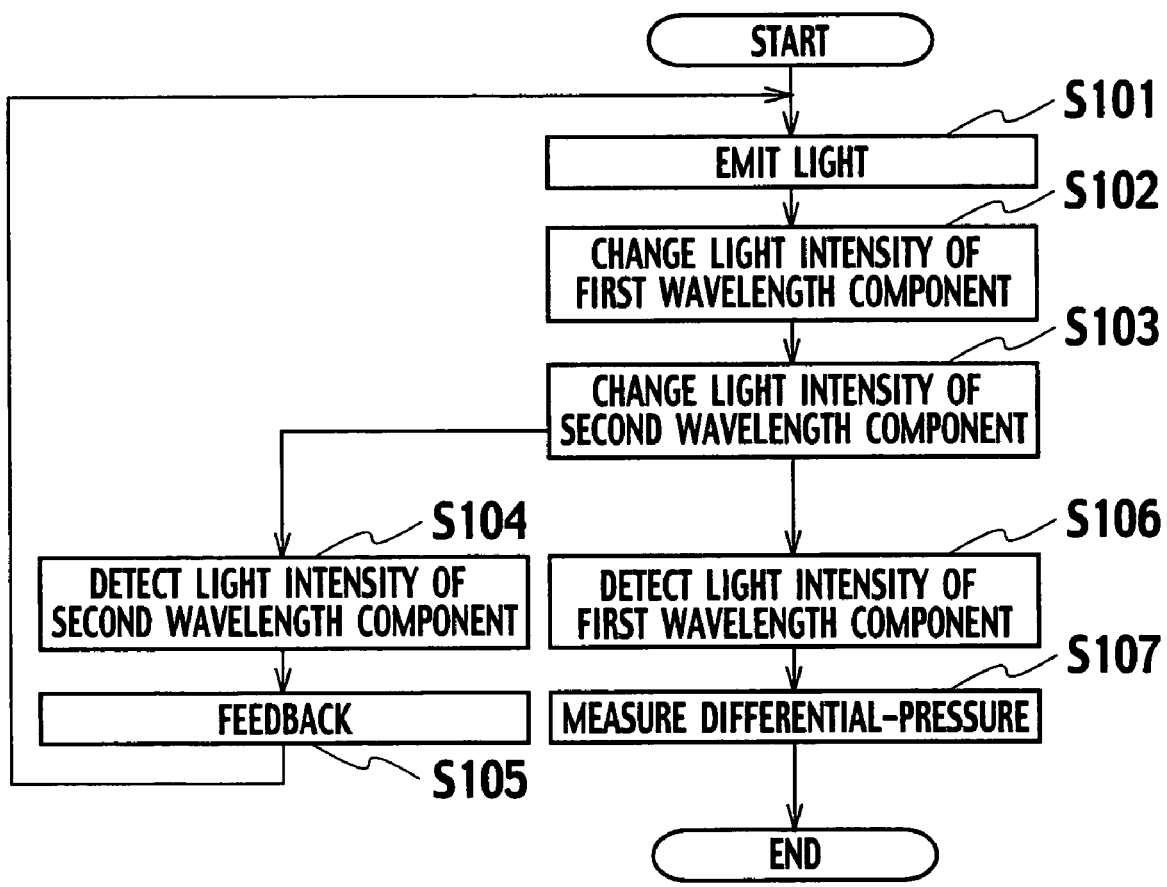
FIG. 23 is a flowchart depicting a differential pressure measuring method in accordance with the first embodiment of the present invention.

With reference next to FIG. 23, a differential pressure measuring method according to the first embodiment of the present invention is described.

In step S101, the light having a wide spectrum range is emitted from the light source 4, shown in FIG. 1, to the optical waveguide 30. The emitted light is transmitted to the first filter 26a, through the optical waveguide 30, the first splitter 21, and the optical waveguide 32. The second wavelength components in the second wavelength range are reflected by the first filter 26a. In step S102, the first wavelength components in the first wavelength range pass through the first filter 26a and are reflected by the first reflective film 27a. Thereafter, the first wavelength components pass through the first filter 26a again. The light intensity of the first wavelength components is changed, depending on the change of the first optical path difference "$F_1$" of the first transducer 5 exposed to the first external pressure "$P_{O1}$".

In step S103, the first measurement light including the second wavelength components reflected by the first filter 26a and the first wavelength components traveling back and forth in the first transducer 5 is transmitted to the second transducer 15, through the optical waveguide 31, the first splitter 21, the optical waveguide 32, the second splitter 22, and the optical waveguide 33. The first wavelength components are reflected by the second filter 26b of the second transducer 15. The second wavelength components pass through the second filter 26b and are reflected by the second reflective film 27b. Thereafter, the second wavelength components pass through the second filter 26b again. The light intensity of the second wavelength components is changed, depending on the change of the second optical path difference "$F_2$" of the second transducer 15 exposed to the second external pressure "$P_{O2}$".

In step S104, the second measurement light including the first wavelength components reflected by the second filter 26b and the second wavelength components traveling back and forth in the second transducer 15 is transmitted to the third splitter 23, through the optical waveguide 33, the second splitter 22, and the optical waveguide 34. The second measurement light is split into two directions by the third splitter 23. One of the split, second measurement lights is transmitted by the optical waveguide 35. Another one of the split, second measurement lights is transmitted by the optical waveguide 36. Only the second wavelength components of the second measurement light transmitted by the optical waveguide 35 pass through the reference filter 3. The second wavelength components of the second measurement light are transmitted by the optical waveguide 37 and are detected by the reference photodetector 151. The reference photodetector 151 converts the light intensity "$Q_{D2}$" of the second wavelength components to electrical energy. Then, the reference photodetector 151 transfers the converted light intensity "$Q_{D2}$" to the feedback circuit 8.

In step S105, the feedback circuit 8 adjusts the intensity "$Q_S$" of the light emitted from the light source 4 in order to maintain the intensity "$Q_{D2}$" of the second wavelength components of the second measurement light constant. The reference photodetector 151 transfers the adjusted intensity "$Q_{D2}$" of the second wavelength components of the second measurement light to the intensity-based measuring module 72A. The intensity-based measuring module 72A stores the light intensity "$Q_{D2}$" of the second wavelength components in the light intensity memory module 272A.

In step S106, only the first wavelength components of the second measurement light transmitted by the optical waveguide 36 pass through the signal filter 13. The first wavelength components of the second measurement light are transmitted by the optical waveguide 38 and are detected by the signal photodetector 152. The signal photodetector 152 converts the intensity "$Q_{D1}$" of the first wavelength components of the second measurement light to electrical energy. Then, the signal photodetector 152 transfers the converted light intensity "$Q_{D1}$" to the signal processing equipment 7A. The intensity-based measuring module 72A stores the intensity "$Q_{D1}$" of the first wavelength components of the second measurement light in the light intensity memory module 272A.

In step S107, the intensity-based measuring module 72A retrieves the intensity "$Q_{D1}$" of the first wavelength components of the second measurement light and the intensity "$Q_{D2}$" of the second wavelength components of the second measurement light from the light intensity memory module 272A. Then, the intensity-based measuring module 72A retrieves the preinstalled relational equation showing the relationship between the differential pressure ($|P_{O1}-P_{O2}|$) and the ratio of the light intensity "$Q_{D1}$" of the first wavelength components to the constant light intensity "$Q_{D2}$" of the second wavelength components maintained by the feedback circuit 8 from the equation memory module 275A. The intensity-based measuring module 72A verifies whether the light intensity "$Q_{D2}$" of the second wavelength components adopted for the relational equation is equal to the light intensity "$Q_{D2}$" of the second wavelength components detected by the reference photodetector 151. Thereafter, the intensity-based measuring module 72A assigns the value of the intensity "$Q_{D1}$" of the first wavelength components of the second measurement light detected by the signal photodetector 152 to the variable of the light intensity "$Q_{D1}$" of the first wavelength components in the relational equation to calculate the differential pressure ($|P_{O1}-P_{O2}|$) between the first external pressure "$P_{O1}$" and the second external pressure "$P_{O2}$". The intensity-based measuring module 72A stores the calculated differential pressure ($|P_{O1}-P_{O2}|$) between the first external pressure "$P_{O1}$" and the second external pressure "$P_{O2}$" in the differential pressure memory module 276A, and the differential pressure measuring method is completed.

In the above described embodiment, the light intensity "$Q_{D2}$" of the second wavelength components detected by the reference photodetector 151 is maintained constant to calculate the differential pressure ($|P_{O1}-P_{O2}|$) between the first external pressure "$P_{O1}$" and the second external pressure "$P_{O2}$". However, maintaining the intensity "$Q_{D1}$" of the first wavelength components of the second measurement light constant by use of the feedback circuit 8 is an alternative. In this case, the reference filter 3 only transmits the first wavelength components. The reference photodetector 151 detects the first wavelength components. The signal filter 13 only transmits the second wavelength components. The signal photodetector 152 detects the light intensity "$Q_{D2}$" Of the second wavelength components. By preparing a relational equation showing the relationship between the differential pressure ($|P_{O1}-P_{O2}|$) and the ratio of the light intensity "$Q_{D2}$" of the second wavelength components detected by the signal photodetector 152 to the constant light intensity "$Q_{D1}$" of the first wavelength components maintained by the feedback circuit 8, it is possible to calculate the differential pressure ($|P_{O1}-P_{O2}|$) between the first external pressure "$P_{O1}$" and the second external pressure "$P_{O2}$" from the light intensity "$Q_{D2}$" of the second wavelength components detected by the signal photodetector 152.

Modification of the First Embodiment

In FIG. 1, it is explained that the total reflection mirror can be used for the first reflective film 27a and the second reflective film 27b. However, using same optical elements that reflect the second wavelength components for the first filter 26a and the second reflective film 27b is an alternative. In this case, same optical elements that reflect the first wavelength components can be used for the second filter 26b and the first reflective film 27a. The shapes of the reflection spectrums of the first filter 26a, the second reflective film 27b, the second filter 26b, and the first reflective film 27a are congruent.

Figure 24:
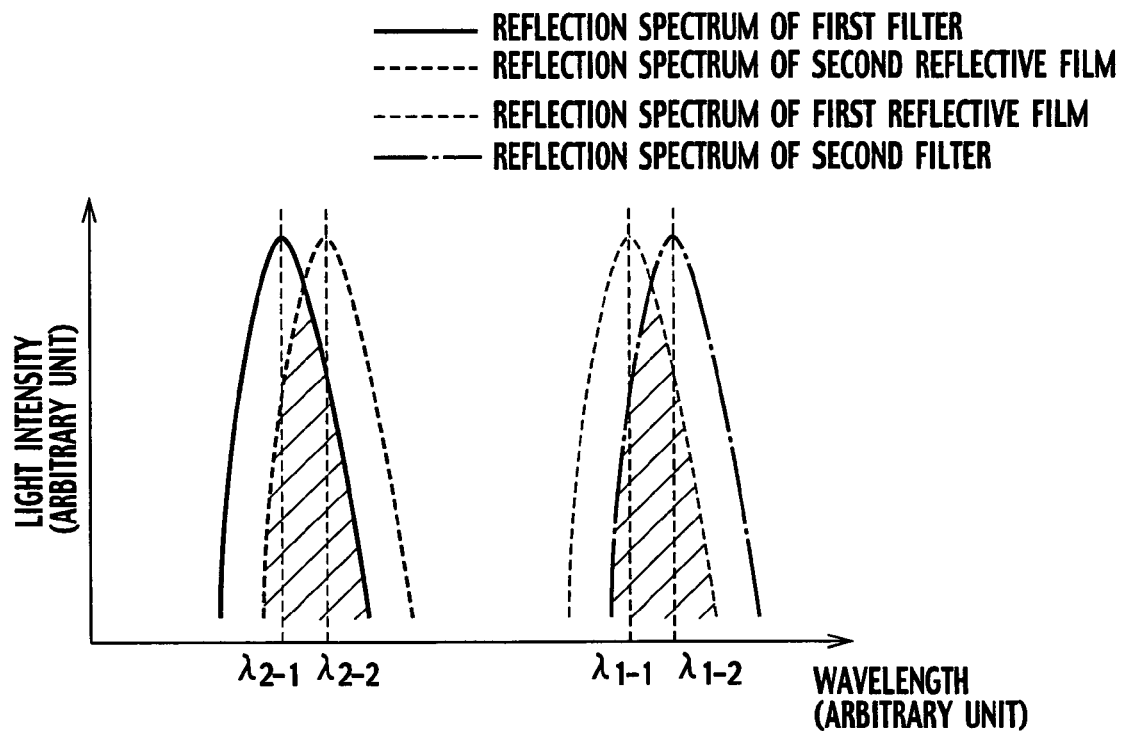
FIG. 24 shows first reflectance spectrums of the first and second transducers in accordance with a modification of the first embodiment of the present invention.
Figure 25:
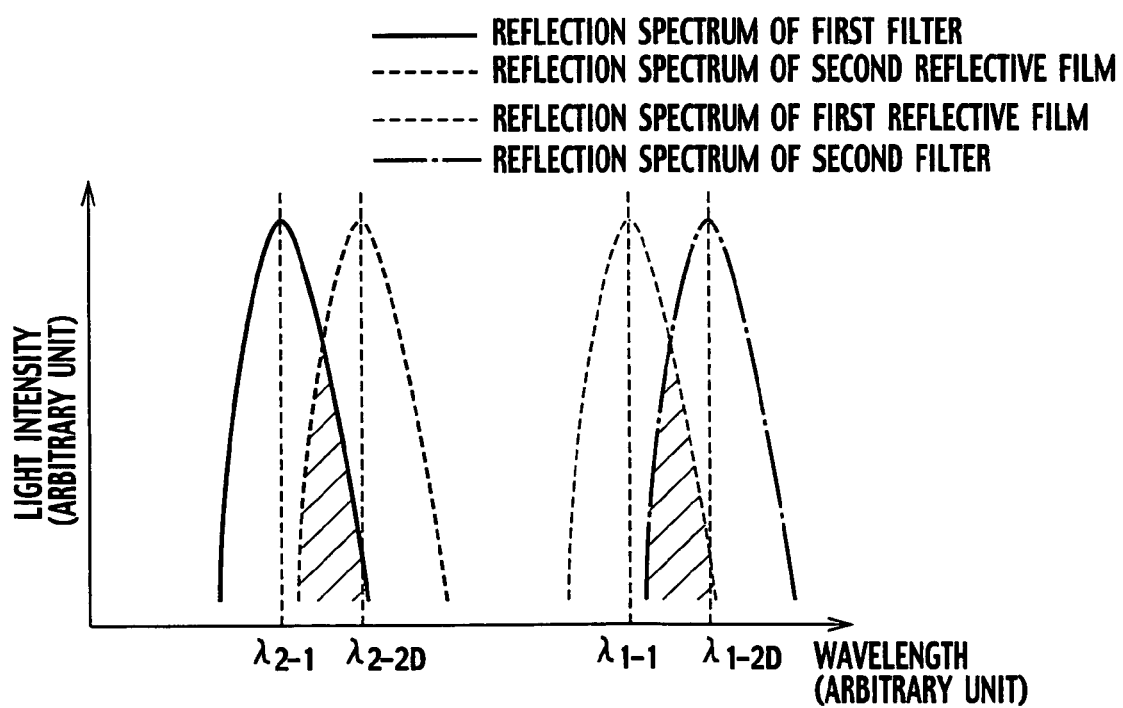
FIG. 25 shows second reflectance spectrums of the first and second transducers in accordance with the modification of the first embodiment of the present invention.

When there is no affect of the ambient environmental such as the temperature, the reflection spectrum of the first filter 26a agrees with the reflection spectrum of the second reflective film 27b. Also, the reflection spectrum of the second filter 26b agrees with the reflection spectrum of the first reflective film 27a. However, when the ambient temperature around the second transducer 15 is changed, for example, the wavelengths of the reflection spectrums of the second reflective film 27b and the second filter 26b shift, as shown in FIG. 24 and FIG. 25. The light intensity "$Q_{D2}$" of the second wavelength components detected by the reference photodetector 151 is given by the logical multiplication of the reflection spectrum of the first filter 26a and the reflection spectrum of the second reflective film 27b. The light intensity "$Q_{D1}$" of the first wavelength components detected by the signal photodetector 152 is given by the logical multiplication of the reflection spectrum of the second filter 26b and the reflection spectrum of the first reflective film 27a.

As described above, the shapes of the reflection spectrums of the first filter 26a, the second reflective film 27b, the second filter 26b, and the first reflective film 27a are congruent. Therefore, even if the wavelengths of the reflection spectrums of the second reflective film 27b and the second filter 26b shift depending on the change of the ambient temperature, the ratio of the light intensity "$Q_{D2}$" Of the second wavelength components detected by the reference photodetector 151 to the light intensity "$Q_{D1}$" of the first wavelength components detected by the signal photodetector 152 is constant. Therefore, even though the wavelengths of the reflection spectrums shift depending on the change of the ambient temperature, the differential pressure measurement error is not observed.

Second Embodiment

Figure 26:
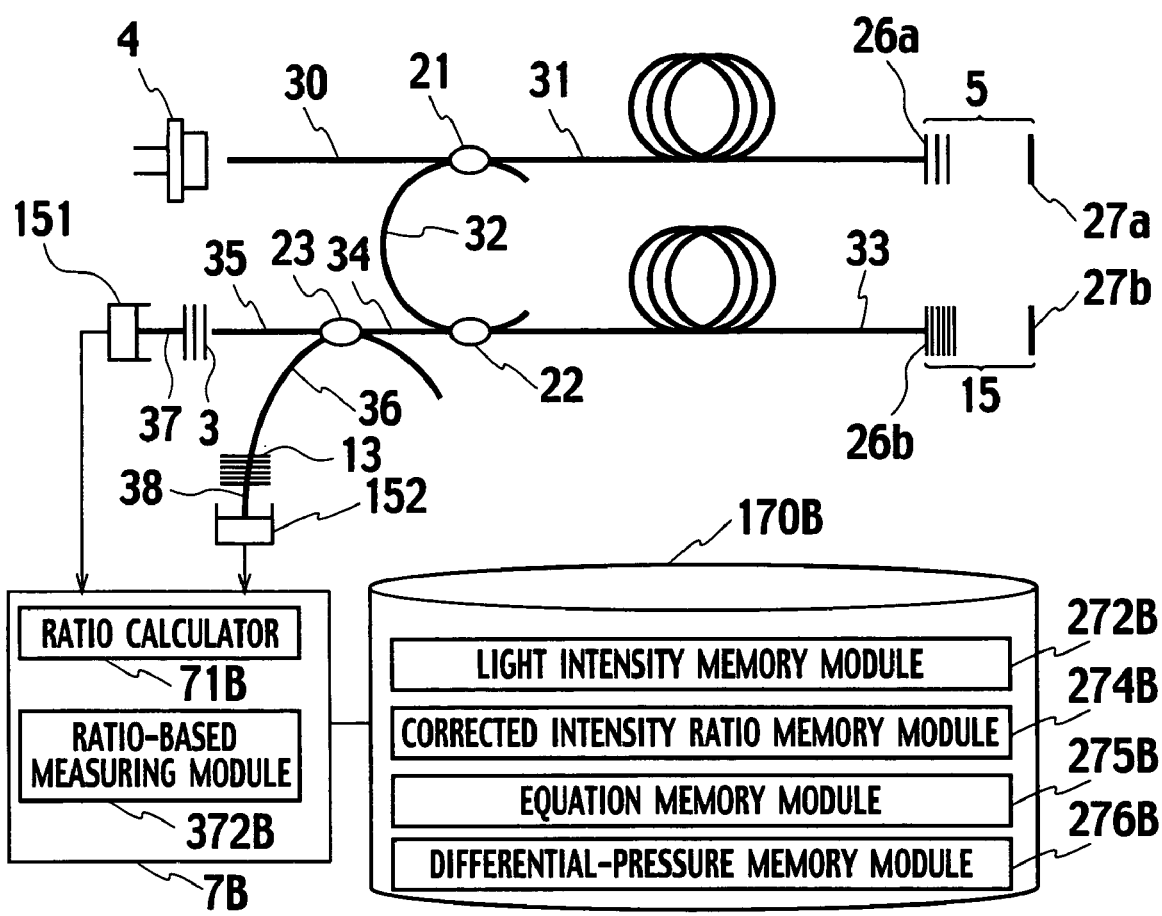
FIG. 26 is a diagram of the differential pressure measuring system in accordance with a second embodiment of the present invention.

With reference to FIG. 26, the differential pressure measuring system according to the second embodiment of the present invention includes signal processing equipment 7B connected to the signal photodetector 152 and the reference photodetector 151. The signal processing equipment 7B includes a ratio calculator 71B and a ratio-based measuring module 372B, which is different from FIG. 1. Other components of the differential pressure measuring system shown in FIG. 26 are the same as the differential pressure measuring system shown in FIG. 1.

Figure 27:
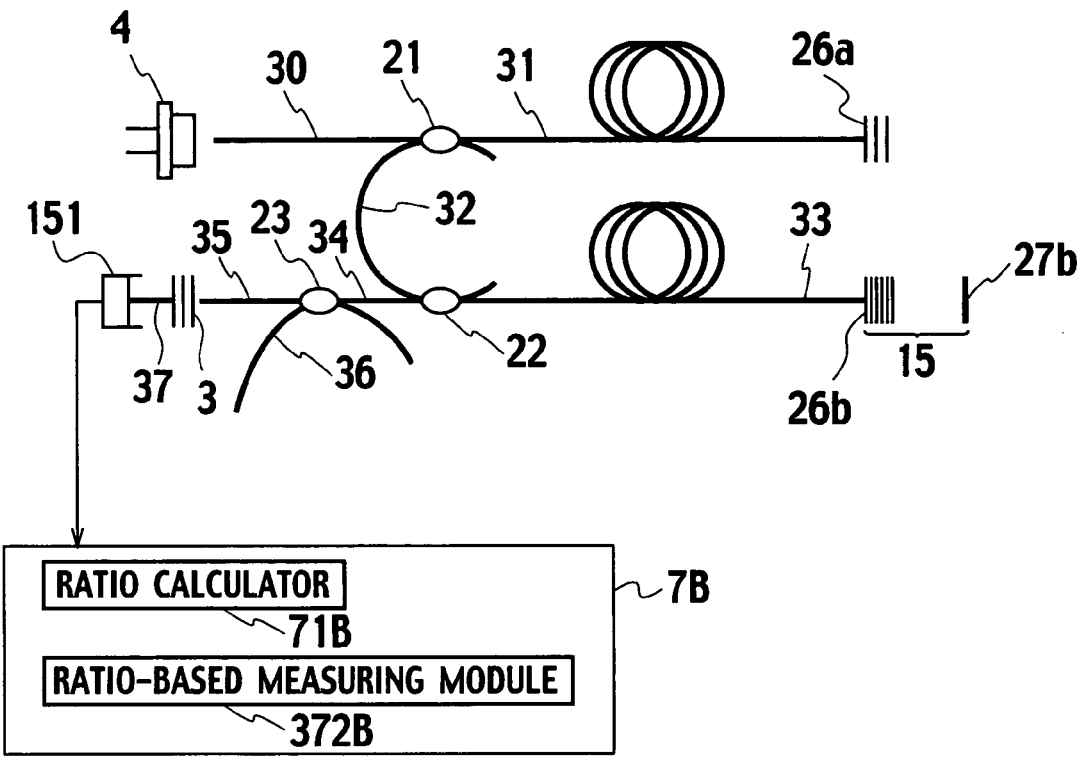
FIG. 27 is a diagram of an optical path of the second wavelength component in accordance with the second embodiment of the present invention.

The total path of the second wavelength components in the differential pressure measuring system according to the second embodiment is as follows. With reference to FIG. 27, the light including the second wavelength components emitted from the light source 4 is transmitted to the first filter 26a of the first transducer 5, through the optical waveguide 30, the first splitter 21, and the optical waveguide 31. The second wavelength components of the emitted light are reflected by the first filter 26a. The reflected second wavelength components are transmitted to the second filter 26b of the second transducer 15, through the optical waveguide 31, the first splitter 21, the optical waveguide 32, the second splitter 22, and the optical waveguide 33. The second wavelength components pass thought the second filter 26b and radiate toward the second reflective film 27b in the second transducer 15. The second wavelength components are reflected by the second reflective film 27b and radiate toward the second filter 26b. Therefore, the light intensity of the second wavelength components is attenuated while the second wavelength components travel back and forth in the second transducer 15. The second wavelength components pass through the second filter 26b again and are transmitted to the reference filter 3, through the optical waveguide 33, the second splitter 22, the optical waveguide 34, the third splitter 23, and the optical waveguide 35. The second wavelength components pass through the reference filter 3 and are transmitted to the reference photodetector 151, through the optical waveguide 37. The reference photodetector 151 detects the light intensity "$Q_{D2}$" of the second wavelength components. The reference photodetector 151 converts the light intensity "$Q_{D2}$" of the second wavelength components to electrical energy and transfers the converted light intensity "$Q_{D2}$" to the signal processing equipment 7B.

Figure 28:
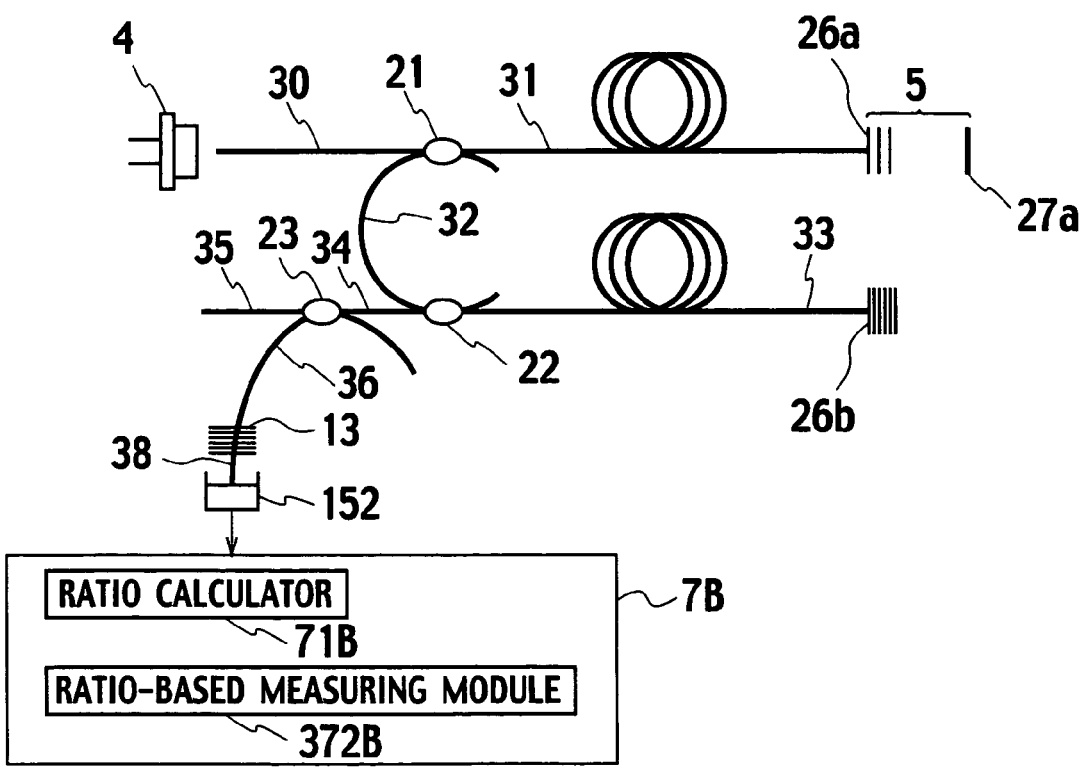
FIG. 28 is a diagram of an optical path of the first wavelength component in accordance with the second embodiment of the present invention.

With reference to FIG. 28, the total path of the first wavelength components in the differential pressure measuring system according to the second embodiment is explained. The light emitted from the light source 4 is transmitted to the first filter 26a of the first transducer 5, through the optical waveguide 30, the first splitter 21, and the optical waveguide 31. The first wavelength components of the emitted light pass through the first filter 26a and radiate toward the first reflective film 27a in the first transducer 5. The first wavelength components are reflected by the first reflective film 27a and radiate toward the first filter 26a. Therefore, the light intensity of the first wavelength components is attenuated while the first wavelength components travel back and forth in the first transducer 5. The first wavelength components pass through the first filter 26a again and are transmitted to the second filter 26b of the second transducer 15, through the optical waveguide 31, the first splitter 21, the optical waveguide 32, the second splitter 22, and the optical waveguide 33. The first wavelength components are reflected by the second filter 26b. The reflected first wavelength components are transmitted to the signal filter 13, through the optical waveguide 33, the second splitter 22, the optical waveguide 34, the third splitter 23, and the optical waveguide 36. The first wavelength components pass through the signal filter 13 and are transmitted to the signal photodetector 152, through the optical waveguide 38. The signal photodetector 152 detects the light intensity "$Q_{D1}$" Of the first wavelength components. The signal photodetector 152 converts the light intensity "$Q_{D1}$" to electrical energy and transfers the converted light intensity "$Q_{D1}$" to the signal processing equipment 7B.

Figure 29:
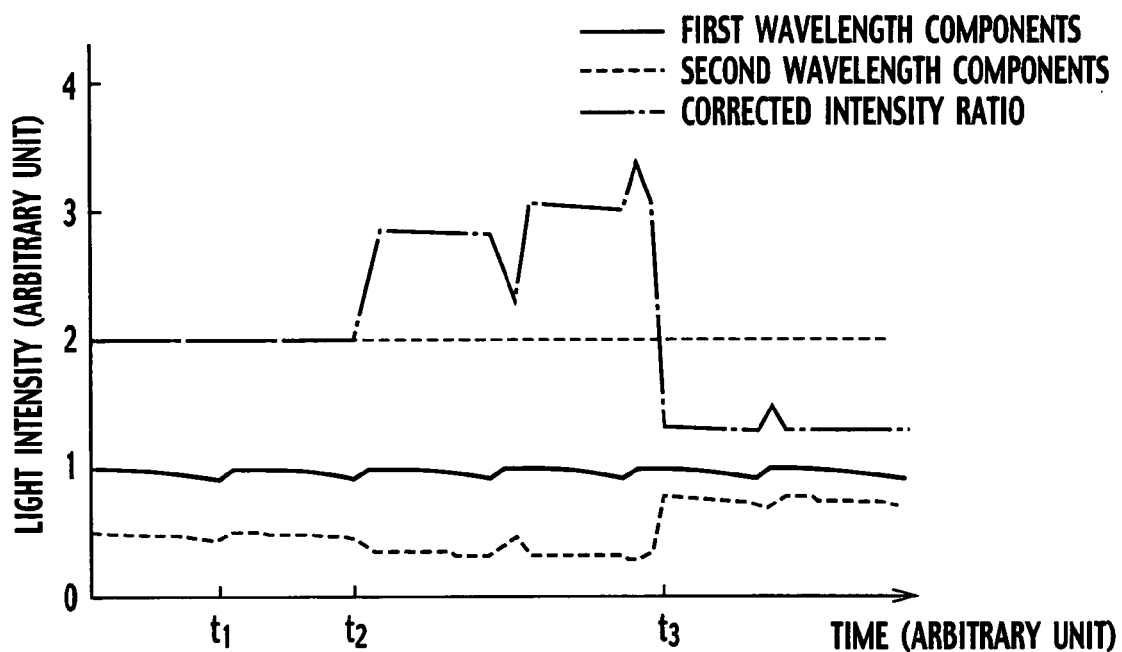
FIG. 29 is a graph showing the intensity of the wavelength component in accordance with the second embodiment of the present invention.

The ratio calculator 71B of the signal processing equipment 7B divides the light intensity "$Q_{D1}$" of the first wavelength components detected by the signal photodetector 152 by the light intensity "$Q_{D2}$" of the second wavelength components detected by the reference photodetector 151 to calculate a corrected intensity ratio. In FIG. 29, the differential pressure ($|P_{O1}-P_{O2}|$) between the first external pressure "$P_{O1}$" and the second external pressure "$P_{O2}$" is constant until time "$t_2$". Therefore, the ratio of the light intensity "$Q_{D2}$" of the second wavelength components to the light intensity "$Q_{D1}$" of the first wavelength components is constant until time "$t_2$". It should be noted that the light intensity "$Q_{D1}$" of the first wavelength components and the light intensity "$Q_{D2}$" of the second wavelength components fluctuate at time "$t_1$", because of the drift of the optical axis of the light source 4 or the fluctuation of the emission power of the light source 4. However, such fluctuation is cancelled in the corrected intensity ratio calculated by dividing the light intensity "$Q_{D1}$" of the first wavelength components by the light intensity "$Q_{D2}$" of the second wavelength components. The second external pressure "$P_{O2}$" is reduced from the time "$t_2$" to time "$t_3$". Accordingly, the light intensity "$Q_{D2}$" of the second wavelength components detected by the reference photodetector 151 is reduced. Therefore, the corrected intensity ratio calculated by dividing the light intensity "$Q_{D1}$" of the first wavelength components by the light intensity "$Q_{D2}$" of the second wavelength components is increased. The second external pressure "$P_{O2}$" is increased at the time "$t_3$". Accordingly, the light intensity "$Q_{D2}$" of the second wavelength components detected by the reference photodetector 151 is increased. Therefore, the corrected intensity ratio calculated by dividing the light intensity "$Q_{D1}$" of the first wavelength components by the light intensity "$Q_{D2}$" of the second wavelength components is reduced.

With reference again to FIG. 26, the ratio-based measuring module 372B calculates the differential pressure ($|P_{O1}-P_{O2}|$) between the first external pressure "$P_{O1}$" and the second external pressure "$P_{O2}$", based on the corrected intensity ratio calculated by the ratio calculator 71B. For example, the ratio-based measuring module 372B prepares a relational equation showing the relationship between the differential pressure ($|P_{O1}-P_{O2}|$) and the corrected intensity ratio. It is possible to calculate the differential pressure ($|P_{O1}-P_{O1}|$) between the first external pressure "$P_{O1}$", and the second external pressure "$P_{O2}$" by assigning the value of the corrected intensity ratio to the variable of the corrected intensity ratio in the relational equation.

A data memory 170B is connected to the signal processing equipment 7B. The data memory 170B includes a light intensity memory module 272B, a corrected intensity ratio memory module 274B, an equation memory module 275B, and a differential pressure memory module 276B. The light intensity memory module 272B stores the intensity "$Q_{D1}$" of the first wavelength components of the second measurement light detected by the signal photodetector 152. Also, the light intensity memory module 272B stores intensity "$Q_{D2}$" of the second wavelength components of the second measurement light detected by the reference photodetector 151. The corrected intensity ratio memory module 274B stores the corrected intensity ratio calculated by the ratio calculator 71B. The equation memory module 275B stores the relational equation showing the relationship between the differential pressure ($|P_{O1}-P_{O2}|$) and the corrected intensity ratio. The differential pressure memory module 276B stores the differential pressure ($|P_{O1}-P_{O2}|$) between the first external pressure "$P_{O1}$" and the second external pressure "$P_{O2}$" calculated by the ratio-based measuring module 372B.

Figure 30:
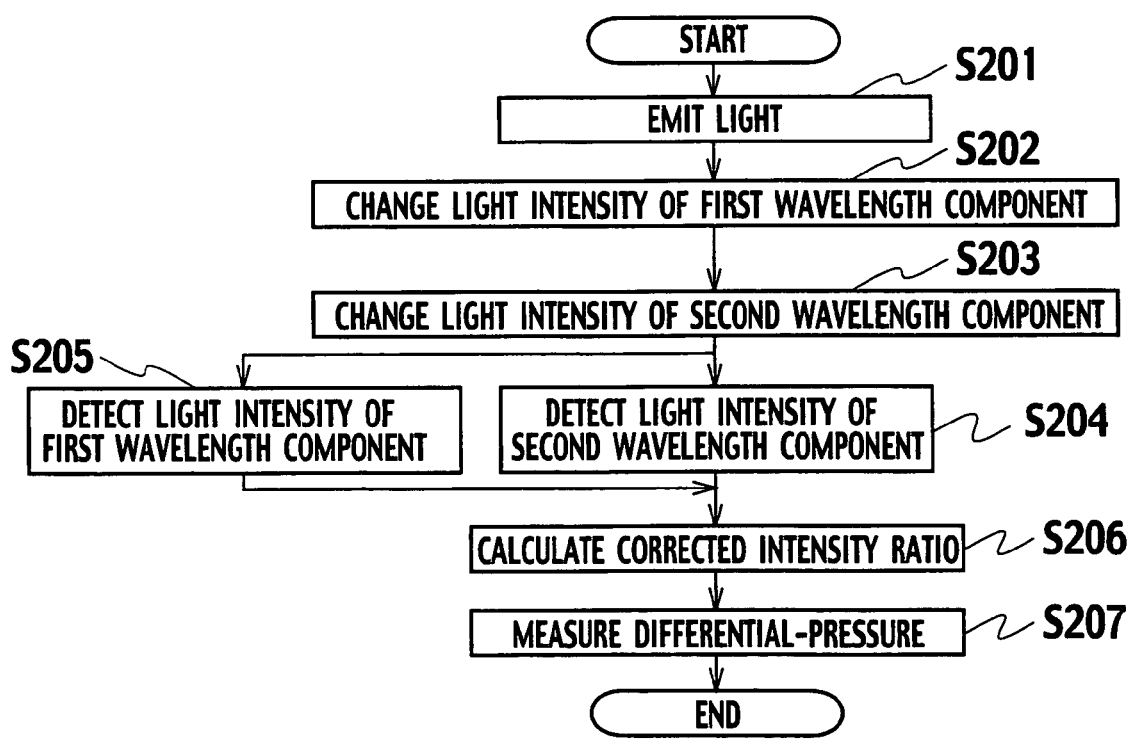
FIG. 30 is a flowchart depicting the differential pressure measuring method in accordance with the second embodiment of the present invention.

With reference next to FIG. 30, the differential pressure measuring method according to the second embodiment of the present invention is described.

In step S201, the light having the wide spectrum range is emitted from the light source 4, shown in FIG. 26, to the optical waveguide 30. The emitted light is transmitted to the first filter 26a, through the optical waveguide 30, the first splitter 21, and the optical waveguide 31. The second wavelength components in the second wavelength range are reflected by the first filter 26a. In step S202, the first wavelength components in the first wavelength range pass through the first filter 26a and are reflected by the first reflective film 27a. Thereafter, the first wavelength components pass through the first filter 26a again. The light intensity of the first wavelength components is changed, depending on the change of the first optical path difference "$F_1$" of the first transducer 5 exposed to the first external pressure "$P_{O1}$".

In step S203, the first measurement light including the second wavelength components reflected by the first filter 26a and the first wavelength components traveling back and forth in the first transducer 5 is transmitted to the second transducer 15, through the optical waveguide 31, the first splitter 21, the optical waveguide 32, the second splitter 22, and the optical waveguide 33. The first wavelength components are reflected by the second filter 26b of the second transducer 15. The second wavelength components pass through the second filter 26b and are reflected by the second reflective film 27b. Thereafter, the second wavelength components pass through the second filter 26b again. The light intensity of the second wavelength components is changed, depending on the change of the second optical path difference "$F_2$" of the second transducer 15 exposed to the second external pressure "$P_{O2}$".

The second measurement light including the first wavelength components reflected by the second filter 26b and the second wavelength components traveling back and forth in the second transducer 15 is transmitted to the third splitter 23, through the optical waveguide 33, the second splitter 22, and the optical waveguide 34. The second measurement light is split into two directions by the third splitter 23. One of the split, second measurement lights is transmitted by the optical waveguide 35. Another one of the split, second measurement lights is transmitted by the optical waveguide 36. In step S204, the only second wavelength components of the second measurement light transmitted by the optical waveguide 35 pass through the reference filter 3. The second wavelength components are transmitted by the optical waveguide 37 and are detected by the reference photodetector 151. The reference photodetector 151 converts the light intensity "$Q_{D2}$" of the second wavelength components to electrical energy. Then, the reference photodetector 151 transfers the converted light intensity "$Q_{D2}$" to the signal processing equipment 7B. The ratio calculator 71B stores the light intensity "$Q_{D2}$" of the second wavelength components in the light intensity memory module 272B.

In step S205, only the first wavelength components of the second measurement light transmitted by the optical waveguide 36 pass through the signal filter 13. The first wavelength components are transmitted by the optical waveguide 38 and are detected by the signal photodetector 152. The signal photodetector 152 converts the light intensity "$Q_{D1}$" of the first wavelength components to electrical energy. Then, the signal photodetector 152 transfers the converted light intensity "$Q_{D1}$" to the signal processing equipment 7B. The ratio calculator 71B stores the light intensity "$Q_{D1}$" of the first wavelength components in the light intensity memory module 272B.

In step S206, the ratio calculator 71B retrieves the intensity "$Q_{D1}$" of the first wavelength components of the second measurement light and the intensity "$Q_{D2}$" of the second wavelength components of the second measurement light from the light intensity memory module 272B. Then, the ratio calculator 71B divides the light intensity "$Q_{D1}$" of the first wavelength components by the light intensity "$Q_{D2}$" of the second wavelength components to calculate the corrected intensity ratio. The ratio calculator 71B stores the calculated corrected intensity ratio in the corrected intensity ratio memory module 274B.

In step S207, the ratio-based measuring module 372B retrieves the corrected intensity ratio from the corrected intensity ratio memory module 274B. Then, the ratio-based measuring module 372B retrieves the preinstalled relational equation showing the relationship between the differential pressure ($|P_{O1}-P_{O2}|$) and the corrected intensity ratio from the equation memory module 275B. Thereafter, the ratio-based measuring module 372B assigns the value of the corrected intensity ratio to the variable of the corrected intensity ratio in the relational equation to calculate the differential pressure ($|P_{O1}-P_{O2}|$) between the first external pressure "$P_{O1}$" and the second external pressure "$P_{O2}$". The ratio-based measuring module 372B stores the differential pressure ($|P_{O1}-P_{O2}|$) between the first external pressure "$P_{O1}$" and the second external pressure "$P_{O2}$" in the differential pressure memory module 276B, and the differential pressure measuring method is completed.

In the above described embodiment, the light intensity "$Q_{D1}$" of the first wavelength components detected by the signal photodetector 152 is divided by the light intensity "$Q_{D2}$" of the second wavelength components detected by the reference photodetector 151 to calculate the corrected intensity ratio. However, dividing the light intensity "$Q_{D2}$" of the second wavelength components detected by the signal photodetector 152 by the light intensity "$Q_{D1}$" of the first wavelength components detected by the reference photodetector 151 to calculate the corrected intensity ratio is an alternative. In this case, the reference filter 3 only transmits the first wavelength components and the signal filter 13 only transmits the second wavelength components. By preparing a relational equation showing the relationship between the differential pressure ($|P_{O1}-P_{O2}|$) and the corrected intensity ratio calculated by dividing the light intensity "$Q_{D2}$" of the second wavelength components by the light intensity "$Q_{D1}$" of the first wavelength components, it is possible to calculate the differential pressure ($|P_{O1}-P_{O2}|$) between the first external pressure "$P_{O1}$" and the second external pressure "$P_{O2}$" from the actual value of the corrected intensity ratio.

Third Embodiment

Figure 31:
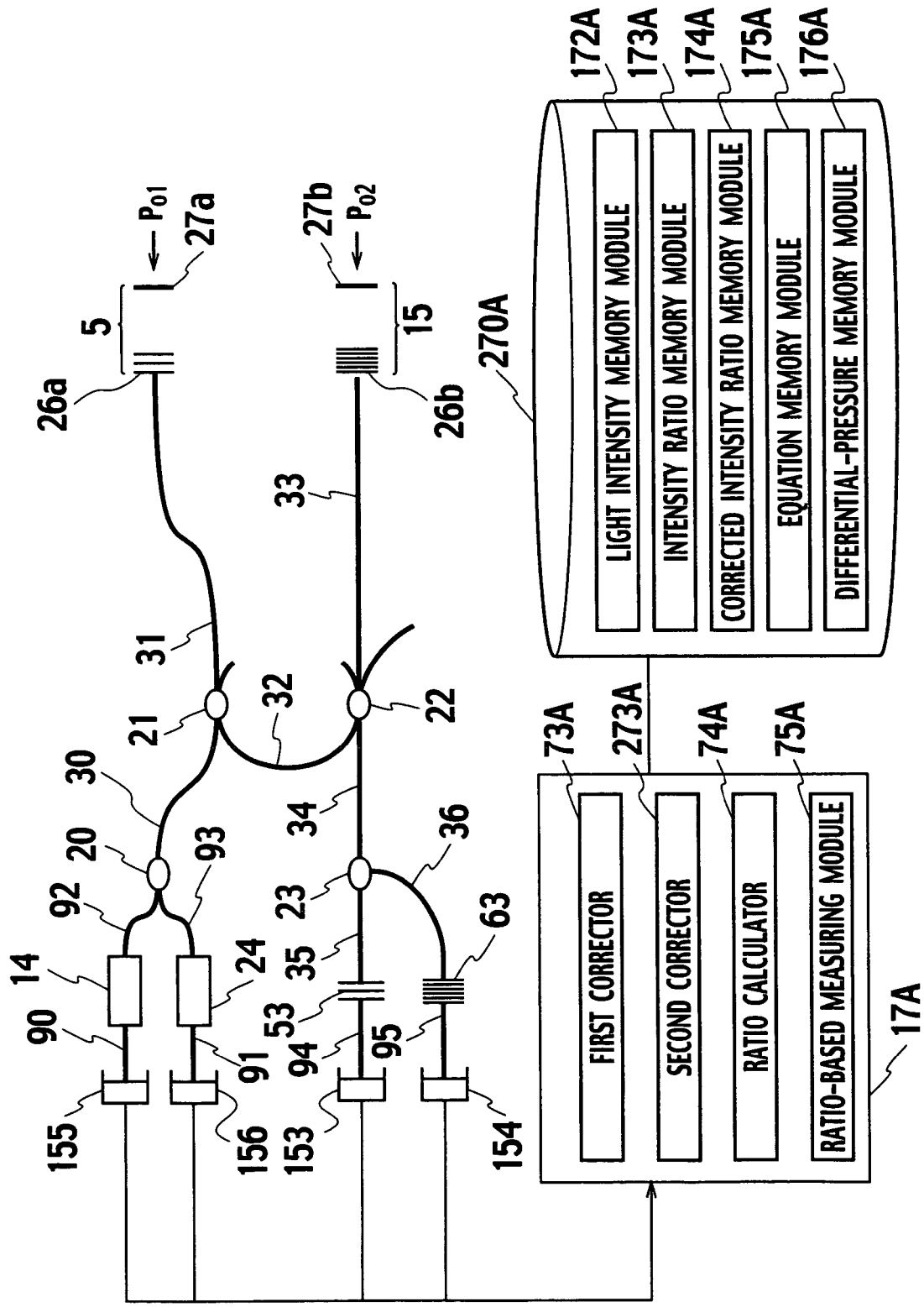
FIG. 31 is a diagram of the differential pressure measuring system in accordance with a third embodiment of the present invention.

With reference to FIG. 31, the differential pressure measuring system according to the third embodiment includes a first light source 14 configured to emit a first emitted light in the first wavelength range and a second light source 24 configured to emit a second emitted light in the second wavelength range. Optical waveguides 90, 92 transmitting the first emitted light are connected to the first light source 14. The intensity "$Q_{S1}$" of the first emitted light transmitted by the optical waveguide 90 is detected by a first emitted light detector 155. Optical waveguide 91, 93 transmitting the second emitted light are connected to the second light source 24. The intensity "$Q_{S2}$" of the second emitted light transmitted by the optical waveguide 91 is detected by a second emitted light detector 156.

An optical coupler 20 for light sources is connected to the optical waveguides 92, 93. The optical waveguide 30, the first splitter 21, the optical waveguide 31, and the first transducer 5 are connected to the optical coupler 20 for light sources similar to FIG. 1. The first emitted light in the first wavelength range transmitted by the optical waveguide 92 shown in FIG. 31 are transmitted by the optical coupler 20 for light sources, the optical waveguide 30, the first splitter 21, and the optical waveguide 31 and passes through the first filter 26a of the first transducer 5. The first emitted light is reflected by the first reflective film 27a and passes through the first filter 26a as the first wavelength components of the first measurement light provided by the first transducer 5. The intensity of the first emitted light is attenuated, depending on the first external pressure "$P_{O1}$", while the first emitted light travels back and forth in the first transducer 5.

The second emitted light in the second wavelength range transmitted by the optical waveguide 93 is transmitted by the optical coupler 20 for light sources, the optical waveguide 30, the first splitter 21, and the optical waveguide 31 and is reflected by the first filter 26a of the first transducer 5 as the second wavelength components of the first measurement light.

The first measurement light is transmitted to the second transducer 15, through the optical waveguide 31, the first splitter 21, the optical waveguide 32, the second splitter 22, and the optical waveguide 33. Here, the first wavelength components of the first measurement light are reflected by the second filter 26b of the second transducer 15 as the first wavelength components of the second measurement light. The second wavelength components of the first measurement light pass through the second filter 26b. The second wavelength components of the first measurement light are reflected by the second reflective film 27b and pass through the second filter 26b as the second wavelength components of the second measurement light provided by the second transducer 15. The intensity of the second wavelength components of the first measurement light is attenuated, depending on the second external pressure "$P_{O2}$", while the first measurement light travels back and forth in the second transducer 15.

The second measurement light is transmitted to the third splitter 23, through the optical waveguide 33, the second splitter 22, and the optical waveguide 34. The second measurement light is split into two directions by the third splitter 23. One of the split components of second measurement light is transmitted by the optical waveguide 35. Another one of the split components of second measurement light is transmitted by the optical waveguide 36. A reference filter 53 is connected to the optical waveguide 35. The reference filter 53, such as a bandpass filter, only transmits the second wavelength components of the second measurement light in the second wavelength range. The optical waveguide 94 is connected to the reference filter 53. The intensity "$Q_{D2}$" of the second wavelength components of the second measurement light transmitted by the optical waveguide 94 is given by equation (5) and is detected by a reference photodetector 153.

$$Q_{D2}=Q_{S2} \times R_2 \times T \tag{5}$$

In the equation (5), "$R_2$" is a rate of change of the light intensity of the second wavelength components in the second transducer 15. As described above, the light intensity of the second wavelength components changes in the second transducer 15, depending on the second external pressure "$P_{O2}$". Therefore, the rate of change of the light intensity "$R_2$" changes depending on the second external pressure "$P_{O2}$". "T" in the equation (5) is a transmittance of the optical path of the second wavelength components such as the optical waveguides 30-35, 93, 94.

A signal filter 63 is connected to the optical waveguide 36 transmitting the second measurement light. The signal filter 63, such as a bandpass filter, only transmits the first wavelength components of the second measurement light in the first wavelength range. An optical waveguide 95 is connected to the signal filter 63. The intensity "$Q_{D1}$" of the first wavelength components of the second measurement light transmitted by the optical waveguide 95 is given by equation (6) and is detected by a signal photodetector 154.

$$Q_{D1}=Q_{S1} \times R_1 \times T \tag{6}$$

In the equation (6), "$R_1$" is a rate of change of the light intensity of the first wavelength components in the first transducer 5. As described above, the light intensity of the first wavelength components changes in the first transducer 5, depending on the first external pressure "$P_{O1}$". Therefore, the rate of change of the light intensity "$R_1$" changes depending on the first external pressure "$P_{O1}$". "T" in the equation (6) is a transmittance of the optical path of the first wavelength components, such as the optical waveguides 30-34, 36, 92, 95. By setting the transmittances of the optical waveguide 35, the optical waveguide 92, and the optical waveguide 94 equal to the transmittances of the optical waveguide 36, the optical waveguide 93, and the optical waveguide 95, respectively, it is possible to consider that the transmittance "T" of the optical path of the second wavelength components in the equation (5) is equal to the transmittance "T" of the optical path of the first wavelength components in the equation (6).

The first emitted light detector 155, the second emitted light detector 156, the signal photodetector 153, and the signal photodetector 154 are connected to signal processing equipment 17A, electrically. The signal processing equipment 17A includes a first corrector 73A, a second corrector 273A, a ratio calculator 74A, and a ratio-based measuring module 75A. The first corrector 73A divides the intensity "$Q_{D1}$" of the first wavelength components of the second measurement light by the intensity "$Q_{S1}$" of the first emitted light to calculate a first light intensity ratio "$N_1$", as shown in equation (7). By dividing the intensity "$Q_{D1}$" of the first wavelength components of the second measurement light by the intensity "$Q_{S1}$" of the first emitted light, it is possible to cancel the fluctuation of the intensity of the second measurement light in the first wavelength range by the fluctuation of the intensity of the first emitted light.

$$N_1=Q_{D1} \div Q_{S1}=Q_{S1} \times R_1 \times T \div Q_{S1}=R_1 \times T \tag{7}$$

The second corrector 273A divides the intensity "$Q_{D2}$" of the second wavelength components of the second measurement light by the intensity "$Q_{S2}$" of the second emitted light to calculate a second light intensity ratio "$N_2$", as shown in equation (8). By dividing the intensity "$Q_{D2}$" of the second wavelength components of the second measurement light by the intensity "$Q_{S2}$" of the second emitted light, it is possible to cancel the fluctuation of the intensity of the second measurement light in the second wavelength range by the intensity of the second emitted light.

$$N_2 = Q_{D2} \div Q_{S2} = Q_{S2} \times R_2 \times T \div Q_{S2} = R_2 \times T \tag{8}$$

The ratio calculator 74A divides the first light intensity ratio "$N_1$" by the second light intensity ratio "$N_2$" to calculate a corrected intensity ratio "$A_R$", as shown in equation (9).

$$A_R = N_1 \div N_2 = (R_1 \times T) \div (R_2 \times T) = R_1/R_2 \tag{9}$$

As described above, the rate of change "$R_1$" of the light intensity of the first wavelength components in the first transducer 5 reflects the first external pressure "$P_{O1}$". Also, the rate of change "$R_2$" of the light intensity of the second wavelength components in the second transducer 15 reflects the second external pressure "$P_{O2}$". Therefore, the corrected intensity ratio "$A_R$" calculated by dividing the change of the light intensity "$R_1$" of the first wavelength component in the first transducer 5 by the change of the light intensity "$R_2$" of the second wavelength components in the second transducer 15 reflects the ratio of the first external pressure "$P_{O1}$" to the second external pressure "$P_{O2}$".

The ratio-based measuring module 75A monitors the corrected intensity ratio "$A_R$" calculated by the ratio calculator 74A and calculates the differential pressure ($|P_{O1}-P_{O2}|$) between the first external pressure "$P_{O1}$" and the second external pressure "$P_{O2}$". For example, the ratio-based measuring module 75A prepares a relational equation showing a relationship between the differential pressure ($|P_{O1}-P_{O2}|$) and the corrected intensity ratio "$A_R$" to calculate the differential pressure ($|P_{O1}-P_{O2}|$) between the first external pressure "$P_{O1}$" and the second external pressure "$P_{O2}$" based on the corrected intensity ratio "$A_R$".

A data memory 270A is connected to the signal processing equipment 17A. A data memory 270A includes a light intensity memory module 172A, an intensity ratio memory module 173A, a corrected intensity ratio memory module 174A, an equation memory module 175A, and a differential pressure memory module 176A. The light intensity memory module 172A stores the intensity "$Q_{S1}$" of the first emitted light detected by the first emitted light detector 155 and the intensity "$Q_{S2}$" of the second emitted light detected by the second emitted light detector 156. Also, the light intensity memory module 172A stores the intensity "$Q_{D1}$" of the first wavelength components of the second measurement light detected by the signal photodetector 154 and the intensity "$Q_{D2}$" of the second wavelength components of the second measurement light detected by the reference photodetector 153. The intensity ratio memory module 173A stores the first light intensity ratio "$N_1$" calculated by the first corrector 73A and the second light intensity ratio "$N_2$" calculated by the second corrector 273A. The corrected intensity ratio memory module 174A stores the corrected intensity ratio "$A_R$" calculated by the ratio calculator 74A. The equation memory module 175A stores the preinstalled relational equation showing the relationship between the differential pressure ($|P_{O1}-P_{O2}|$) and the corrected intensity ratio "$A_R$". The differential pressure memory module 176A stores the differential pressure ($|P_{O1}-P_{O2}|$) between the first external pressure "$P_{O1}$" and the second external pressure "$P_{O2}$" calculated by the ratio-based measuring module 75A.

Figure 32:
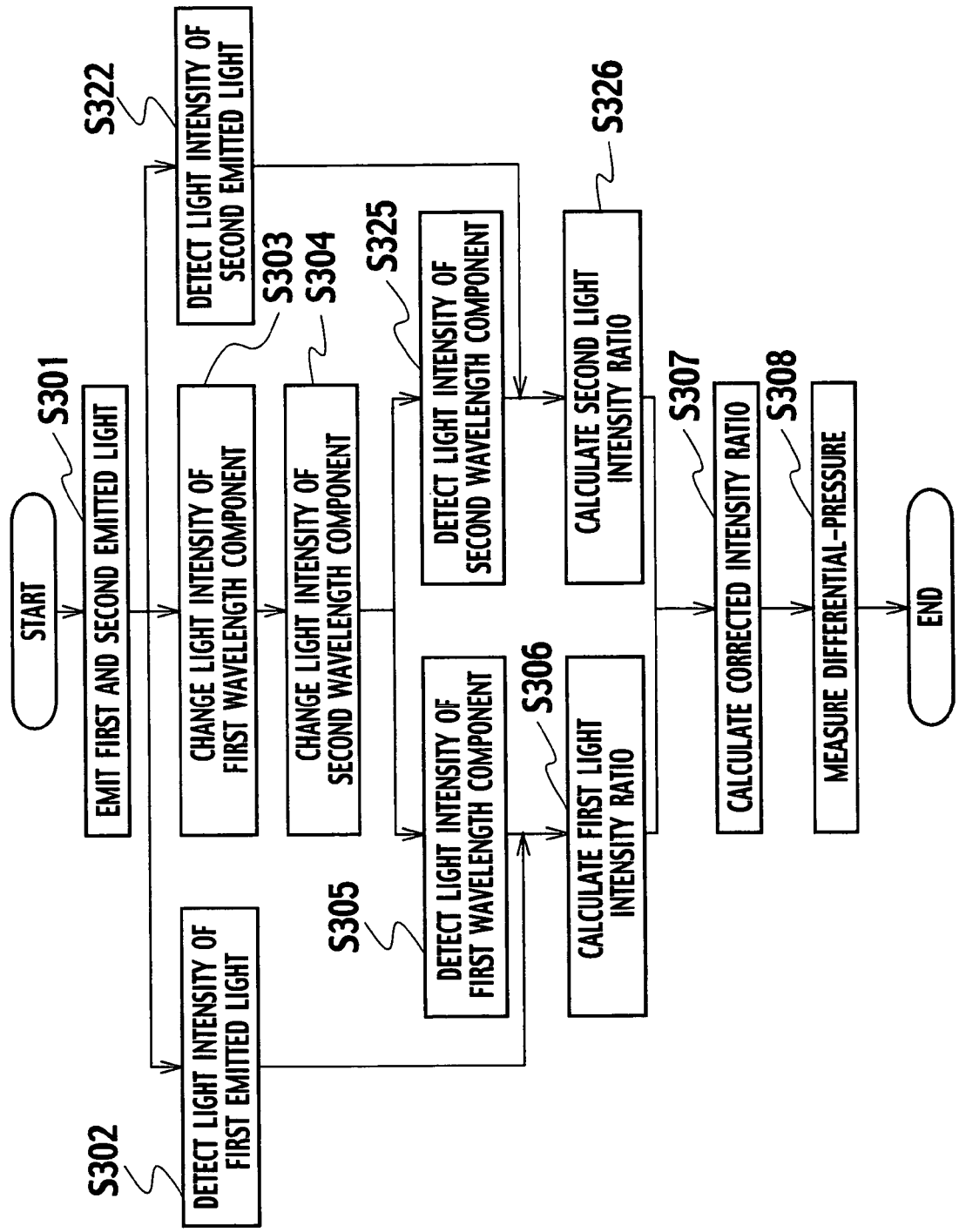
FIG. 32 is a flowchart depicting the differential pressure measuring method in accordance with the third embodiment of the present invention.

With reference next to FIG. 32, the differential pressure measuring method according to the third embodiment of the present invention is described.

In step S301, the first emitted light in the first wavelength range is emitted from the first light source 14, shown in FIG. 31, to the optical waveguides 90, 92. Also, the second emitted light in the second wavelength range is emitted from the second light source 24 to the optical waveguides 91, 93.

In step S302, the first emitted light detector 155 detects the intensity "$Q_{S1}$" of the first emitted light transmitted by the optical waveguide 90. The first emitted light detector 155 transfers the detected intensity "$Q_{S1}$" of the first emitted light to the first corrector 73A. The first corrector 73A stores the received intensity "$Q_{S1}$" of the first emitted light in the light intensity memory module 172A of the data memory 270A. In step S322, the second emitted light detector 156 detects the intensity "$Q_{S2}$" of the second emitted light transmitted by the optical waveguide 91. The second emitted light detector 156 transfers the intensity "$Q_{S2}$" of the second emitted light to the second corrector 273A. The second corrector 273A stores the received intensity "$Q_{S2}$" of the second emitted light in the light intensity memory module 172A.

In step S303, the first transducer 5 attenuates the intensity of the first emitted light transmitted by the optical waveguide 92, the optical coupler 20 for light sources, the optical waveguide 30, the first splitter 21, and the optical waveguide 31, depending on the first external pressure "$P_{O1}$" to provide the first wavelength components of the first measurement light. Also, the first filter 26a of the first transducer 5 reflects the second emitted light transmitted by the optical waveguide 93, the optical coupler 20 for light sources, the optical waveguide 30, the first splitter 21, and the optical waveguide 31 as the second wavelength components of the first measurement light.

In step S304, the second filter 26b of the second transducer 15 reflects the first wavelength components of the first measurement light transmitted by the optical waveguide 31, the first splitter 21, the optical waveguide 32, the second splitter 22, and the optical waveguide 33 as the first wavelength components of the second measurement light. Also, the second transducer 15 attenuates the intensity of the second wavelength components of the first measurement light, depending on the second external pressure "$P_{O2}$", to provide the second wavelength components of the second measurement light.

In step S305, the first wavelength components of the second measurement light are transmitted by the optical waveguide 33, the second splitter 22, the optical waveguide 34, the third splitter 23, the optical waveguide 36, the signal filter 63, and the optical waveguide 95. The signal photodetector 154 detects the intensity "$Q_{D1}$" of the first wavelength components of the second measurement light given by the equation (6). The signal photodetector 154 transfers the detected intensity "$Q_{D1}$" of the first wavelength components of the second measurement light to the first corrector 73A. The first corrector 73A stores the received intensity "$Q_{D1}$" of the first wavelength components of the second measurement light in the light intensity memory module 172A.

In step S325, the second wavelength components of the second measurement light are transmitted by the optical waveguide 33, the second splitter 22, the optical waveguide 34, the third splitter 23, the optical waveguide 35, the reference filter 53, and the optical waveguide 94. The signal photodetector 153 detects the intensity "$Q_{D2}$" of the second wavelength components of the second measurement light given by the equation (5). The signal photodetector 153 transfers the intensity "$Q_{D2}$" of the second wavelength components of the second measurement light to the second corrector 273A. The second corrector 273A stores the received intensity "$Q_{D2}$" of the second wavelength components of the second measurement light in the light intensity memory module 172A.

In step S306, the first corrector 73A retrieves the intensity "$Q_{S1}$" of the first emitted light and the intensity "$Q_{D1}$" of the first wavelength components of the second measurement light from the light intensity memory module 172A. Then, the first corrector 73A divides the intensity "$Q_{D1}$" of the first wavelength components of the second measurement light by the intensity "$Q_{S1}$" of the first emitted light to calculate the first light intensity ratio "$N_1$" given by the equation (7). The first corrector 73A stores the calculated first light intensity ratio "$N_1$" in the intensity ratio memory module 173A.

In step S326, the second corrector 273A retrieves the intensity "$Q_{S2}$" of the second emitted light and the intensity "$Q_{D2}$" of the second wavelength components of the second measurement light from the light intensity memory module 172A. Then, the second corrector 273A divides the intensity "$Q_{D2}$" of the second wavelength components of the second measurement light by the intensity "$Q_{S2}$" of the second emitted light to calculate the second light intensity ratio "$N_2$" given by the equation (8). The second corrector 273A stores the calculated second light intensity ratio "$N_2$" in the intensity ratio memory module 173A.

In step S307, the ratio calculator 74A retrieves the first light intensity ratio "$N_1$" and the second light intensity ratio "$N_2$" from the intensity ratio memory module 173A. Then, the ratio calculator 74A divides the first light intensity ratio "$N_1$" by the second light intensity ratio "$N_2$" to calculate the corrected intensity ratio "$A_R$" given by the equation (9). The ratio calculator 74A stores the corrected intensity ratio "$A_R$" in the corrected intensity ratio memory module 174A.

In step S308, the ratio-based measuring module 75A retrieves the corrected intensity ratio "$A_R$" from the corrected intensity ratio memory module 174A. Then, the ratio-based measuring module 75A retrieves the preinstalled relational equation showing the relationship between the differential pressure ($|P_{O1}-P_{O2}|$) and the corrected intensity ratio "$A_R$" from the equation memory module 175A. The ratio-based measuring module 75A assigns the calculated value of the corrected intensity ratio "$A_R$" to the variable of the corrected intensity ratio "$A_R$" in the relational equation to calculate the differential pressure ($|P_{O1}-P_{O2}|$) between the first external pressure "$P_{O1}$" and the second external pressure "$P_{O2}$". The ratio-based measuring module 75A stores the calculated differential pressure ($|P_{O1}-P_{O2}|$) between the first external pressure "$P_{O1}$" and the second external pressure "$P_{O2}$" in the differential pressure memory module 176A and the differential pressure measuring method according to the third embodiment is completed.

Figure 33:
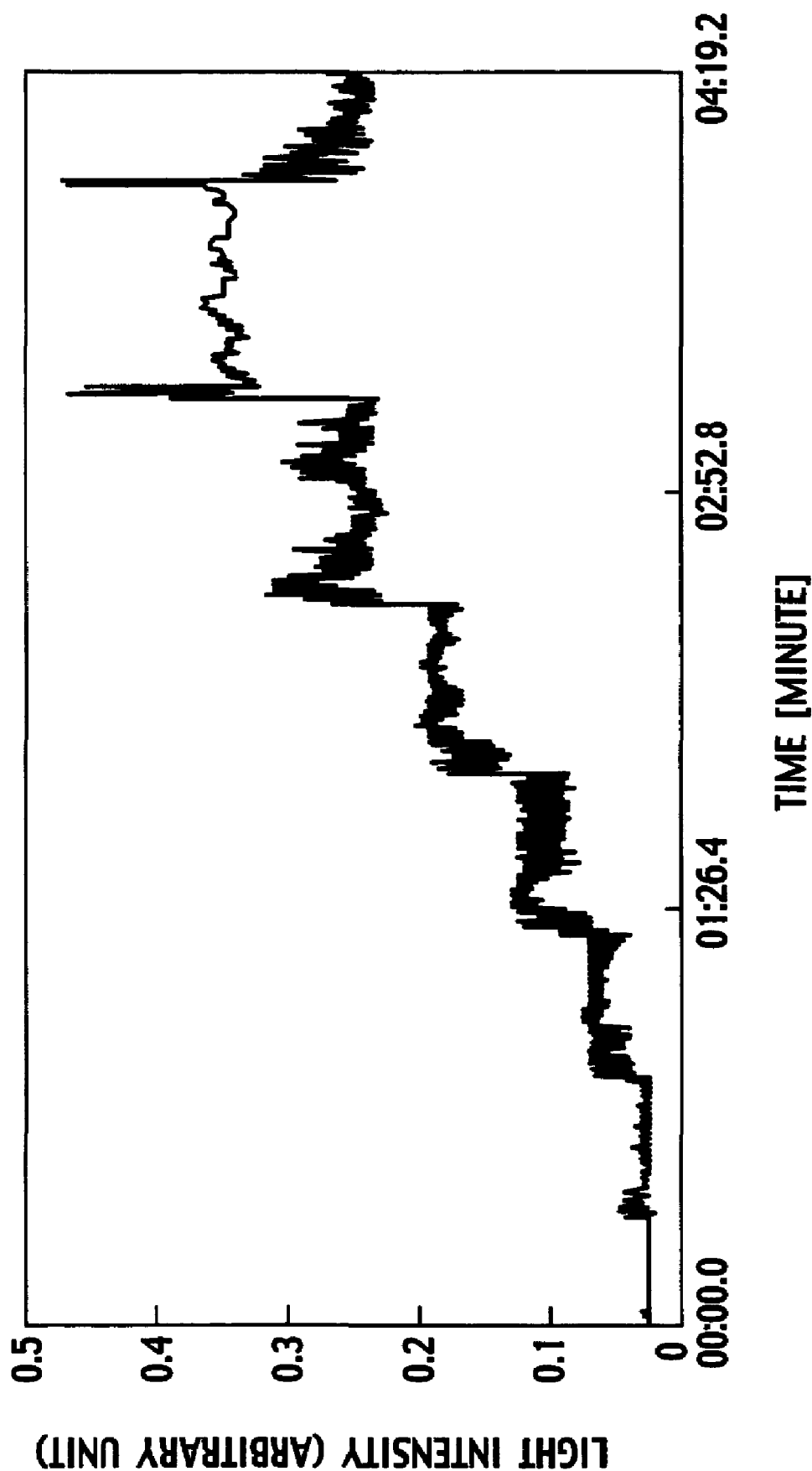
FIG. 33 is a graph showing the intensity of the first wavelength component of the second measurement light in accordance with the third embodiment of the present invention.
Figure 34:
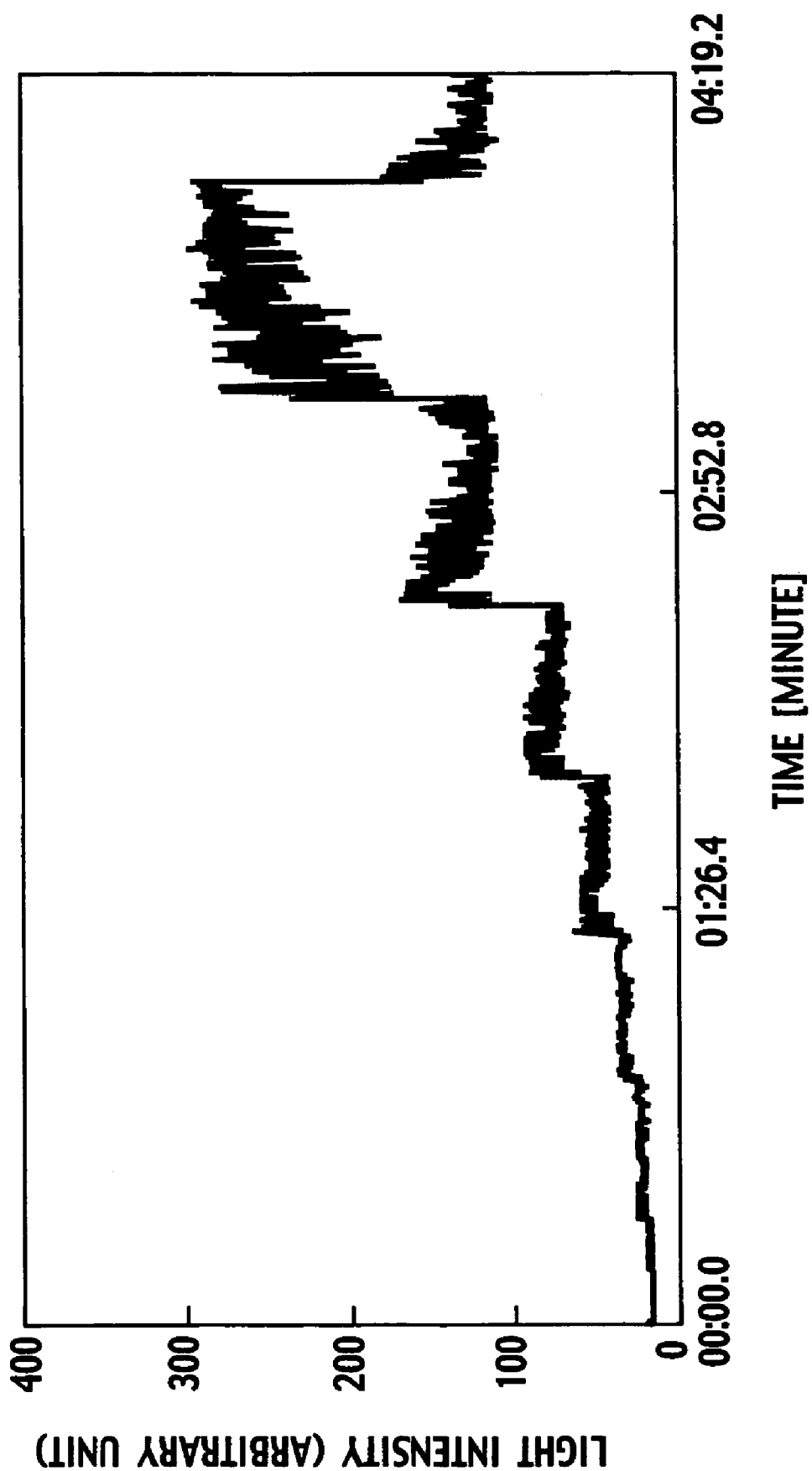
FIG. 34 is a graph showing the intensity of the second wavelength component of the second measurement light in accordance with the third embodiment of the present invention.
Figure 35:
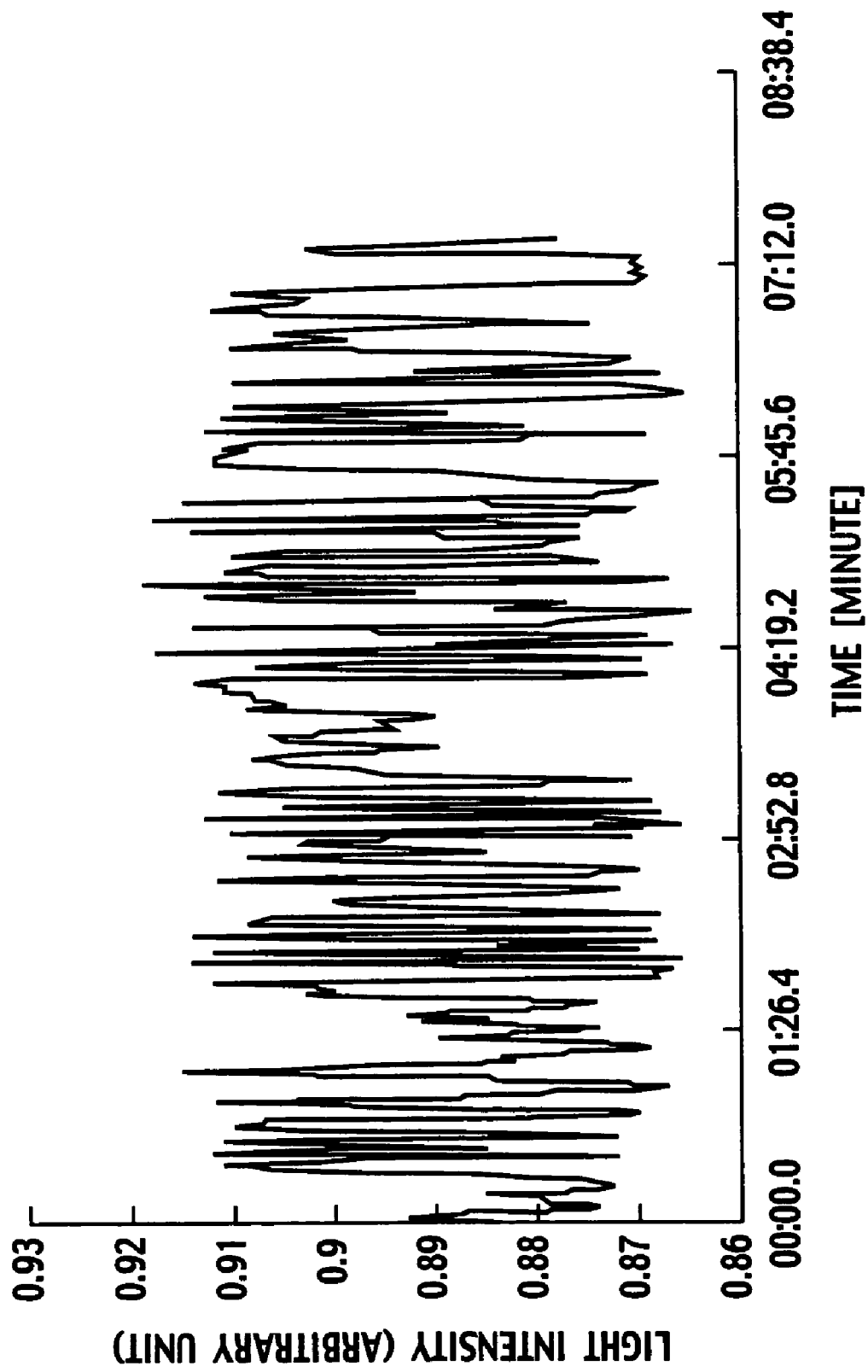
FIG. 35 is a graph showing the intensity of the first emitted light in accordance with the third embodiment of the present invention.

As described above, the differential pressure measuring system and the differential pressure measuring method according to the third embodiment of the present invention make it possible to measure the differential pressure ($|P_{O1}-P_{O2}|$) between the first external pressure "$P_{O1}$" and the second external pressure "$P_{O2}$" accurately without effect of the fluctuations of the intensity "$Q_{S1}$" of the first emitted light and the intensity "$Q_{S2}$" of the second emitted light. FIG. 33 plots actual example values of the intensity "$Q_{D1}$" of the first wavelength components of the second measurement light detected by the signal photodetector 154 in the case where the first distance "$L_a$" of the first transducer 5 is 1.55 mm. FIG. 34 plots actual example values of the intensity "$Q_{D2}$" of the second wavelength components of the second measurement light detected by the signal photodetector 153 in the case where the second distance "$L_b$" of the second transducer 15 is 1.31 mm. As shown in the equation (5), the intensity "$Q_{D1}$" of the first wavelength components of the second measurement light is affected by the fluctuations of the intensity "$Q_{S1}$" of the first emitted light and the transmittance "T". Also, as shown in the equation (6), the intensity "$Q_{D2}$" of the second wavelength components of the second measurement light is affected by the fluctuations of the intensity "$Q_{S2}$" of the second emitted light and the transmittance "T". As shown in FIG. 35, the intensity "$Q_{S1}$" of the first emitted light may be fluctuated by the drift of the optical axis of the first light source 14 or the fluctuation of the emission power of the first light source 14. Similar phenomenon can be seen in the intensity "$Q_{S2}$" of the second emitted light. Therefore, a measured waveform of the intensity "$Q_{D1}$" of the first wavelength components of the second measurement light shown in FIG. 33 and a measured waveform of the intensity "$Q_{D2}$" of the second wavelength components of the second measurement light shown in FIG. 34 are noisy.

Here, a reference intensity ratio "$Q_R$" calculated by dividing the intensity "$Q_{D1}$" of the first wavelength components of the second measurement light by the intensity "$Q_{D2}$" of the second wavelength components of the second measurement light is given by equation (10).

$$\begin{aligned} Q_R &= Q_{D1} \div Q_{D2} \\ &= (Q_{s1} \times R_1 \times T) \div (Q_{s2} \times R_2 \times T) \\ &= (Q_{s1} \times R_1)/(Q_{s2} \times R_2) \end{aligned} \quad (10)$$

Figure 36:
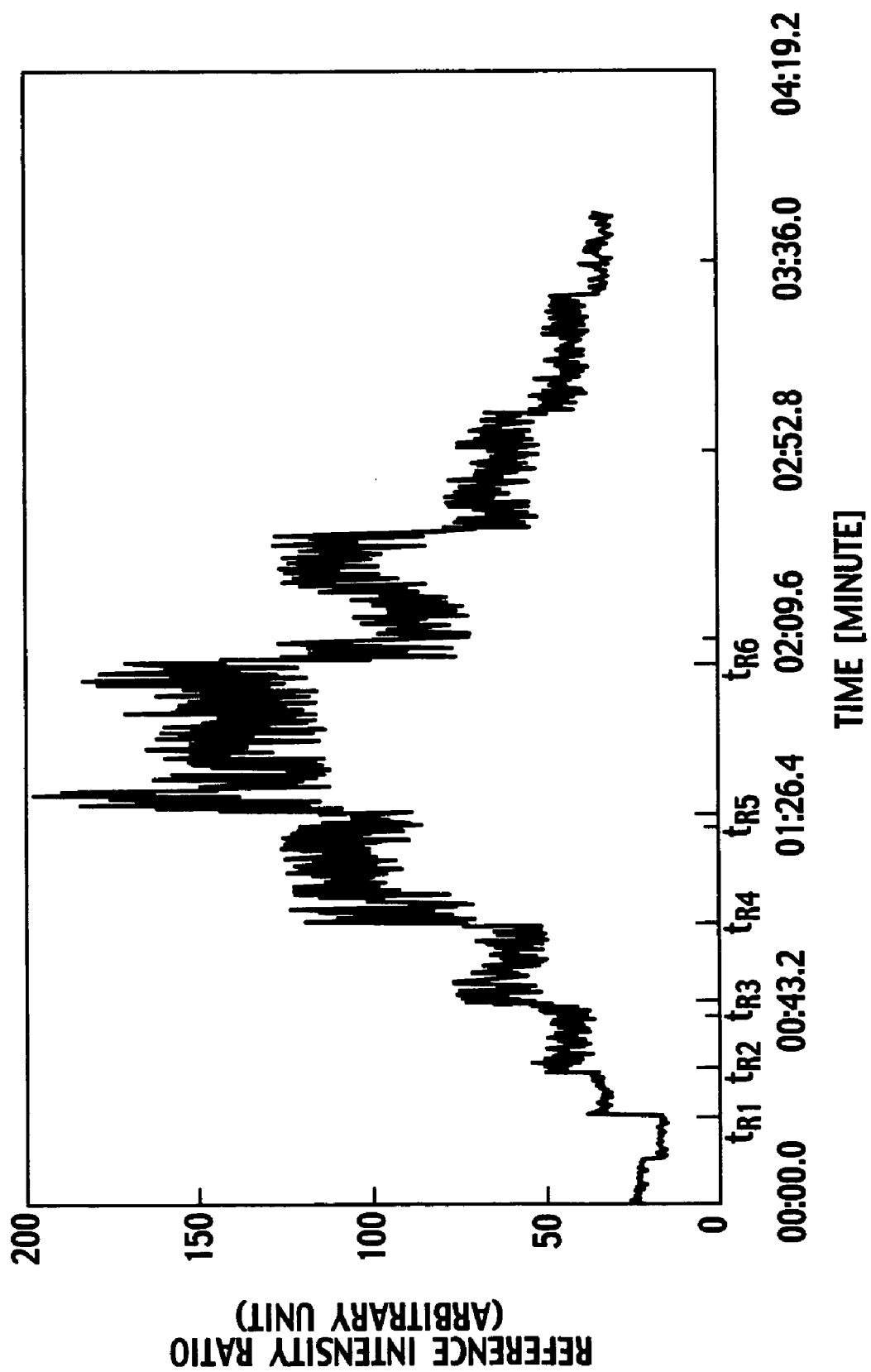
FIG. 36 is a graph showing a reference intensity ratio in accordance with the third embodiment of the present invention.

FIG. 36 shows a waveform of the reference intensity ratio "$Q_R$". From time zero to time "$t_{R1}$", the differential pressure ($|P_{O1}-P_{O2}|$) between the first external pressure "$P_{O1}$" and the second external pressure "$P_{O2}$" is zero. From time "$t_{R1}$" to time "$t_{R2}$", the differential pressure ($|P_{O1}-P_{O2}|$) between the first external pressure "$P_{O1}$" and the second external pressure "$P_{O2}$" is 28.1 kPa. From time "$t_{R2}$" to time "$t_{R3}$", the differential pressure ($|P_{O1}-P_{O2}|$) between the first external pressure "$P_{O1}$" and the second external pressure "$P_{O2}$" is 56.3 kPa. From time "$t_{R3}$" to time "$t_{R4}$", the differential pressure ($|P_{O1}-P_{O2}|$) between the first external pressure "$P_{O1}$" and the second external pressure "$P_{O2}$" is 84.4 kPa. From time "$t_{R4}$" to time "$t_{R5}$", the differential pressure ($|P_{O1}-P_{O2}|$) between the first external pressure "$P_{O1}$" and the second external pressure "$P_{O2}$" is 112.5 kPa. From time "$t_{R5}$" to time "$t_{R6}$", the differential pressure ($|P_{O1}-P_{O2}|$) between the first external pressure "$P_{O1}$" and the second external pressure "$P_{O2}$" is 140.6 kPa.

Figure 37:
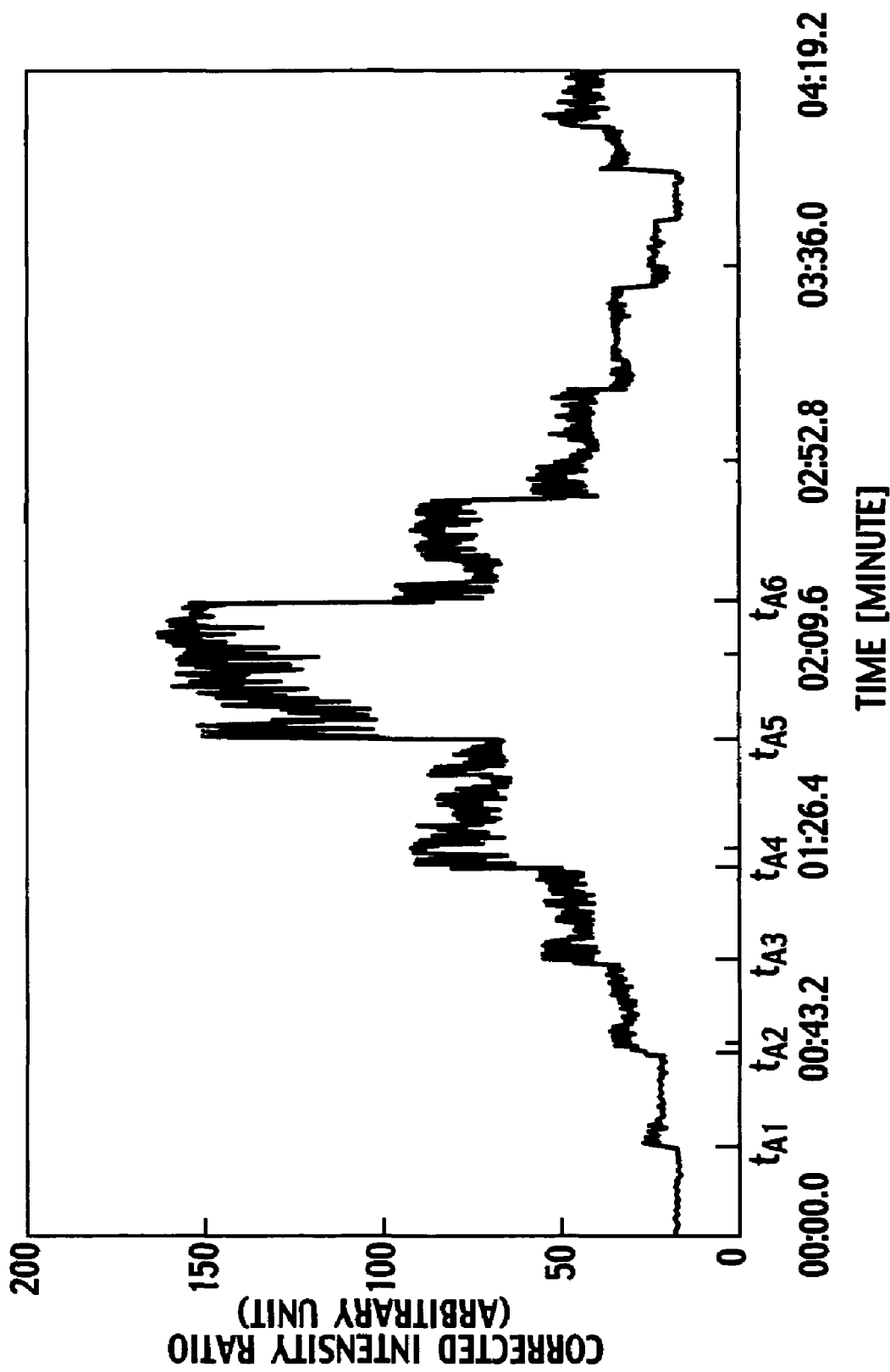
FIG. 37 is a graph showing a corrected intensity ratio in accordance with the third embodiment of the present invention.

FIG. 37 shows a waveform of the corrected intensity ratio "$A_R$" that is calculated by the ratio calculator 74A and is given by the equation (9). From time zero to time "$t_{A1}$", the differential pressure ($|P_{O1}-P_{O2}|$) between the first external pressure "$P_{O1}$" and the second external pressure "$P_{O2}$" is zero. From time "$t_{A1}$" to time "$t_{A2}$", the differential pressure ($|P_{O1}-P_{O2}|$) between the first external pressure "$P_{O1}$" and the second external pressure "$P_{O2}$" is 28.1 kPa. From time "$t_{A2}$" to time "$t_{A3}$", the differential pressure ($|P_{O1}-P_{O2}|$) between the first external pressure "$P_{O1}$" and the second external pressure "$P_{O2}$" is 56.3 kPa. From time "$t_{A3}$" to time "$t_{A4}$", the differential pressure ($|P_{O1}-P_{O2}|$) between the first external pressure "$P_{O1}$" and the second external pressure "$P_{O2}$" is 84.4 kPa. From time "$t_{A4}$" to time "$t_{A5}$", the differential pressure ($|P_{O1}-P_{O2}|$) between the first external pressure "$P_{O1}$" and the second external pressure "$P_{O2}$" is 112.5 kPa. From time "$t_{45}$" to time "$t_{46}$", the differential pressure ($|P_{O1}-P_{O2}|$) between the first external pressure "$P_{O1}$" and the second external pressure "$P_{O2}$" is 140.6 kPa.

As shown in the equation (10), the reference intensity ratio "$Q_R$" is affected by the fluctuations of the intensity "$Q_{S1}$" of the first emitted light and the intensity. "$Q_{S2}$" of the second emitted light. Therefore, the waveform of the reference intensity "$Q_R$" shown in FIG. 36 is noisy. However, the corrected intensity ratio "$A_R$" calculated by the ratio calculator 74A is not affected by the fluctuations of the intensity "$Q_{S1}$" of the first emitted light and the intensity "$Q_{S2}$" of the second emitted light, as shown in the equation (9). Therefore, the waveform of the corrected intensity ratio "$A_R$" shown in FIG. 37 is less noisy than the waveform shown in FIG. 36. Consequently, the differential pressure measuring system according to the third embodiment of the present invention makes it possible to measure the differential pressure ($|P_{O1}-P_{O2}|$) between the first external pressure "$P_{O1}$" and the second external pressure "$P_{O2}$" accurately.

Modification of the Third Embodiment

In the third embodiment, it is explained that the first corrector 73A divides the intensity "$Q_{D1}$" of the first wavelength components of the second measurement light by the intensity "$Q_{S1}$" of the first emitted light to calculate the first light intensity ratio "$N_1$". However, dividing the intensity "$Q_{S1}$" of the first emitted light by the intensity "$Q_{D1}$" of the first wavelength components of the second measurement light to calculate the first light intensity ratio "$N_1$" is an alternative. In this case, the second corrector 273A divides the intensity "$Q_{S2}$" of the second emitted light by the intensity "$Q_{D2}$" of the second wavelength components of the second measurement light to calculate the second light intensity ratio "$N_2$". Also, in the third embodiment, it is explained that the ratio calculator 74A divides the first light intensity ratio "$N_1$" by the second light intensity ratio "$N_2$" to calculate the corrected intensity ratio "$A_R$". However, dividing the second light intensity ratio "$N_2$" by the first light intensity ratio "$N_1$" to calculate the corrected intensity ratio "$A_R$" is an alternative.

Fourth Embodiment

Figure 38:
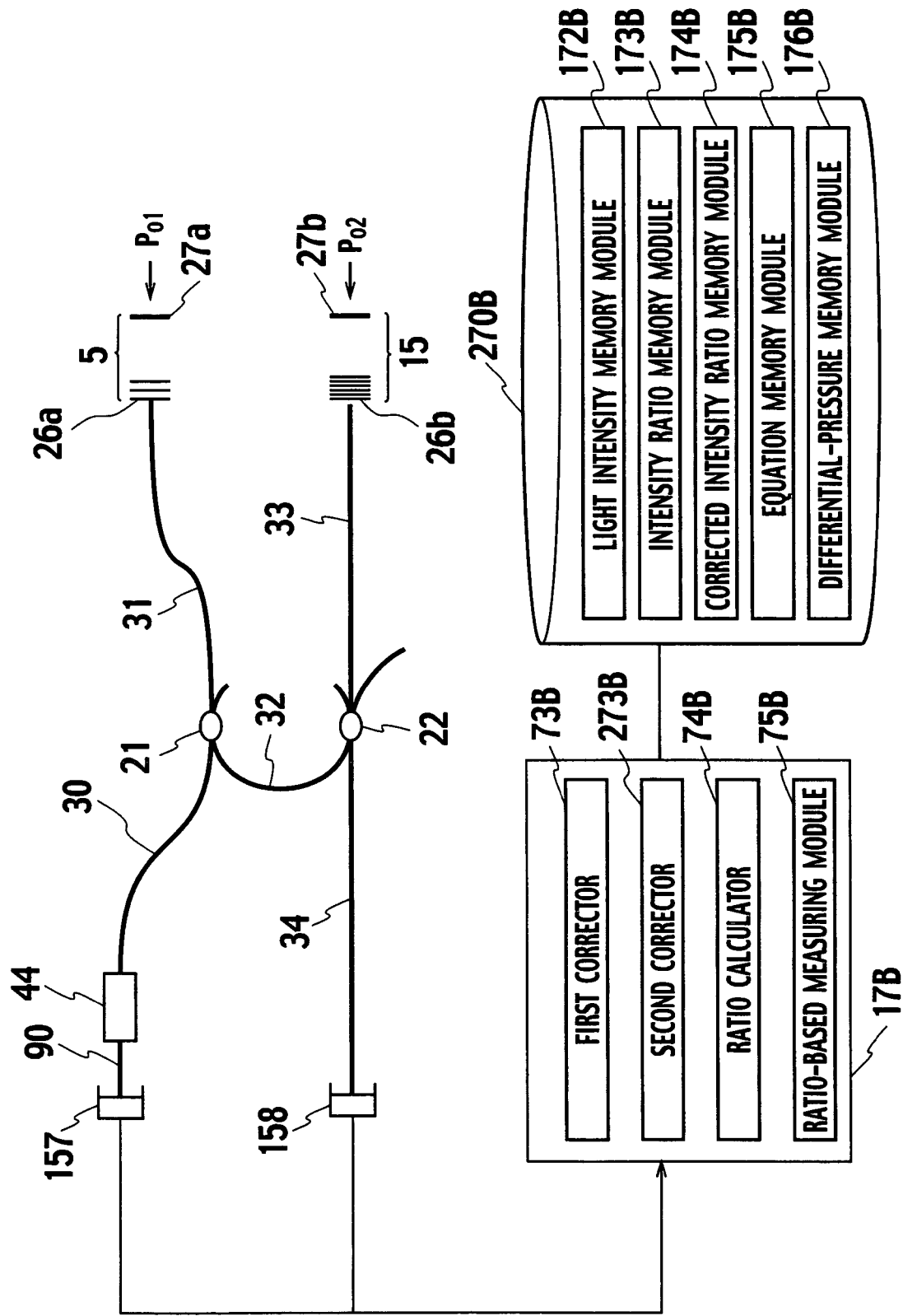
FIG. 38 is a diagram of the differential pressure measuring system in accordance with a fourth embodiment of the present invention.

With reference to FIG. 38, the differential pressure measuring system according to the fourth embodiment of the present invention includes a wavelength turnable light source 44. The wavelength turnable light source 44 is configured to selectively emit the first wavelength components of the emitted light in the first wavelength range and the second wavelength components of the emitted light in the second wavelength range. An emitted light detector 157 is connected to the wavelength turnable light source 44, through the optical waveguide 90. When the wavelength turnable light source 44 emits the first wavelength components of the emitted light, the emitted light detector 157 detects the intensity "$Q_{S2}$" of the first wavelength components of the emitted light transmitted by the optical waveguide 90. When the wavelength turnable light source 44 emits the second wavelength components of the emitted light, the emitted light detector 157 detects the intensity "$Q_{S2}$" of the second wavelength components of the emitted light transmitted by the optical waveguide 90.

Further, the first transducer 5 is connected to the wavelength turnable light source 44, through the optical waveguide 30, the first splitter 21, and the optical waveguide 31. When the wavelength turnable light source 44 emits the first wavelength components of the emitted light, the first wavelength components of the emitted light pass through the first filter 26a. The first wavelength components of the emitted light are reflected by the first reflective film 27a and pass through the first filter 26a again as the first wavelength components of the first measurement light provided by the first transducer 5. While the first wavelength components travel back and forth in the first transducer 5, the light intensity of the first wavelength components is attenuated, depending on the first external pressure "$P_{O1}$". When the wavelength turnable light source 44 emits the second wavelength components of the emitted light, the second wavelength components of the emitted light are reflected by the first filter 26a as the second wavelength components of the first measurement light.

The first measurement light is transmitted to the second transducer 15, through the optical waveguide 31, the first splitter 21, the optical waveguide 32, the second splitter 22, and the optical waveguide 33. Here, the first wavelength components of the first measurement light are reflected by the second filter 26b of the second transducer 15 as the first wavelength components of the second measurement light. However, the second wavelength components of the first measurement light pass through the second filter 26b. The second wavelength components of the first measurement light are reflected by the second reflective film 27b and pass through the second filter 26b as the second wavelength components of the second measurement light provided by the second transducer 15. While the second wavelength components travel back and forth in the second transducer 15, the intensity of the second wavelength components of the first measurement light is attenuated, depending on the second external pressure "$P_{O2}$".

The second measurement light is transmitted to a measurement light detector 158, through the optical waveguide 33, the second splitter 22, and the optical waveguide 34. When the wavelength turnable light source 44 emits the first wavelength components of the emitted light, the measurement light detector 158 detects the intensity "$Q_{D1}$" of the first wavelength components of the second measurement light given by the equation (6). When the wavelength turnable light source 44 emits the second wavelength components of the emitted light, the measurement light detector 158 detects the intensity "$Q_{D2}$" of the second wavelength components of the second measurement light given by the equation (5).

The emitted light detector 157 and the measurement light detector 158 are connected to signal processing equipment 17B, electrically. The signal processing equipment 17B includes a first corrector 73B, a second corrector 273B, a ratio calculator 74B, and a ratio-based measuring module 75B. When the wavelength turnable light source 44 emits the first wavelength components of the emitted light, the first corrector 73B calculates the first light intensity ratio "$N_1$" given by the equation (7). By dividing the intensity "$Q_{D1}$" of the first wavelength components of the second measurement light by the intensity "$Q_{S1}$" of the first wavelength components of the emitted light, the fluctuation of the intensity of the second measurement light in the first wavelength range is cancelled by the fluctuation of the intensity of the emitted light in the first wavelength range.

When the wavelength turnable light source 44 emits the second wavelength components of the emitted light, the second corrector 273B calculates the second light intensity ratio "$N_2$" given by the equation (8). By dividing the intensity "$Q_{D2}$" of the second wavelength components of the second measurement light by the intensity "$Q_{S2}$" of the second wavelength components of the emitted light, the fluctuation of the intensity of the second measurement light in the second wavelength range is cancelled by the intensity of the emitted light in the second wavelength range. The ratio calculator 74B calculates the corrected intensity ratio "$A_R$", by using the equation (9). The ratio-based measuring module 75B measures the differential pressure ($|P_{O1}-P_{O2}|$) between the first external pressure "$P_{O1}$" and the second external pressure "$P_{O2}$" by monitoring the corrected intensity ratio "$A_R$" similar to the ratio-based measuring module 75A shown in FIG. 31.

A data memory 270B is connected to the signal processing equipment 17B. The data memory 270B includes a light intensity memory module 172B, an intensity ratio memory module 173B, a corrected intensity ratio memory module 174B, an equation memory module 175B, and a differential pressure memory module 176B. The light intensity memory module 172B stores the intensity "$Q_{S1}$" of the first wavelength components of the emitted light and the intensity "$Q_{S2}$" of the second wavelength components of the emitted light detected by the emitted light detector 157. Also, the light intensity memory module 172B stores the intensity "$Q_{D1}$" of the first wavelength components of the second measurement light and the intensity "$Q_{D2}$" of the second wavelength components of the second measurement light detected by the measurement light detector 158. The intensity ratio memory module 173B stores the first light intensity ratio "$N_1$" calculated by the first corrector 73B and the second light intensity ratio "$N_2$" calculated by the second corrector 273B. The corrected intensity ratio memory module 174B stores the corrected intensity ratio "$A_R$" calculated by the ratio calculator 74B. The equation memory module 175B stores the relational equation showing the relationship between the differential pressure ($|P_{O1}-P_{O2}|$) and the corrected intensity ratio "$A_R$". The differential pressure memory module 176B stores the differential pressure ($|P_{O1}-P_{O2}|$) between the first external pressure "$P_{O1}$" and the second external pressure "$P_{O2}$" calculated by the ratio-based measuring module 75B.

Figure 39:
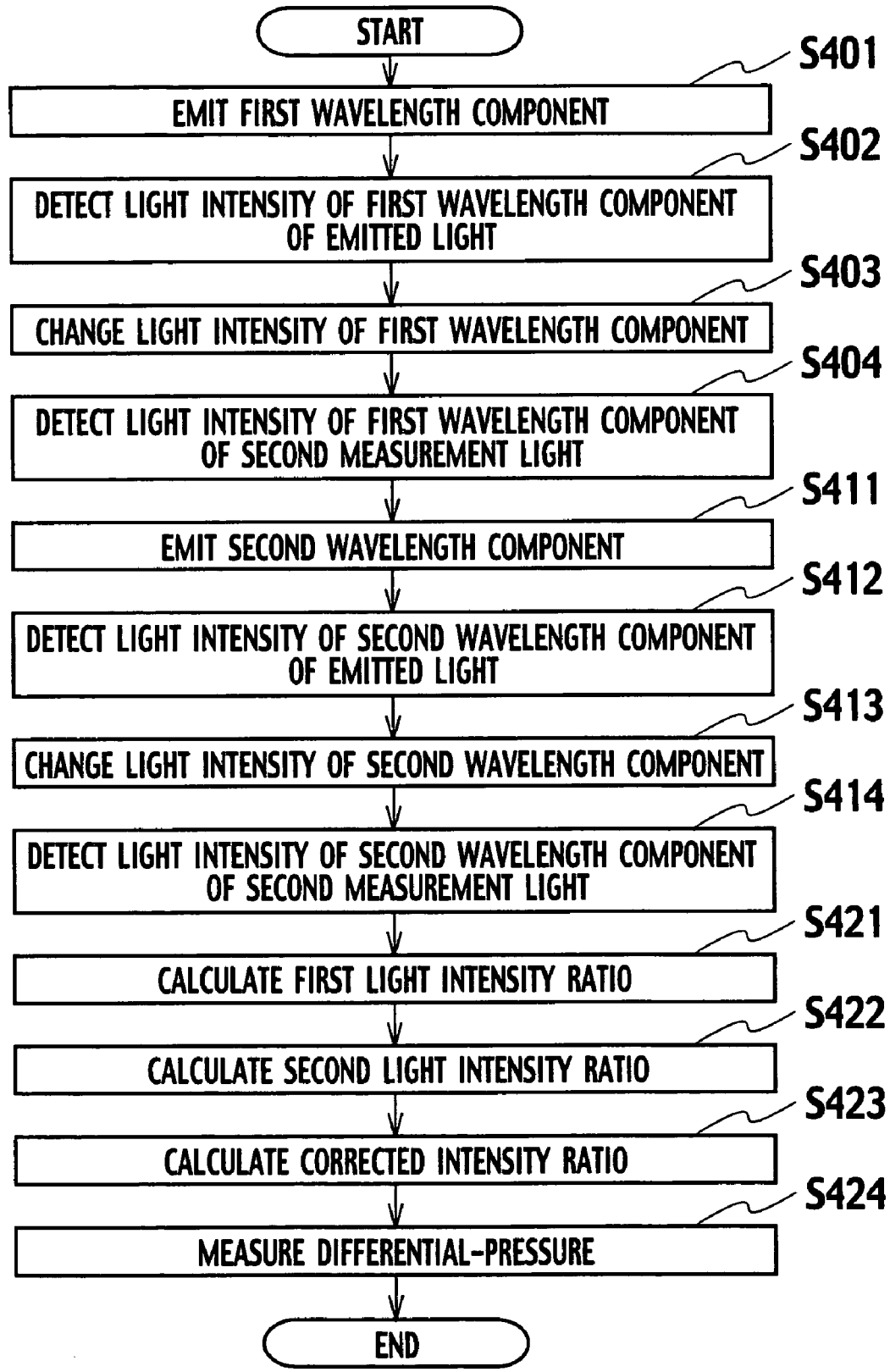
FIG. 39 is a flowchart depicting the differential pressure measuring method in accordance with the fourth embodiment of the present invention.

With reference next to FIG. 39, the differential pressure measuring method according to the fourth embodiment of the present invention is described.

In step S401, wavelength turnable light source 44, shown in FIG. 38, emits the first wavelength components of the emitted light in the first wavelength range to the optical waveguides 30, 90. In step S402, the emitted light detector 157 detects the intensity "$Q_{S1}$" of the first wavelength components of the emitted light transmitted by the optical waveguide 90. The emitted light detector 157 transfers the detected intensity "$Q_{S1}$" of the first wavelength components of the emitted light to the first corrector 73B. The first corrector 73B stores the received intensity "$Q_{S1}$" of the first wavelength components of the emitted light in the light intensity memory module 172B of the data memory 270B.

In step S403, the first wavelength components of the emitted light are transmitted to the first transducer 5, through the optical waveguide 30, the first splitter 21, and the optical waveguide 31. The first transducer 5 attenuates the intensity of the first wavelength components of the emitted light, depending on the first external pressure "$P_{O1}$", to provide the first wavelength components of the first measurement light. The first wavelength components of the first measurement light are transmitted to the second transducer 15, through the optical waveguide 31, the first splitter 21, the optical waveguide 32, the second splitter 22, and the optical waveguide 33. The second filter 26b of the second transducer 15 reflects the first wavelength components of the first measurement light as the first wavelength components of the second measurement light.

In step S404, the first wavelength components of the second measurement light are transmitted to the measurement light detector 158, through the optical waveguide 33, the second splitter 22, and the optical waveguide 34. The measurement light detector 158 detects the intensity "$Q_{D1}$" of the first wavelength components of the second measurement light given by the equation (6). The measurement light detector 158 transfers the detected intensity "$Q_{D1}$" of the first wavelength components of the second measurement light to the first corrector 73B. The first corrector 73B stores the received intensity "$Q_{D1}$" of the first wavelength components of the second measurement light in the light intensity memory module 172B.

In step S411, the wavelength turnable light source 44 emits the second wavelength components of the emitted light in the second wavelength range to the optical waveguides 30, 90. In step S412, the emitted light detector 157 detects the intensity "$Q_{S2}$" of the second wavelength components of the emitted light transmitted by the optical waveguide 90. The emitted light detector 157 transfers the detected intensity "$Q_{S2}$" of the second wavelength components of the emitted light to the second corrector 273B. The second corrector 273B stores the received intensity "$Q_{S2}$" of the second wavelength components of the emitted light in the light intensity memory module 172B.

In step S413, the second wavelength components of the emitted light transmitted to the first transducer 5, through the optical waveguide 30, the first splitter 21, and the optical waveguide 31. The first transducer 5 reflects the second wavelength components of the emitted light as the second wavelength components of the first measurement light. The second wavelength components of the first measurement light are transmitted to the second transducer 15, through the optical waveguide 31, the first splitter 21, the optical waveguide 32, the second splitter 22, and the optical waveguide 33. The second transducer 15 attenuates the intensity of the second wavelength components of the first measurement light, depending on the second external pressure "$P_{O2}$", to provide the second wavelength components of the second measurement light.

In step S414, the second wavelength components of the second measurement light are transmitted to the measurement light detector 158, through the optical waveguide 33, the second splitter 22, and the optical waveguide 34. The measurement light detector 158 detects the intensity "$Q_{D2}$" of the second wavelength components of the second measurement light given by the equation (5). The measurement light detector 158 transfers the detected intensity "$Q_{D2}$" of the second wavelength components of the second measurement light to the second corrector 273B. The second corrector 273B stores the received intensity "$Q_{D2}$" of the second wavelength components of the second measurement light in the light intensity memory module 172B.

In step S421, the first corrector 73B retrieves the intensity "$Q_{S1}$" of the first wavelength components of the emitted light and the intensity "$Q_{D1}$" of the first wavelength components of the second measurement light from the light intensity memory module 172B. Then, the first corrector 73B divides the intensity "$Q_{D1}$" of the first wavelength components of the second measurement light by the intensity "$Q_{S1}$" of the first wavelength components of the emitted light to calculate the first light intensity ratio "$N_1$" given by the equation (7). The first corrector 73B stores the calculated first light intensity ratio "$N_1$" in the intensity ratio memory module 173B.

In step S422, the second corrector 273B retrieves the intensity "$Q_{S2}$" of the second wavelength components of the emitted light and the intensity "$Q_{D2}$" of the second wavelength components of the second measurement light from the light intensity memory module 172B. Then, the second corrector 273B divides the intensity "$Q_{D2}$" of the second wavelength components of the second measurement light by the intensity "$Q_{S2}$" of the second wavelength components of the emitted light to calculate the second light intensity ratio "$N_2$" given by the equation (8). The second corrector 273B stores the calculated the second light intensity ratio "$N_2$" in the intensity ratio memory module 173B.

In step S423, the ratio calculator 74B retrieves the first light intensity ratio "$N_1$" and the second light intensity ratio "$N_2$" from the intensity ratio memory module 173B. Then, the ratio calculator 74B divides the first light intensity ratio "$N_1$" by the second light intensity ratio "$N_2$" to calculate the corrected intensity ratio "$A_R$" given by the equation (9). The ratio calculator 74B stores the calculated corrected intensity ratio "$A_R$" in the corrected intensity ratio memory module 174B.

In step S424, the ratio-based measuring module 75B retrieves the corrected intensity ratio "$A_R$" from the corrected intensity ratio memory module 174B. Then, the ratio-based measuring module 75B retrieves the preinstalled relational equation showing the relationship between the differential pressure ($|P_{O1}-P_{O2}|$) and the corrected intensity ratio "$A_R$" from the equation memory module 175B. The ratio-based measuring module 75B assigns the calculated value of the corrected intensity ratio "$A_R$" to the variable of the corrected intensity ratio "$A_R$" in the relational equation to calculate the differential pressure ($|P_{O1}-P_{O2}|$) between the first external pressure "$P_{O1}$" and the second external pressure "$P_{O2}$". The ratio-based measuring module 75B stores the differential pressure ($|P_{O1}-P_{O2}|$) between the first external pressure "$P_{O1}$" and the second external pressure "$P_{O2}$" in the differential pressure memory module 176B and the differential pressure measuring method according to the fourth embodiment is completed.

As described above, the differential pressure measuring system shown in FIG. 38 and the differential pressure measuring method shown in FIG. 39 according to the fourth embodiment of the present invention measure the differential pressure ($|P_{O1}-P_{O2}|$) between the first external pressure "$P_{O1}$" and the second external pressure "$P_{O2}$", based on the corrected intensity ratio "$A_R$" that is not affected by the fluctuations of the intensity "$Q_{S1}$" of the first wavelength components of the emitted light, the intensity "$Q_{S2}$" of the second wavelength components of the emitted light, and the transmittances "T" of the optical waveguides 30, 31, 32, 33, 34. Therefore, the differential pressure measuring system and the differential pressure measuring method make it possible to measure the differential pressure ($|P_{O1}-P_{O2}|$) between the first external pressure "$P_{O1}$" and the second external pressure "$P_{O2}$" accurately.

Further, in the differential pressure measuring system according to the fourth embodiment, the emitted light detector 157 detects both of the intensity "$Q_{S1}$" of the first wavelength components of the emitted light and the intensity "$Q_{S2}$" of the second wavelength components of the emitted light. Also, in the differential pressure measuring system according to the fourth embodiment, the measurement light detector 158 detects both of the intensity "$Q_{D1}$" of the first wavelength components of the second measurement light and the intensity "$Q_{D2}$" of the second wavelength components of the second measurement light.

Figure 40:
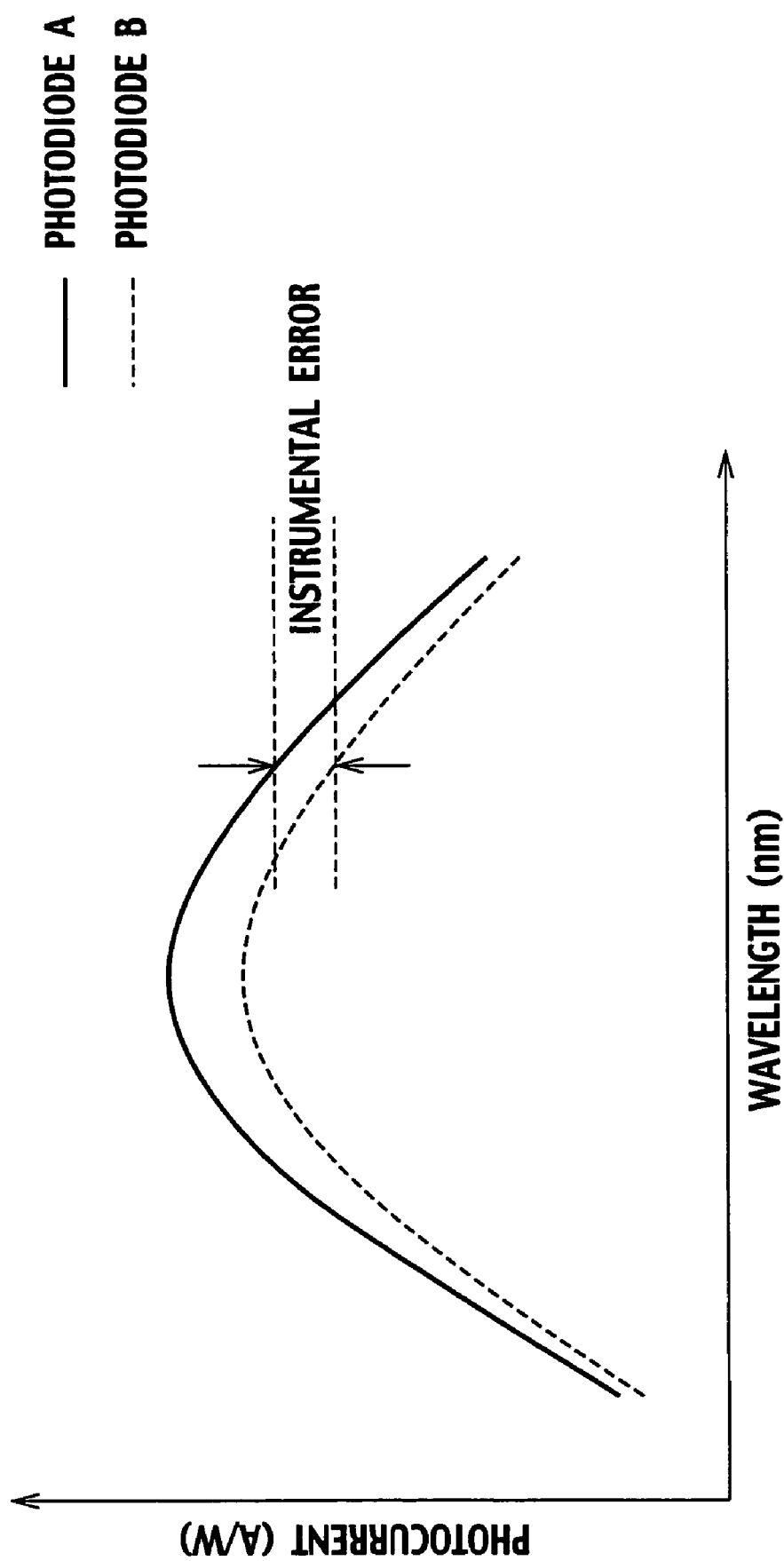
FIG. 40 is a graph showing each photocurrent of photodiodes in accordance with the fourth embodiment of the present invention.

Here, the sensitivity characteristics of a plurality of photodiodes may vary, although the plurality of photodiodes are same products. The photodiodes made from the same silicon wafer usually have same photocurrent characteristic showing a relationship between a generated electrical current and the intensity of the detected light. However, the photodiodes made from the different silicon wafers may have the different photocurrent characteristics. With reference to FIG. 40, a photodiode "A" and a photodiode "B" are same products. Since the photodiode "A" and the photodiode "B" are made from the different silicon wafers, the photodiode "A" and the photodiode "B" show different photocurrent characteristics. Therefore, it is needed to correct the variation of the photocurrent characteristics of the photodiodes to detect the intensity "$Q_{S1}$" of the first wavelength components of the emitted light and the light intensity "$Q_{S2}$" of the second wavelength components of the emitted light by the different photodiodes, respectively. Further, when the ambient environments of the photodiodes are different, the photocurrent characteristics of the photodiodes may differentially vary by the temperature, for example. Similar problems may occur when the intensity "$Q_{D1}$" of the first wavelength components of the second measurement light and the intensity "$Q_{D2}$" of the second wavelength components of the second measurement light are detected by the different photodiodes.

However, in the differential pressure measuring system according to the fourth embodiment, the emitted light detector 157 detects both of the intensity "$Q_{S1}$" of the first wavelength components of the emitted light and the intensity "$Q_{S2}$" of the second wavelength components of the emitted light. Accordingly, it is possible to eliminate the correction of the variation of the photodiodes that is required in the case where the different photodiodes detect the light intensity "$Q_{S1}$" of the first wavelength components and the light intensity "$Q_{S2}$" of the second wavelength components, respectively. Similarly, the measurement light detector 158 detects both of the intensity "$Q_{D1}$" of the first wavelength components of the second measurement light and the intensity "$Q_{D2}$" of the second wavelength components of the second measurement light. Accordingly, it is possible to eliminate the correction of the variation of the photodiodes that is required in the case where the different photodiodes detect the light intensity "$Q_{D1}$" of the first wavelength components and the light intensity "$Q_{D2}$" of the second wavelength components, respectively.

Modification of the Fourth Embodiment

Figure 41:
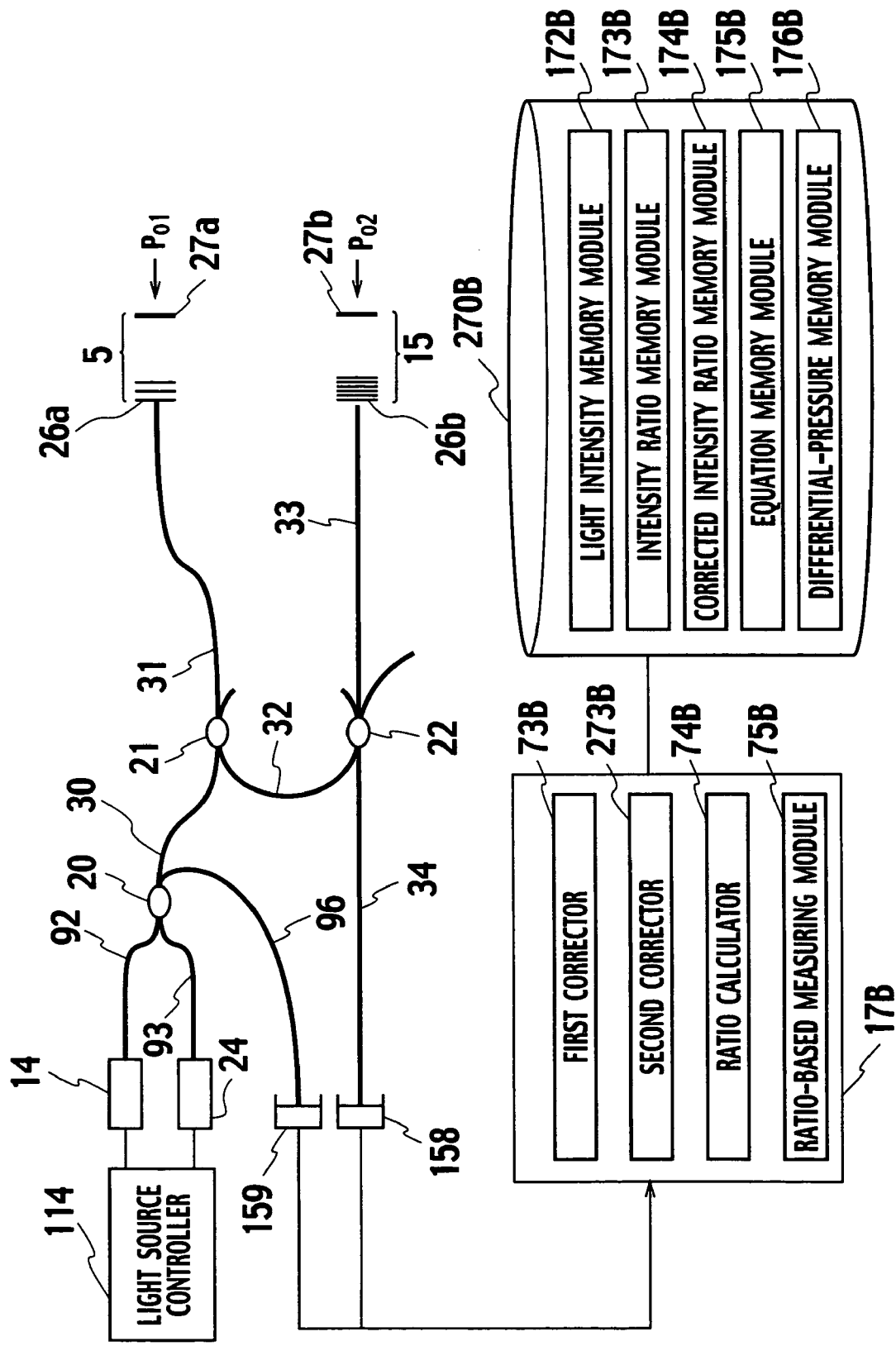
FIG. 41 is a diagram of the differential pressure measuring system in accordance with a modification of the fourth embodiment of the present invention.

With reference to FIG. 41, the differential pressure measuring system according to the modification of the fourth embodiment includes a first light source 14 configured to emit the first emitted light in the first wavelength range and a second light source 24 configured to emit the second emitted light in the second wavelength range that are different from FIG. 38. A light source controller 114 is connected to the first light source 14 and the second light source 24. The light source controller 114 supplies power to the first light source 14 and the second light source 24, alternatively.

When the light source controller 114 supplies the power to the first light source 14, the first emitted light emitted from the first light source 14 is transmitted to the optical coupler 20 for light sources, through the optical waveguide 92. The first emitted light is split into two directions in the optical coupler 20 for light sources. One of the split components of the first emitted light is transmitted by the optical waveguide 96 and is detected by the emitted light detector 159. The emitted light detector 159 transfers the intensity "$Q_{S1}$" of the first emitted light to the signal processing equipment 17B. The first corrector 73B stores the received intensity "$Q_{S1}$" of the first emitted light in the light intensity memory module 172B. Another one of the split components of the first emitted light is attenuated by the first transducer 5, depending on the first external pressure "$P_{O1}$" and is detected by the measurement light detector 158 as the first wavelength components of the second measurement light. The measurement light detector 158 transfers the intensity "$Q_{D1}$" of the detected first wavelength components of the second measurement light to the signal processing equipment 17B. The first corrector 73B stores the intensity "$Q_{D1}$" of the received first wavelength components of the second measurement light in the light intensity memory module 172B.

When the light source controller 114 supplies the power to the second light source 24, the second emitted light emitted from the second light source 24 is transmitted to the optical coupler 20 for light sources, through the optical waveguide 93. The second emitted light is split into two directions in the optical coupler 20 for light sources. One of the split components of the second emitted light is transmitted by the optical waveguide 96 and is detected by the emitted light detector 159. The emitted light detector 159 transfers the intensity "$Q_{S2}$" of the second emitted light to the signal processing equipment 17B. The second corrector 273B stores the intensity "$Q_{S2}$" of the second emitted light in the light intensity memory module 172B. Another one of the split components of the second emitted light is attenuated by the second transducer 15, depending on the second external pressure "$P_{O2}$" and is detected by the measurement light detector 158 as the second wavelength components of the second measurement light. The measurement light detector 158 transfers the intensity "$Q_{D2}$" of the second wavelength components of the second measurement light to the signal processing equipment 17B. The second corrector 273B stores the intensity "$Q_{D2}$" of the second wavelength components of the second measurement light in the light intensity memory module 172B.

Other components of the differential pressure measuring system shown in FIG. 41 are similar to FIG. 38. The differential pressure measuring system shown in FIG. 41 also cancels the fluctuations of the intensity "$Q_{S1}$" of the first emitted light, the intensity "$Q_{S2}$" of the second emitted light, and the transmittances of the optical waveguides 30-34, 92, 93. Therefore, the differential pressure measuring system makes it possible to measure the differential pressure ($|P_{O1}-P_{O2}|$) between the first external pressure "$P_{O1}$" and the second external pressure "$P_{O2}$" accurately.

Other Embodiment

Although the invention has been described above by reference to the embodiment of the present invention, the present invention is not limited to the embodiment described above. Modifications and variations of the embodiment described above will occur to those skilled in the art, in the light of the above teachings.

For example, the light source 4, shown in FIG. 1, emits a low coherent light to avoid interference in the first transducer 5 and the second transducer 15. Also, setting each of the first optical path difference "$F_1$" and the second optical path difference "$F_2$" longer than coherence length is an alternative. Further, anti-reflection film may be disposed on each end of the optical waveguides 31, 33.

Figure 42:
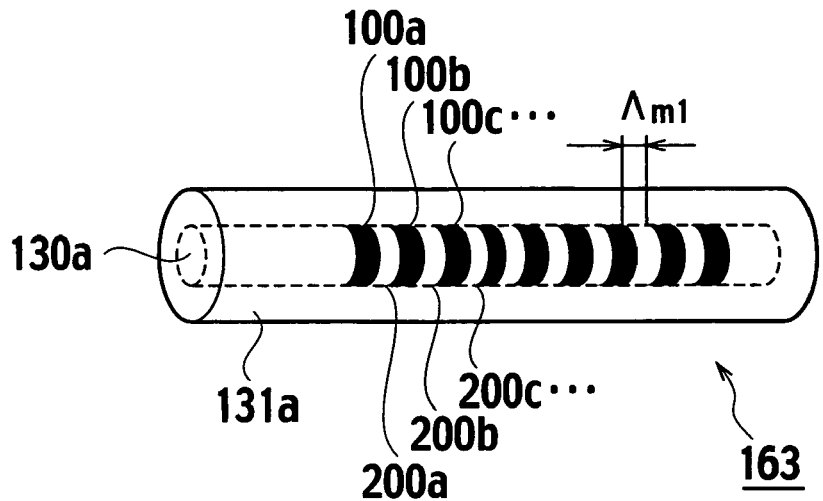
FIG. 42 is a diagram of a diffractive element in accordance with other embodiment of the present invention.

Next, the first diffractive element 163, shown in FIG. 42, can be used for the first filter 26a shown in FIG. 1. A Fiber Bragg Grating can be used for the first diffractive element 163. The first diffractive element 163 includes a core 130a. A plurality of first refractive elements 100a, 100b, 100c, ... and a plurality of second refractive elements 200a, 200b, 200c, ... are disposed periodically in the core 130a. In the case where the emitted light is projected into the first diffractive element 163, specific wavelength components are selectively reflected by the periodic structure of the first refractive elements 100a-100c and the second refractive elements 200a-200c. The specific wavelength components, such as the second wavelength components, have a light intensity peak at a Bragg wavelength "$\lambda_B$" given by equation (11). Here, "$n_D$" is an average refractive index of the periodic structure of the first refractive elements 100a-100c and the second refractive elements 200a-200c. "$\Lambda_{m1}$" is a period of the periodic structure. Also, a second diffractive element configured to reflect the first wavelength components can be used for the second filter 26b shown in FIG. 2.

$$\lambda_B = 2 \times n_D \times \Lambda_{m1} \qquad (11)$$

Figure 43:
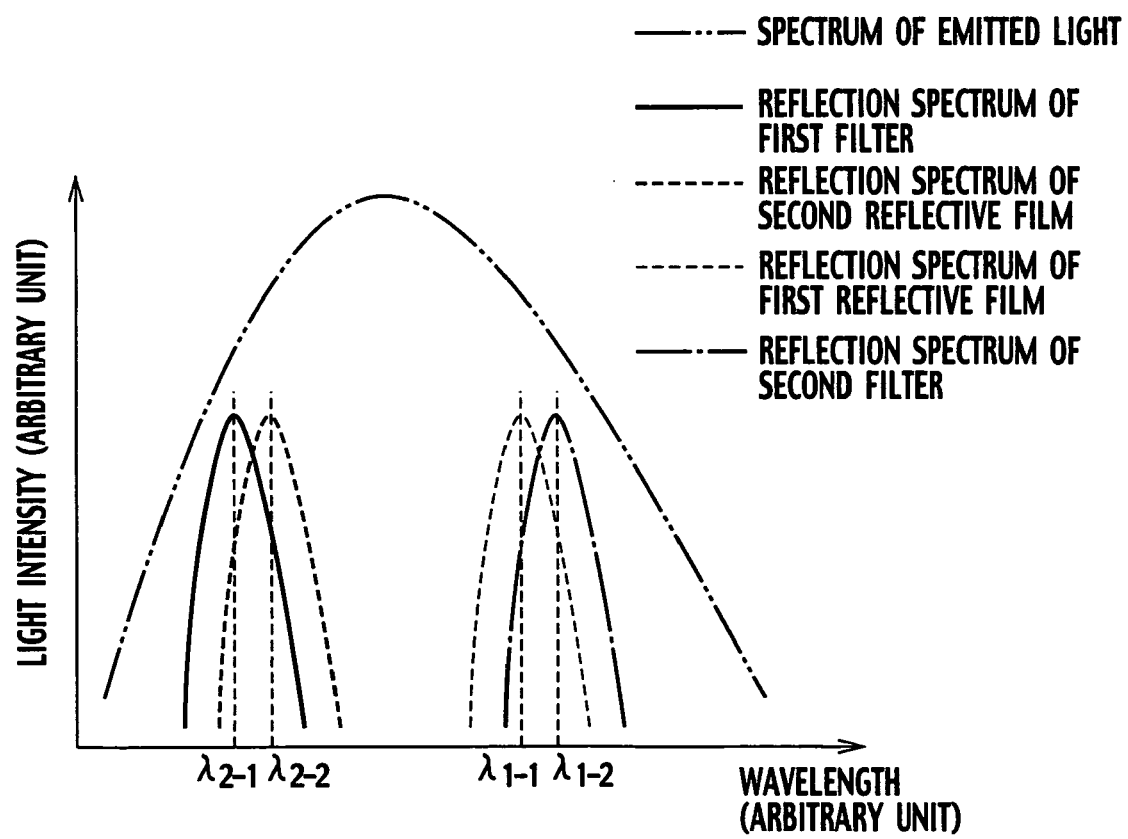
FIG. 43 is a first graph of the light intensity in accordance with other embodiment of the present invention.
Figure 44:
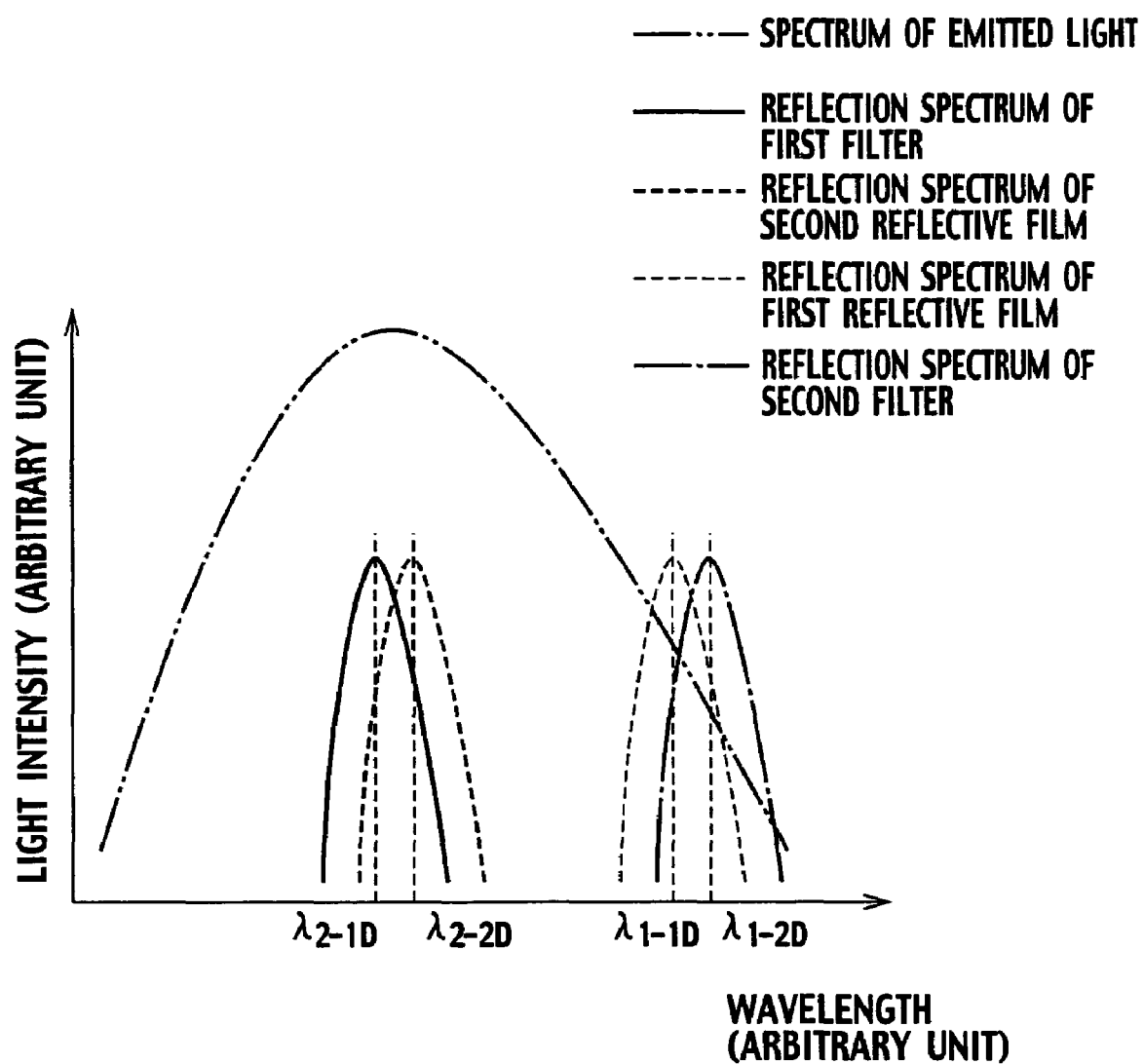
FIG. 44 is a second graph of the light intensity in accordance with other embodiment of the present invention.
Figure 45:
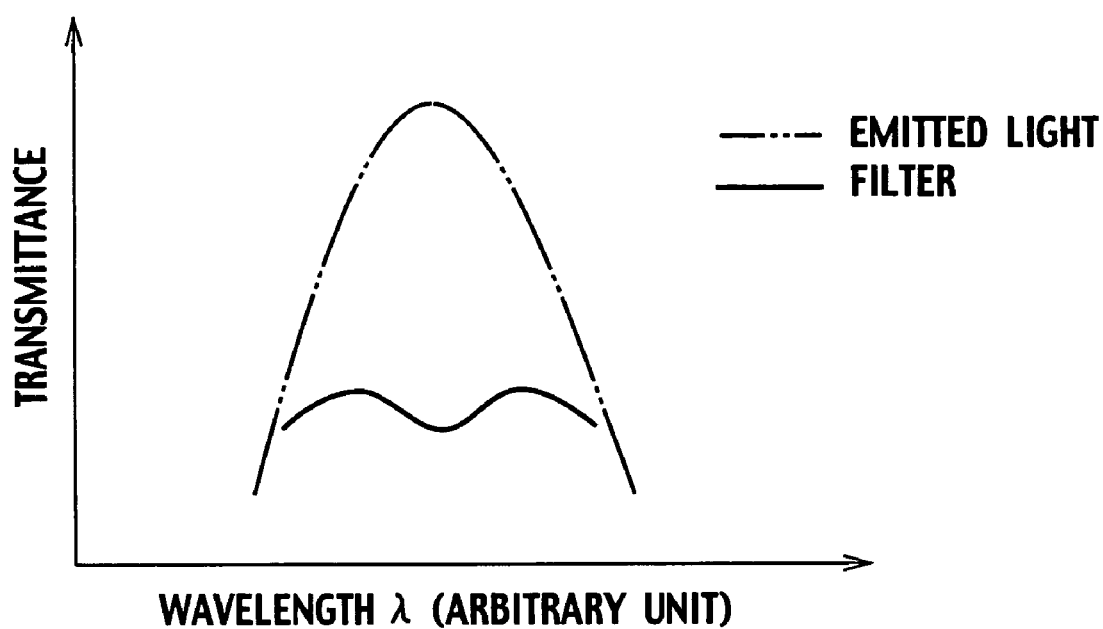
FIG. 45 is a first graph of the transmittance in accordance with other embodiment of the present invention.
Figure 46:
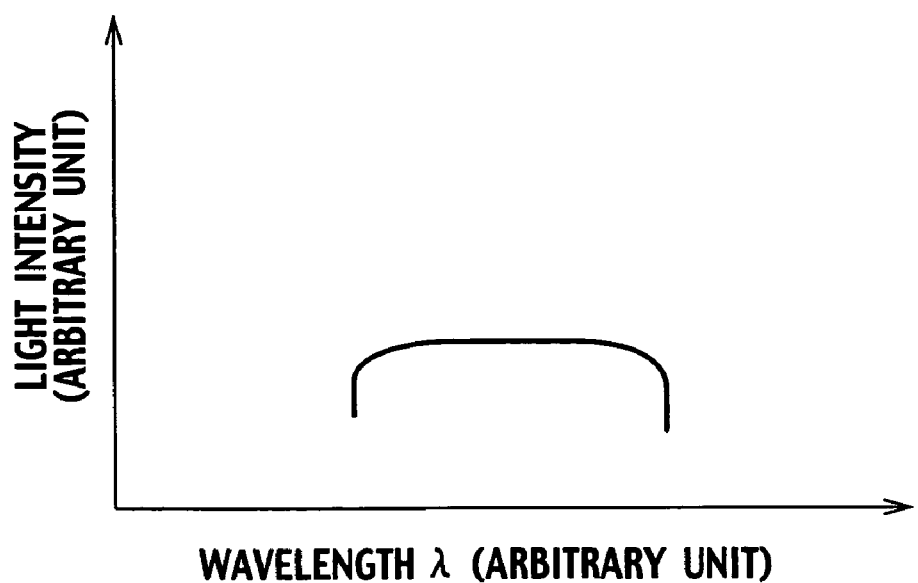
FIG. 46 is a third graph of the light intensity in accordance with other embodiment of the present invention.

With reference next to FIG. 43, in the case where the intensity of the emitted light shows Gaussian distribution, the first and second external pressures "$P_{O1}$", "$P_{O2}$" change, and the differential pressure does not change, the intensity "$Q_{D2}$" of the second wavelength components of the second measurement light may be reduced, as shown in FIG. 44, in spite of the constant differential pressure. In this case, a multilayer filter and a transmissive Fabry-Perot interferometers showing the distribution of the transmittance shown in FIG. 45 is disposed between the light source 4 and the optical waveguide 30, for example. Such filter reduces the intensity of the light emitted from the light source 4 around the center wavelength. Consequently, the distribution of the intensity of the emitted light becomes flat, as shown in FIG. 46.

Figure 47:
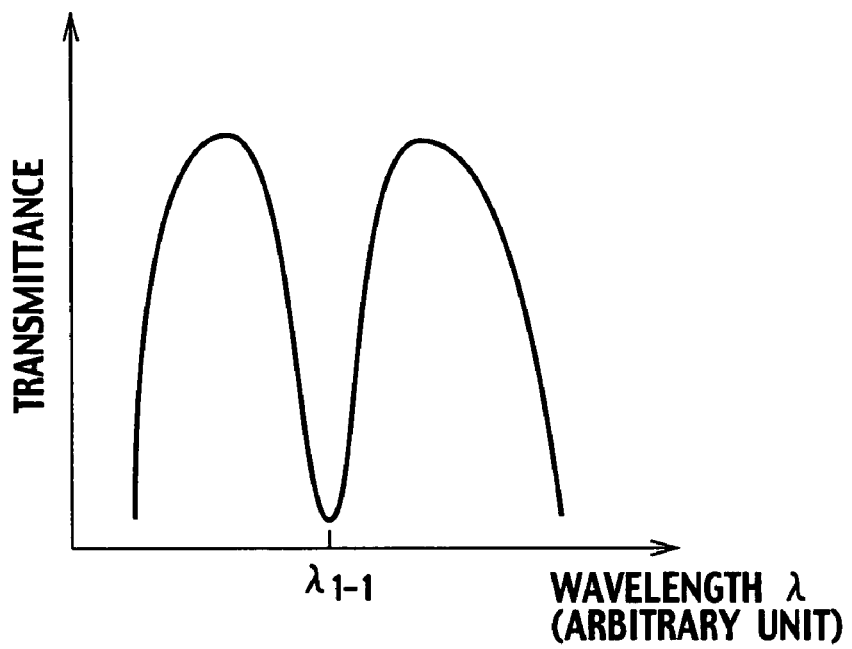
FIG. 47 is a second graph of the transmittance in accordance with other embodiment of the present invention.
Figure 48:
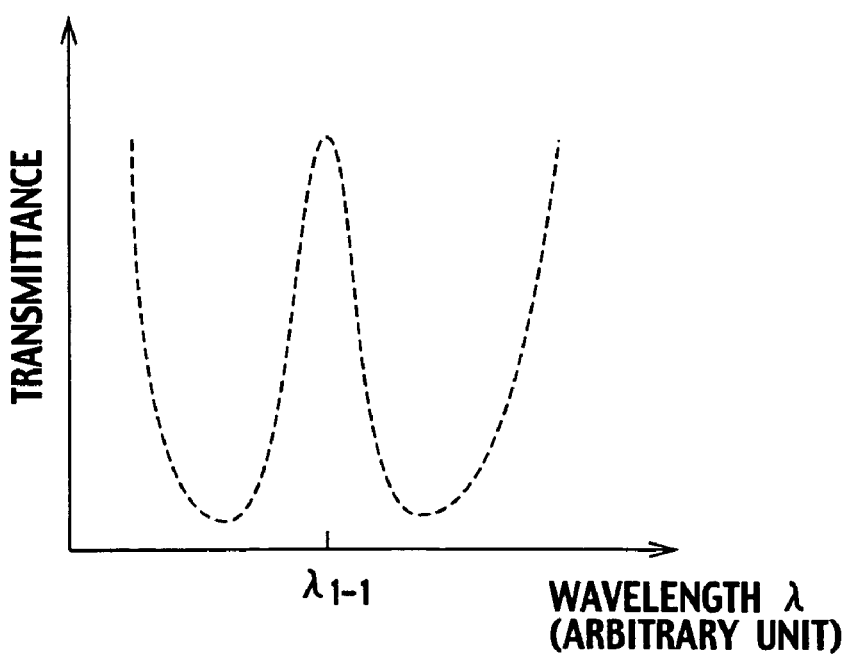
FIG. 48 is a third graph of the transmittance in accordance with other embodiment of the present invention.

Next, a notch filter configured to reflect the specific wavelength components, as shown in FIG. 47, and a bandpass filter configured to transmit the specific wavelength components, as shown in FIG. 48, can be used for the first filter 26a and the second filter 26b shown in FIG. 1, for example. When the notch filter having the spectrum shown in FIG. 47 is used for the first filter 26a, the first filter 26a reflects the first wavelength components and transmits the second wavelength components. In this case, the bandpass filter having the spectrum shown in FIG. 48 is used for the second filter 26b. The second filter 26 transmits the first wavelength components and reflects the second wavelength components.

Figure 49:
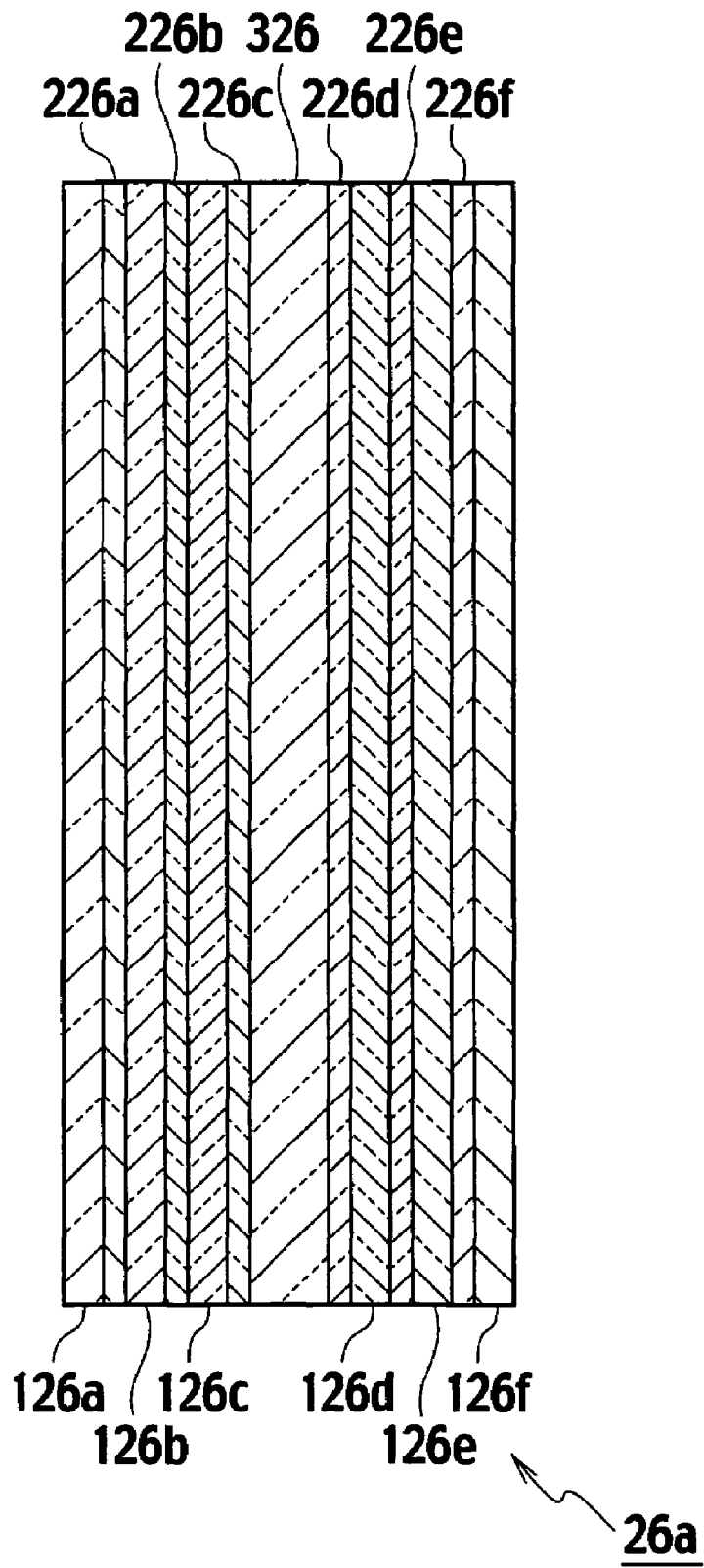
FIG. 49 is a cross sectional view of a filter in accordance with other embodiment of the present invention.

With reference to FIG. 49, the notch filter and the bandpass filter are manufactured by depositing a plurality of first refractive layers 126a, 126b, 126c, 126d, 126e, 126f and a plurality of second refractive layers 226a, 226b, 226c, 226d, 226e, 226f periodically on both surface of the interlayer 326. By setting the thickness of the interlayer 326 half of the wavelength of the light to be transmitted, the bandpass filter can be obtained.

As described above, the present invention includes many variations of embodiments. Therefore, the scope of the invention is defined with reference to the following claims.

What is claimed is:

1. A differential pressure measuring system comprising:
   a light source configured to emit an emitted light;
   a first transducer configured to attenuate an intensity of the emitted light in a first wavelength range, depending on a first external pressure to be applied, and to provide a first measurement light;
   a second transducer configured to attenuate an intensity of the first measurement light in a second wavelength range, depending on a second external pressure to be applied, and to provide a second measurement light, the second wavelength range being different from the first wavelength range; and
   a ratio-based measuring module configured to measure a differential pressure between the first external pressure and the second external pressure, based on a ratio of one of intensities of the second measurement light in the first and second wavelength ranges to another one of the intensities of the second measurement light in the first and second wavelength ranges.

2. The system of claim 1, further comprising a first corrector configured to cancel a fluctuation of the intensity of the second measurement light in the first wavelength range by a fluctuation of the intensity of the emitted light in the first wavelength range.

3. The system of claim 2, wherein the first corrector divides the intensity of the second measurement light in the first wavelength range by the intensity of the emitted light in the first wavelength range.

4. The system of claim 2, wherein the first corrector divides the intensity of the emitted light in the first wavelength range by the intensity of the second measurement light in the first wavelength range.

5. The system of claim 1, further comprising a second corrector configured to cancel a fluctuation of the intensity of the second measurement light in the second wavelength range by a fluctuation of the intensity of the emitted light in the second wavelength range.

6. The system of claim 5, wherein the second corrector divides the intensity of the second measurement light in the second wavelength range by the intensity of the emitted light in the second wavelength range.

7. The system of claim 5, wherein the second corrector divides the intensity of the emitted light in the second wavelength range by the intensity of the second measurement light in the second wavelength range.

8. The system of claim 1, wherein the first transducer comprises;
a first filter configured to reflect a second wavelength component of the emitted light in the second wavelength range and to transmit a first wavelength component of the emitted light in the first wavelength range;
a first diaphragm disposed parallel to the first filter and configured to be deflected depending on the first external pressure; and
a first reflective film disposed on the first diaphragm to reflect the first wavelength component of the emitted light passing through the first filter.

9. The system of claim 1, wherein the second transducer comprises;
a second filter configured to reflect a first wavelength component of the first measurement light in the first wavelength range and to transmit a second wavelength component of the first measurement light in the second wavelength range;
a second diaphragm disposed parallel to the second filter and configured to be deflected depending on the second external pressure; and
a second reflective film disposed on the second diaphragm to reflect the second wavelength component of the first measurement light passing through the second filter.

10. A differential pressure measuring method comprising:
emitting an emitted light;
attenuating an intensity of the emitted light in a first wavelength range, depending on a first external pressure, to provide a first measurement light;
attenuating an intensity of the first measurement light in a second wavelength range, depending on a second external pressure, to provide a second measurement light, the second wavelength range being different from the first wavelength range; and
measuring a differential pressure between the first external pressure and the second external pressure, based on a ratio of one of intensities of the second measurement light in the first and second wavelength ranges to another one of the intensities of the second measurement light in the first and second wavelength ranges.

11. The method of claim 10, further comprising:
cancelling a fluctuation of the intensity of the second measurement light in the first wavelength range by a fluctuation of the intensity of the emitted light in the first wavelength range.

12. The method of claim 10, further comprising:
dividing the intensity of the second measurement light in the first wavelength range by the intensity of the emitted light in the first wavelength range.

13. The method of claim 10, further comprising:
dividing the intensity of the emitted light in the first wavelength range by the intensity of the second measurement light in the first wavelength range.

14. The method of claim 10, further comprising:
cancelling a fluctuation of the intensity of the second measurement light in the second wavelength range by a fluctuation of the intensity of the emitted light in the second wavelength range.

15. The method of claim 10, further comprising:
dividing the intensity of the second measurement light in the second wavelength range by the intensity of the emitted light in the second wavelength range.

16. The method of claim 10, further comprising:
dividing the intensity of the emitted light in the second wavelength range by the intensity of the second measurement light in the second wavelength range.

* * * * *